(12) United States Patent
Amemiya et al.

(10) Patent No.: US 7,956,498 B2
(45) Date of Patent: Jun. 7, 2011

(54) ACCELERATION GENERATOR AND PSEUDO FORCE SENSE GENERATOR

(75) Inventors: Tomohiro Amemiya, Atsugi (JP); Hideyuki Andou, Atsugi (JP); Tarou Maeda, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/965,340

(22) Filed: Dec. 10, 2010

(65) Prior Publication Data

US 2011/0074227 A1    Mar. 31, 2011

Related U.S. Application Data

(62) Division of application No. 11/813,549, filed as application No. PCT/JP2007/051088 on Jan. 24, 2007, now Pat. No. 7,868,489.

(30) Foreign Application Priority Data

Jan. 24, 2006   (JP) .................................. 2006-014655

(51) Int. Cl.
*H02K 41/03* (2006.01)
(52) U.S. Cl. ...................................... 310/12.16; 310/13
(58) Field of Classification Search ................ 310/12.16, 310/13–14, 81, 68 D
See application file for complete search history.

(56) References Cited

U.S. PATENT DOCUMENTS

| | | | | |
|---|---|---|---|---|
| 3,220,201 A | * | 11/1965 | Heuchling et al. | 62/6 |
| 3,788,088 A | * | 1/1974 | Dehne | 62/6 |
| 3,980,908 A | * | 9/1976 | McClintock | 396/465 |
| 4,872,313 A | * | 10/1989 | Kazumoto et al. | 62/6 |
| 5,113,662 A | * | 5/1992 | Fujii et al. | 62/6 |
| 5,693,991 A | * | 12/1997 | Hiterer et al. | 310/30 |
| 5,894,263 A | | 4/1999 | Shimakawa et al. | |
| 6,208,237 B1 | | 3/2001 | Saiki et al. | |
| 6,265,965 B1 | | 7/2001 | Lee | |
| 6,628,798 B2 | | 9/2003 | Teshima et al. | |

(Continued)

FOREIGN PATENT DOCUMENTS

JP        1-216506           8/1989

(Continued)

OTHER PUBLICATIONS

Kakehi et al., "Development and Evaluation of Wearable Force Display HapticGEAR for Immersive Projection Displays," Journal of Virtual Reality Society of Japan, vol. 5, No. 4, pp. 1113-1120, 2000.

(Continued)

*Primary Examiner* — Thanh Lam
(74) *Attorney, Agent, or Firm* — Oblon, Spivak, McClelland, Maier & Neustadt, L.L.P.

(57) ABSTRACT

An acceleration generator 20 includes: a moving member (21, 25) that performs a periodic translational motion along a particular straight line; a first operating part (24) that applies a first force that varies in magnitude depending on the relative position thereof with respect to the moving member to the moving member in a direction parallel to the particular straight line; and a second operating part (27) that applies a second force that varies in magnitude depending on the relative position thereof with respect to the moving member to the moving member in a direction parallel to the particular straight line. The moving member performs a translational motion in which the acceleration thereof in the positive direction and the acceleration thereof in the negative direction are asymmetric in one period.

1 Claim, 28 Drawing Sheets

U.S. PATENT DOCUMENTS

| | | |
|---|---|---|
| 6,933,629 B2 | 8/2005 | Qiu et al. |
| 7,151,348 B1 | 12/2006 | Ueda et al. |
| 7,569,952 B1 | 8/2009 | Bono et al. |

FOREIGN PATENT DOCUMENTS

| | | |
|---|---|---|
| JP | 8-308201 | 11/1996 |
| JP | 10-296187 | 11/1998 |
| JP | 10-329926 | 12/1998 |
| JP | 2000-354829 | 12/2000 |
| JP | 2002-346225 | 12/2002 |
| JP | 2004-67360 | 3/2004 |
| JP | 2005-59979 | 3/2005 |
| JP | 2006-65665 | 3/2006 |

OTHER PUBLICATIONS

Oyama et al., "New Sensation and Perception Psychology Handbook," Seishinshobo Publishers Co., Ltd., pp. 1184-1185, 1994 (with partial English translation).

* cited by examiner

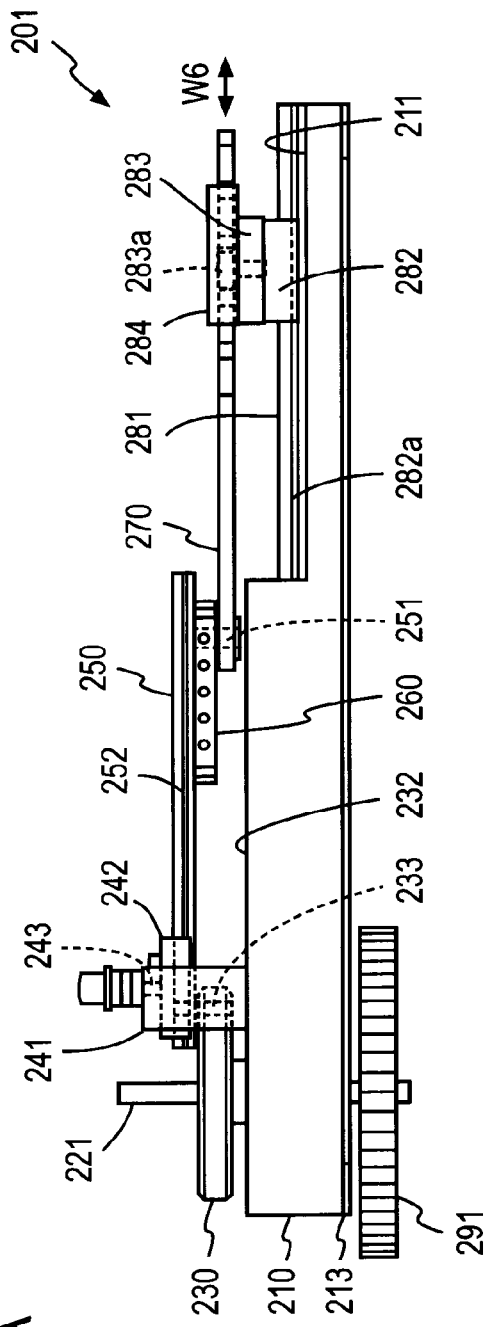
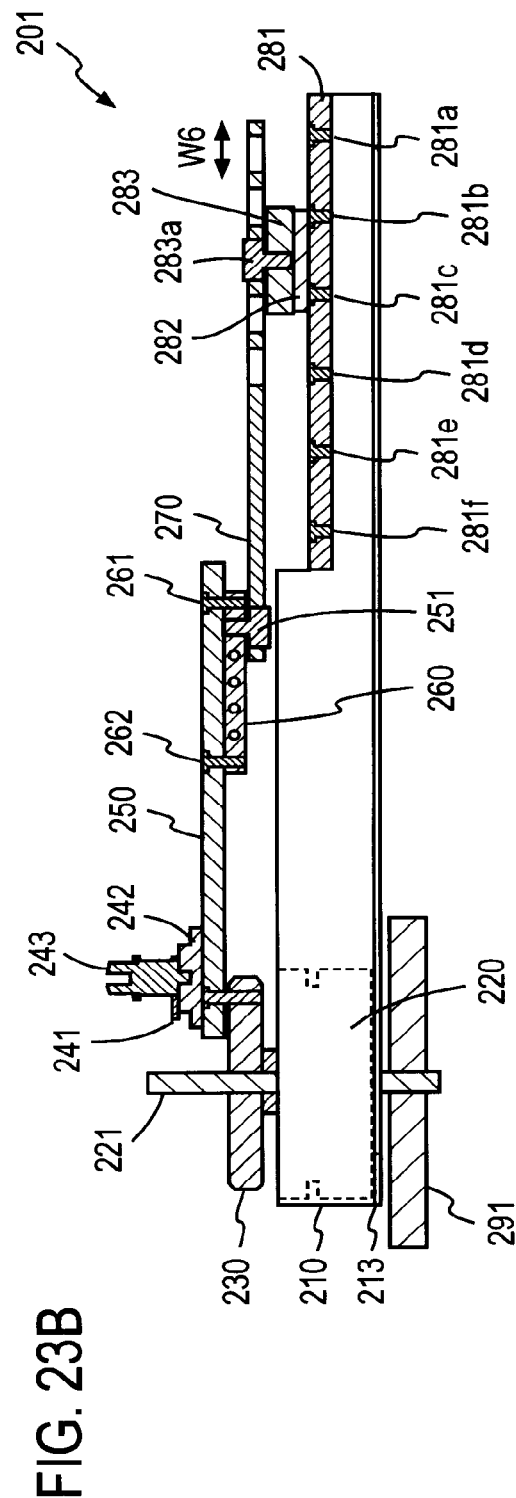
FIG. 23A
FIG. 23B

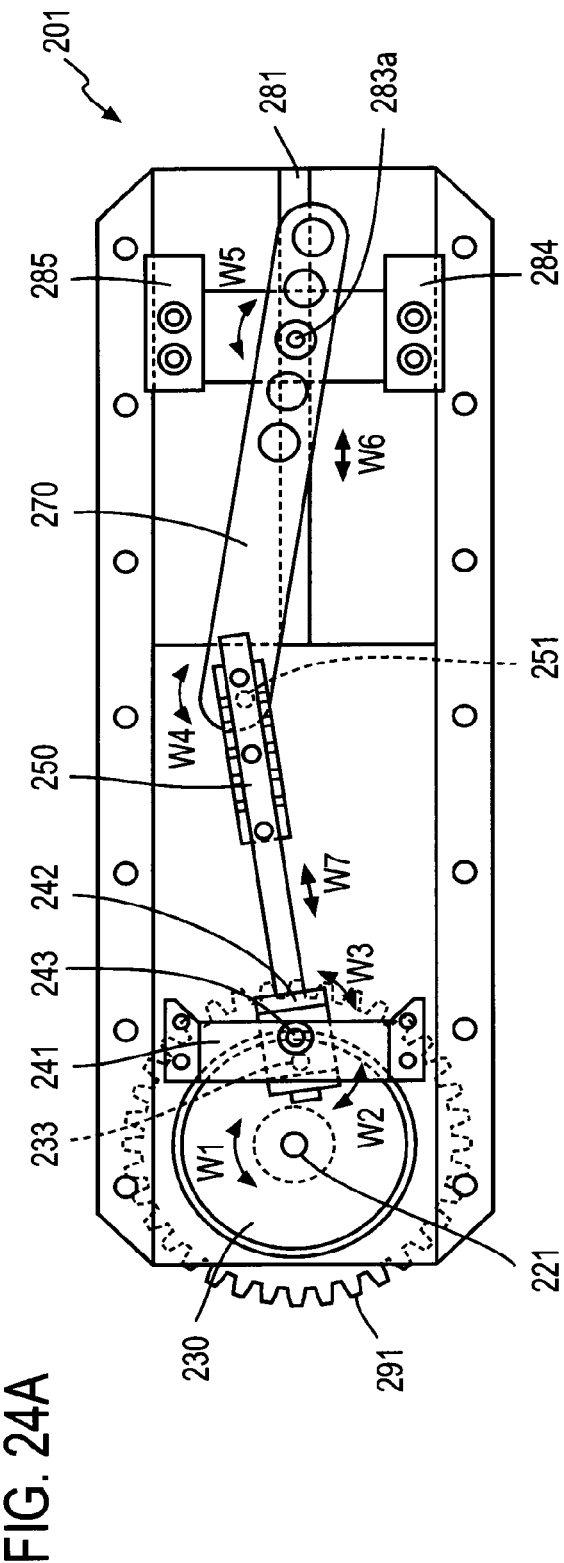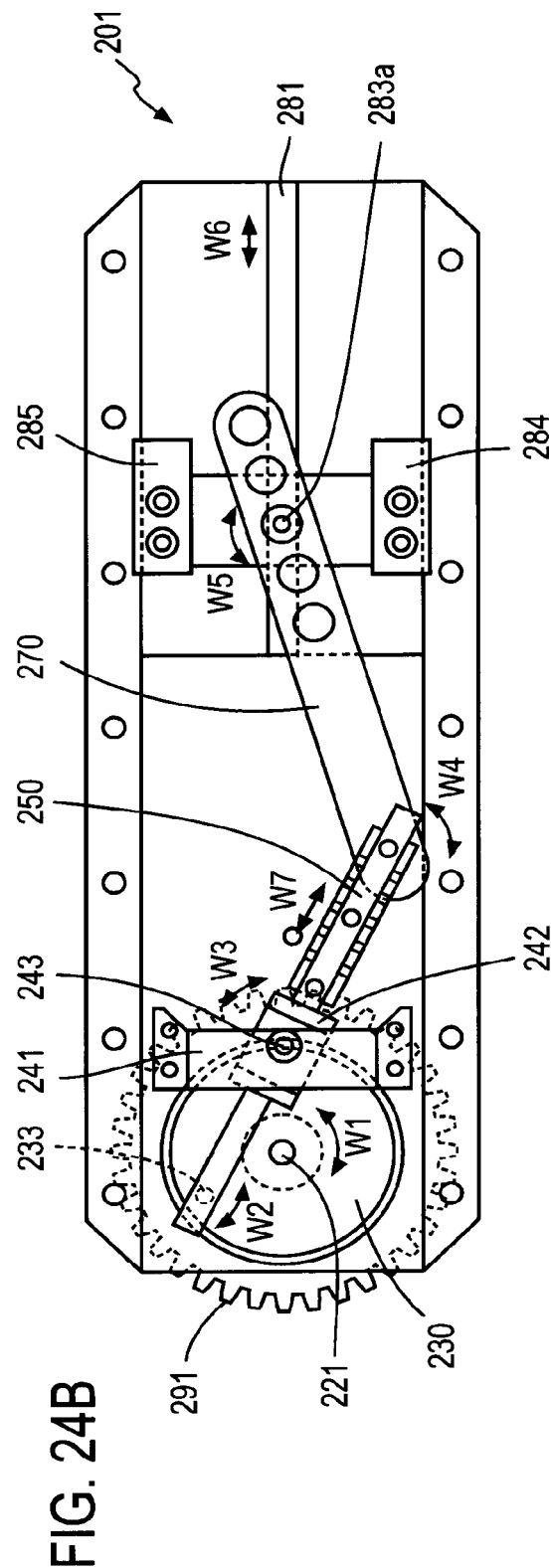

| | | FREQUENCY [Hz] | | | | | | |
|---|---|---|---|---|---|---|---|---|
| | | 5 | 6 | 7 | 8 | 9 | 10 | 11 |
| SUBJECT | GT | 100 | 100 | 100 | 100 | 100 | 100 | 100 |
| | TK | 70 | 60 | 50 | 90 | 90 | 90 | 100 |
| | HA | 100 | 60 | 90 | 100 | 100 | 100 | 100 |
| | IT | 70 | 90 | 70 | 60 | 90 | 100 | 80 |
| | JW | 50 | 60 | 80 | 70 | 70 | 80 | 80 |

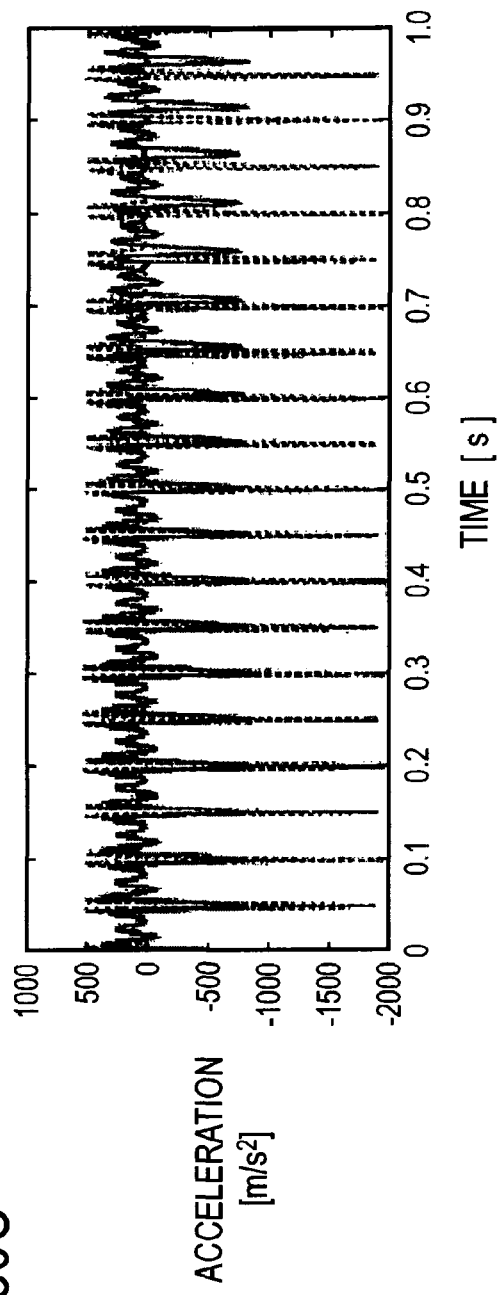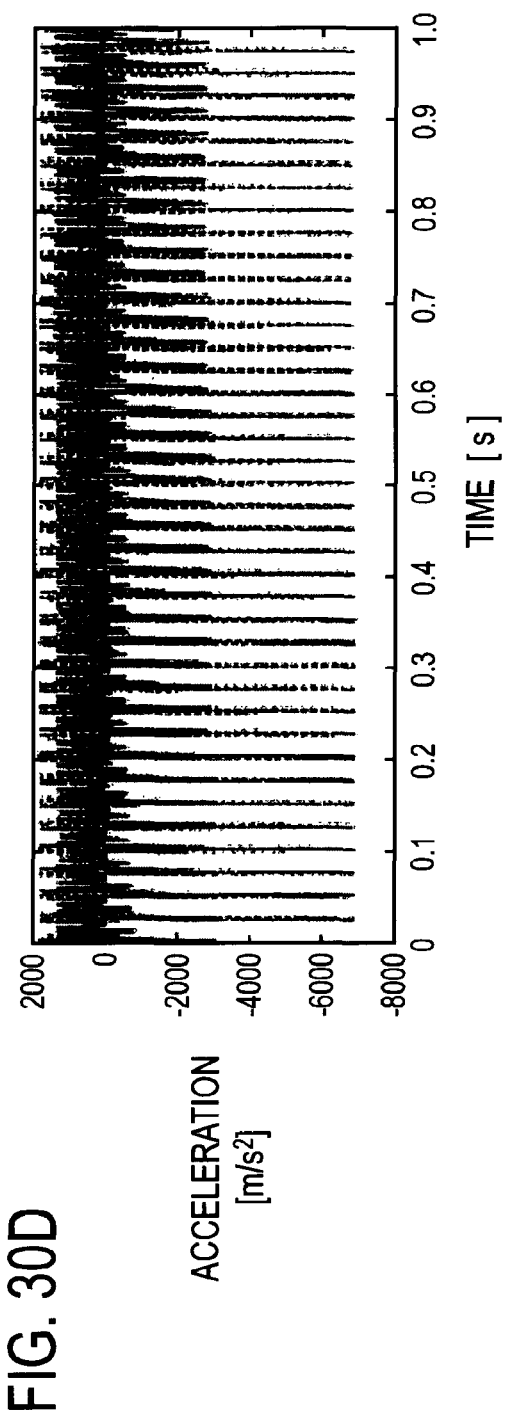

ACCELERATION GENERATOR AND PSEUDO FORCE SENSE GENERATOR

CROSS-REFERENCE TO RELATED APPLICATIONS

The present application is a divisional application of and claims the benefit of priority under 35 U.S.C. §120 from U.S. application Ser. No. 11/813,549, filed Jul. 9, 2007, the entire contents of which is incorporated herein by reference. U.S. application Ser. No. 11/813,549 is a national stage of International Application No. PCT/JP2007/051088, filed Jan. 24, 2007, which is based upon and claims the benefit of priority under 35 U.S.C. §119 from prior Japanese Patent Application No. 2006-014655, filed Jan. 24, 2006.

TECHNICAL FIELD

The present invention relates to a technique of making a user sense a force on a hand or the like. In particular, it relates to an apparatus that makes a person sense a force without a supporting point of a reaction force or a point of application of force outside of the apparatus or on the body of the person while keeping the average physical force at zero.

BACKGROUND ART

We live in the information-intensive society. However, our information handling capacity is limited. Conventionally, most information presentation systems rely on visual or audio means. Such information presentation relying on visual or audio means has a problem that, since visual or audio information is intensively provided, the user's attention is excessively focused to that information. Furthermore, when a person receives a visual or audio stimulus, the person's brain has to interpret the stimulus before reflecting it in the person's action. Therefore, there is also a problem that it takes relatively long for the person to act in response to reception of the information.

To solve such problems, as an information presentation channel other than the visual or audio channel, a force sense channel, such as sense of a force exerted on a hand, is being developed.

Conventional researches on the force sense can be classified into two types: the grounded type and the ungrounded type. The grounded type involves a supporting point of a reaction force of a force to be generated or a point of application of force fixed outside or on a human body. The ungrounded type does not involve such a supporting point or a point of application of force (see the non-patent literature 1 and the patent literature 1, for example).

However, conventional force sense generating methods have a problem that those methods are difficult to apply to portable devices, such as mobile devices and wearable computers.

For example, the grounded type that involves a supporting point or a point of application of force fixed outside is difficult to apply to a mobile device or wearable computer, which is intended to be carried arbitrarily. In the case of the grounded type that involves a supporting point or a point of application of force fixed on a site of the body of a person other than the point of action of force, the reaction force of the sensed force is also exerted on the body of the person, and as a result, it is difficult to provide accurate information about the direction of the force. The art described in the patent literature 1 "IMPULSIVE FORCE GENERATOR, ITS CONTROLLER, CONTROLLING METHOD AND PROGRAM" is intended to solve the problem described above by using the reaction of an abrupt moment force. However, according to this art, only the force sense of an impulsive force can be provided, and it is difficult to provide a temporally stable force sense.

The inventor of the present application has proposed a method of making a person sense a temporally stable force without a supporting point of a reaction force or a point of application of force (see Japanese Patent Application Laid Open No. 2006-065665, which had not yet been published at the priority date of the present application). According to this method, a rotational motive force is transmitted to a link mechanism or the like to generate an acceleration that substantially varies in absolute value depending on whether the acceleration is a positive acceleration or a negative acceleration.

Non-patent literature 1: Naoyuki Kakehi, Hiroaki Yano, Makoto Saito, Tetsuro Ogi, Michitaka Hirose, "Development and Evaluation of Force Display Device HapticGEAR in Immersive Virtual Space", Journal of Virtual Reality Society of Japan, VOL. 5, No. 4, pp.1113-1120, 2000

Patent literature 1: Japanese Patent Application Laid-Open No. 2002-346225

DISCLOSURE OF THE INVENTION

Problems to be Solved by the Invention

However, the method that uses a link mechanism or a non-circular gear mechanism described in Japanese Patent Application Laid-Open No. 2006-065665 has a problem that, when the rotational motive force is transmitted to the link mechanism or the like, a force vector occurs in a direction other than the direction in which the force sense is to be provided. The force vector is sensed as a vibration in the direction other than the direction in which the force sense is to be provided and causes a degradation of the force sense provision capability.

The present invention has been devised in view of such circumstances. An object of the present invention is to provide a technique of making a person sense a temporally stable force without a supporting point of a reaction force or a point of application of force outside or on the body of the person and of making a person more clearly sense a temporally stable force by suppressing occurrence of a force vector in any direction other than the direction in which the force sense is to be provided.

Means to Solve the Problems

In order to attain the object described above, according to a first aspect of the present invention, there is provided an acceleration generator, comprising: a moving member that performs a periodic translational motion along a particular straight line; a first operating part that generates a first force in a direction parallel to the particular straight line and applies the first force to the moving member in the direction parallel to the particular straight line; and a second operating part that generates a second force in a direction parallel to the particular straight line and applies the second force to the moving member in the direction parallel to the particular straight line, in which the magnitude of the first force varies with the relative position of the moving member with respect to the supporting point of the first operating part, the magnitude of the second force varies with the relative position of the moving member with respect to the supporting point of the second operating part, and supposing that one of the directions parallel to the particular straight line is a positive direction, and the direction opposite to the positive direction is a negative direction, the moving member performs a translational motion in which the temporal change of the acceleration of the moving member in one period is asymmetric and varies depending on whether the acceleration occurs in the positive direction or the negative direction.

In general, in order to generate a physically complete force, a supporting force of the reaction force and a point of application of the force are necessary. However, according to the present invention, neither such a supporting point nor a point of application of force is provided, and the average physical force is kept at 0. Nevertheless, the moving member according to the present invention performs a translational motion in which the acceleration in the positive direction and the acceleration in the negative direction are asymmetric in one period. And, based on the difference between the absolute values of the positive and negative accelerations of the moving member, the difference in duration of action of the force, and the non-linearity of the force sense perception of humans, a pseudo force sense is provided in the intended direction along the particular straight line (described in detail later). Furthermore, according to the present invention, the first operating part and the second operating part cause the translational motion of the moving member by applying a force to the moving member in parallel with the particular straight line. In this process, the first operating part and the second operating part generate no acceleration in the directions other than the directions parallel to the particular straight line. Thus, occurrence of a force vector in the directions other than the directions of the particular straight line can be suppressed. Here, the term "parallel" used in the present invention does not mean "parallel" in a strict sense but mean "approximately parallel", which includes a certain allowance that does not interfere with the object of the present invention.

In the first aspect of the present invention, the ratio between the magnitude of the first force and the magnitude of the second force varies with the relative positions of the moving member with respect to the supporting point of the first operating part and the supporting point of the second operating part. As a result, the moving member performs a translational motion in which the acceleration in the positive direction and the acceleration in the negative direction are asymmetric in one period.

In addition, in the first aspect of the present invention, the ratio of the change in perceptual response of a living body to the change in acceleration differs between the point of the maximum value of the acceleration of the moving member in the positive direction and the point of the maximum value of the absolute value of the acceleration in the negative direction. As a result, it is possible to make a person sense a temporally stable force without a supporting point of a reaction force or a point of application of force.

The translational motion of the moving member is a motion in which the maximum value of the absolute value of the acceleration in the positive direction and the maximum value of the acceleration in the negative direction differs from each other, and the duration of the acceleration in the direction in which the greater maximum value is provided is shorter than the duration of the acceleration in the direction in which the smaller maximum value is provided. In addition, the moving member performs a translational motion in which the slope of a sigmoid curve that expresses the relationship between the acceleration of the moving member and the acceleration sensed by a human body when the acceleration of the moving member is exerted to the human body differs between the point of the maximum value of the acceleration in the positive direction and the point of the maximum value of the acceleration in the negative direction of the moving member. Based on the difference of the absolute values of the positive and negative accelerations of the moving member, the duration of action of the force, and the non-linearity of the force sense perception of humans, the pseudo force sense in the intended directions along the particular straight line can be provided (described in detail later).

In addition, in the first aspect of the present invention, preferably, at least one of the first operating part and the second operating part is configured to apply the force to the moving member using a elastic force of a spring, and the acceleration generator further comprises a spring constant regulator that changes the spring constant of the spring. The term "spring" does not exclusively mean coil springs, plate springs and the like made of metal but means various elastic bodies including those made of rubber or synthetic resin, air springs and liquid springs.

At least one of the first force applied to the moving member by the first operating part and the second force applied to the moving member by the second operating part can be changed by the spring constant regulator changing the spring constant described above. Thus, the period and the amplitude of the translation motion of the moving member can be changed, and the acceleration of the moving member can be adjusted. This adjustment can be performed not only before the acceleration generator is activated but also when the moving member is in translational motion.

In addition, preferably, the acceleration generator according to the first aspect of the present invention further comprises a frame, the particular straight line is a straight line determined with reference to the frame, the moving member has a first permanent magnet that performs a periodic translational motion along the particular straight line, the first operating part is a elastic body that is fixed to the frame at the supporting point thereof and to the moving member at the other end thereof and makes the moving member perform a vibrational motion along the particular straight line, and the second operating part is a second permanent magnet that is disposed on a position on the particular straight line and fixed to the frame at the supporting point thereof. In this way, an arrangement according to the first aspect of the present invention can be provided.

In addition, preferably, the acceleration generator according to the first aspect of the present invention further comprises a frame, the particular straight line is a straight line determined with reference to the frame, the first operating part has: a first iron core disposed on the particular straight line; and a first elastic body that is fixed to the frame at the supporting point thereof and to the first iron core at the other end thereof and makes the first iron core perform a vibrational motion along the particular straight line, the second operating part has: a second iron core disposed on the particular straight line; and a second elastic body that is fixed to the frame at the supporting point thereof and to the second iron core at the other end thereof and makes the second iron core perform a vibrational motion along the particular straight line, and the moving member performs a translational motion between the first iron core and the second iron core along the particular straight line. In this way, an arrangement according to the first aspect of the present invention can be provided.

In this arrangement, more preferably, at least one of the first elastic body and the second elastic body is a spring, and the acceleration generator further comprises a spring constant regulator that fixes the position of any part of the at least one of the first elastic body and the second elastic body, which is a spring, with respect to the frame. Alternatively, at least one of the first elastic body and the second elastic body may be a conductive spring, and the acceleration generator may further comprise a spring constant regulator, which is a power supply that applies a voltage to the at least one of the first elastic body and the second elastic body, which is a spring. If a voltage is applied to the spring, the spring generates heat according to the electric resistance thereof. As a result, the spring constant of the spring changes. As a result, the period and the amplitude of the translation motion of the moving member can be changed, and the acceleration of the moving member can be adjusted. This adjustment can be performed not only before the acceleration generator is activated but also when the moving member is in translational motion.

Furthermore, preferably, the acceleration generator according to the first aspect of the present invention further comprises: a frame; and a movable part the relative position of which with respect to the frame in the directions of the particular straight line can be changed, the first operating part is configured to be supported on the frame to apply the first force to the moving member, and the second operating part is configured to be supported on the movable part to apply the second force to the moving member.

If the relative position of the movable part with respect to the frame is changed in the directions along the particular straight line, the relative position of the moving member with respect to at least one of the first operating part and the second operating part changes inevitably. As a result, the resultant force of the first force and the second force applied to the moving member can be changed, and the period and the amplitude of the translational motion of the moving member can be changed. In other words, the acceleration of the moving member can be easily adjusted simply by changing the relative position of the movable part with respect to the frame. In addition, this adjustment can be performed not only before the acceleration generator is activated but also when the moving member is in translational motion.

Furthermore, in order to attain the object described above, a pseudo force sense generator according to a second aspect of the present invention comprises two or more acceleration generators according to the first aspect of the present invention. Thus, the accelerations generated by the acceleration generators can be combined to provide an arbitrary asymmetric acceleration in a two-dimensional or three-dimensional space.

In addition, preferably, in the pseudo force sense generator according to the second aspect of the present invention, the predetermined number of the acceleration generators constituting the pseudo force sense generator are activated, the total sum of the force vectors generated by the acceleration generators is zero at all times. As a result, depending on which pseudo force sense generator(s) is/are activated, the pseudo force sense generator can be controlled to generate a force sense in an arbitrary direction or no force sense in all the directions.

In addition, preferably, the pseudo force sense generator according to the second aspect of the present invention further comprises a position adjuster that changes the positional relationship among the two or more acceleration generators constituting the pseudo force sense generator. In this pseudo force sense generator, when the two or more acceleration generators constituting the pseudo force sense generator are in a predetermined positional relationship, the total sum of the force vectors generated by the acceleration generators is zero at all times, and when the two or more acceleration generators constituting the pseudo force sense generator are in another positional relationship, the total sum of the force vectors generated by the acceleration generators is a value other than zero at least at a certain time. As a result, the pseudo force sense generator can be controlled to generate a force sense in an arbitrary direction or no force sense in all the directions by changing the positional relationship among the acceleration generators constituting the pseudo force sense generator using the position adjuster.

Furthermore, in order to attain the object described above, according to a third aspect of the present invention, there is provided a pseudo force sense generator, comprising: a rotary input shaft to which a rotational motive force is applied; a motive force transmitter that converts the rotational motive force applied to the rotary input shaft into a periodic translational motion along a particular straight line; a moving member that performs a periodic translational motion along the particular straight line by the motive force transmitted by the motive force transmitter; and a symmetric part that is configured to be symmetric to the motive force transmitter with respect to the particular straight line, in which supposing that one of the directions parallel to the particular straight line is a positive direction, and the direction opposite to the positive direction is a negative direction, the moving member performs a translational motion in which the temporal change of the acceleration of the moving member in one period is asymmetric and varies depending on whether the acceleration occurs in the positive direction or the negative direction, and the total sum of the force vectors generated by the motive force transmitter and the symmetric part is zero, at all times, in the directions except the directions parallel to the particular straight line. Thus, occurrence of a force vector in any direction other than the direction in which the force sense is to be provided can be suppressed.

Effects of the Invention

As described above, according to the present invention, it is possible to make a person sense a temporally stable force without a supporting point of a reaction force or a point of application of force provided outside or on the body of the person and to make a person more clearly sense a temporally stable force by suppressing occurrence of a force vector in any direction other than the direction in which the force sense is to be provided.

BRIEF DESCRIPTION OF THE DRAWINGS

FIG. 23A is a front view of the acceleration generator viewed from the W0 direction in FIG. 22;

FIG. 23B is a cross-sectional view taken along the line 23A-23A in FIG. 22;

FIGS. 24A and 24B are diagrams illustrating the movements of the mechanisms of the acceleration generator at the time when a rotary input shaft rotates in the W1 direction by the action of a motor;

FIGS. 30C and 30D are graphs showing the acceleration of the weight 284 in the cases where the rotational frequency of the motor is 30 Hz and 40 Hz, respectively;

Figure 1A:
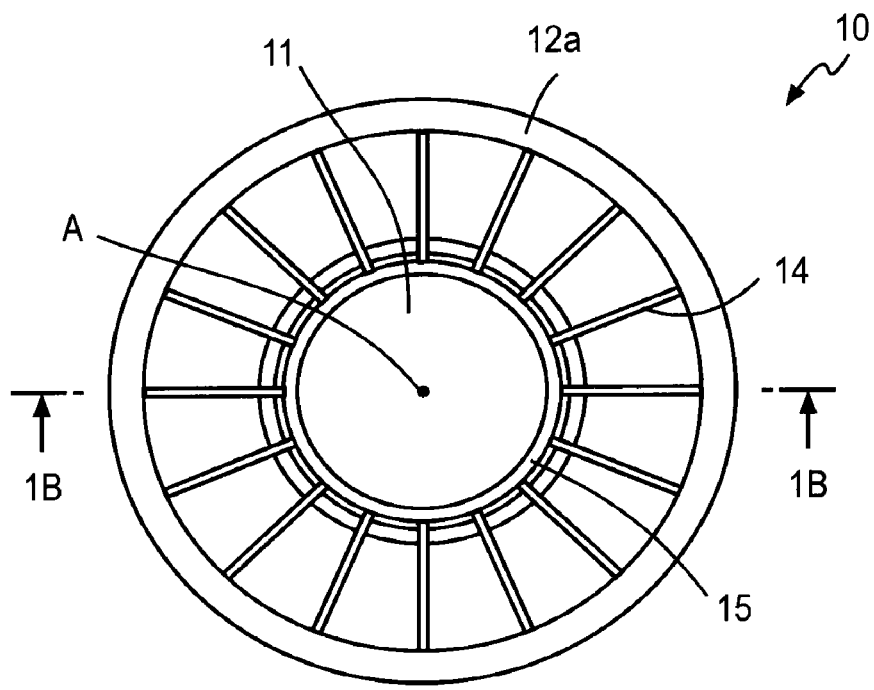
FIG. 1A is a top view showing a configuration of an acceleration generator according to a first embodiment.

DESCRIPTION OF REFERENCE NUMERALS 10, 40, 50, 60, 91 to 94, 110, 201 acceleration generator
100, 130, 300 pseudo force sense generator

BEST MODES FOR CARRYING OUT THE INVENTION

In the following, embodiments of the present invention will be described with reference to the drawings.

[Principle]

First, there will be described a principle of making a person sense a temporally stable force without a supporting point of a reaction force or a point of application of force. Consider a translational motion of an object having a certain mass. It is supposed that this translational motion is a periodic motion that involves asymmetric acceleration, in which the object moves with a higher acceleration in a shorter time in the direction to provide a pseudo force sense and moves with a lower acceleration in a longer time in the opposite direction. In this case, the user holding the system including the object senses a pseudo force in the pseudo force sense providing direction. This is based on the perception characteristics of humans and is provided by the proprioception sensation involved with the holding action and the tactile sensation. Specifically, the reflex characteristics of the muscle spindle (a sense organ in the skeletal muscle for sensing a contraction of a muscle) include the dynamic response, which occurs strongly when the length of the muscle changes, and the static response, which continuously emits impulses when the expanded muscle is kept at a certain length. The dynamic response occurs strongly when the change in muscle length is relatively small and occurs in a short time (see Tadasu Oyama, Syogo Imai, Tenji Wake, "New Sensation and Perception Psychology Handbook", Seishinshobo Publishers Co., Ltd., 1994, for example). As known, in general, such a perceptual response can be approximated to a sigmoid curve shown in FIG. 27. In this drawing, the abscissa indicates the physical acceleration applied to a human body, and the ordinate indicates the acceleration sensed by the human body (the perceptual response) when the acceleration is applied to the human body. For a physical periodic motion, the integral of the acceleration over one period is 0. However, the similar integral for the perceptual response indicated by the sigmoid curve is not always 0. For example, in FIG. 27, in a range $f_1(x)$, the change in acceleration, that is, the difference of the differential value $(f_1'(a+k)-f_1'(a))$ is greater than the difference of the sensed value. To the contrary, in a range $f_2(x)$, the change in acceleration, that is, the difference of the differential value $(f_1'(b+k)-f_1'(b))$ is smaller than the difference of the sensed value. This means that the sensed change in physical acceleration can be smaller or greater than the actual change depending on the magnitude of the acceleration. This means also that a pseudo force sense can be generated using the difference in sensory intensity.

Furthermore, at the interface between a skin and a moving object, the translational force that causes a translational motion of the object may exceed the force of static friction at a certain acceleration, thereby causing sliding of the object according to the difference between the coefficient of kinetic friction and the coefficient of static friction. Thus, a pseudo force sense can be generated by applying a great acceleration to the object in the direction in which the pseudo force sense is to be provided, thereby causing sliding of the object in that direction.

First Embodiment

Figure 1B:
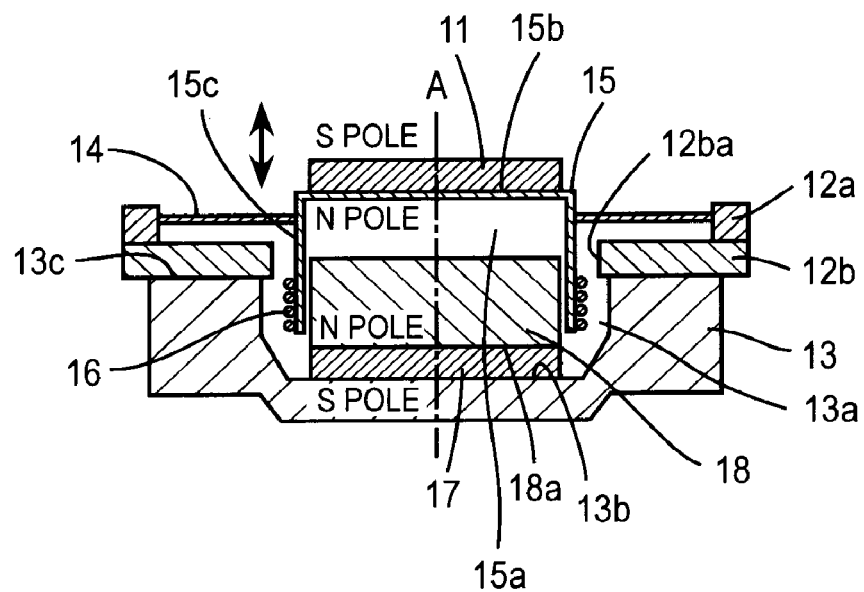
FIG. 1B is a cross-sectional view taken along the line 1B-1B in FIG. 1A.

First, a first embodiment of the present invention will be described.
<Configuration>
FIG. 1A is a top view of an acceleration generator 10 according to the first embodiment. FIG. 1B is a cross-sectional view taken along the line 1B-1B in FIG. 1A.

As shown in FIG. 1, the acceleration generator 10 according to this embodiment comprises disk-shaped permanent magnets 11 and 17 (which correspond to a "first permanent magnet" and a "second permanent magnet") that have opposite magnetic polarities on the front surface and the back surface, a ring-shaped frame 12a, an annular-disk-shaped frame base 12b, a circular-cup-shaped yoke 13 having a recess 13a at the center thereof, a plurality of center suspensions 14 (which correspond to elastic bodies) that are elastic threads made of a special fiber, such as polypropylene, a bobbin (insulating material) 15 that has the shape of a cylinder with one end (end 15b) closed, a coil 16 of a conductor, such as a copper wire, covered with an insulator, and a columnar yoke 18.

The permanent magnet 17 is fixed to a bottom surface 13b of the recess 13a of the yoke 13. According to this embodiment, the N-pole surface of the permanent magnet 17 is fixed to the bottom surface 13b. The S-pole surface of the permanent magnet 17 (which is the surface opposite to the bottom surface 13b and corresponds to a "supporting point") is fixed to a bottom surface 18a of the yoke 18. Thus, the supporting point of the yoke 18 is fixed with respect to the frame 12a.

Furthermore, the frame base 12b is fixed to a front surface 13c of the yoke 13. A hollow part 12ba of the frame base 12b is disposed at the opening of the recess 13a. The frame 12a is fixed to the surface of the frame base 12b opposite to the yoke 13 along the edge thereof. The plurality of center suspensions 14 are fixed to the inner circumference of the frame 12a at one ends thereof (which correspond to the "supporting points") at regular intervals, and the other ends of the center suspensions 14 are fixed to a circumferential side surface 15c of the bobbin 15, which is a "moving member", at regular intervals. Thus, the bobbin 15 is supported at a position inside the frame 12a by the tensile force of the center suspensions 14. Furthermore, at least a part of the yoke 18 is disposed in the opening of an interior 15a of the bobbin 15. The outer diameter of the yoke 18 is smaller than the inner diameter of the bobbin 15. In addition, the coil 16 is wound around the side surface 15c of the bobbin 15 in a certain circumferential direction. Furthermore, the permanent magnet 11 is fixed to the outer surface of the end 15b of the bobbin 15. In this embodiment, the S-pole surface of the permanent magnet 11 is fixed to the outer surface of the end 15b. The central axes of the permanent magnets 11 and 17, the central axis of the bottom surface 13b of the yoke 13, the central axis of the end 15b of the bobbin 15 and the central axis of the yoke 18 are disposed on substantially the same straight line A (which corresponds to a "particular straight line") that is determined with reference to the frame 12a.
<Operation>
With the configuration described above, the bobbin 15 is disposed at a position where the Coulomb force between the permanent magnets 11 and 17 (a repulsive force because the S-pole surfaces face to each other), the tension of the center suspensions 14 and the gravitational force balance each other (referred to as "origin position"). Then, if a sine wave alternating current is applied to the coil 16, a magnetic field responsive to the direction of the current is generated (the Fleming's left-hand rule), and the bobbin 15 and the permanent magnet 11 (which correspond to the "moving member") perform a periodic translational motion along the straight line A.

When the bobbin 15 and the permanent magnet 11 are displaced from the origin position, a resultant force (which corresponds to a "first force") of the tensions of the center suspensions 14 (which correspond to a "first operating part"), which are elastic bodies, occurs in a direction parallel to the straight line A. The resultant force is applied to the bobbin 15 and the permanent magnet 11 in the direction parallel to the straight line A. And, the magnitude of the resultant force varies with the relative position of the bobbin 15 and the permanent magnet 11 with respect to the supporting points of the center suspensions 14. The Coulomb force (which corresponds to a "second force") between the permanent magnet 17 (which corresponds to a "second operating part") and the permanent magnet 11 occurs in the directions parallel to the straight line A and is applied to the permanent magnet 11 in one direction parallel to the straight line A. The magnitude of the Coulomb force varies with the relative position of the bobbin 15 and the permanent magnet 11 with respect to the supporting point of the permanent magnet 17. In other words, the ratio between the magnitudes of the "first force" and the "second force" described above varies with the relative positions of the supporting points of the center suspensions 14, the permanent magnet 17 that serves as the supporting point of the yoke 18, and the bobbin 15 and the permanent magnet 11. Thus, the bobbin 15 and the permanent magnet 11 perform a translational motion in which the acceleration in the positive direction (the upward direction parallel to the straight line A in FIG. 1B) and the acceleration in the negative direction (the downward direction parallel to the straight line A in FIG. 1B) are asymmetric in one period. In other words, the bobbin 15 and the permanent magnet 11 perform a translational motion in which the temporal change in acceleration in one period varies depending on whether the acceleration occurs in the positive direction or in the negative direction. More specifically, the bobbin 15 and the permanent magnet 11 according to this embodiment perform a translational motion in which the maximum of the absolute value of the acceleration in the positive direction and the maximum of the acceleration in the negative direction differ from each other, and the duration of the acceleration in the direction in which the greater maximum value is provided is shorter than the duration of the acceleration in the direction in which the smaller maximum value is provided.

This can be approximated to the following equations of motion ignoring the gravitational force and the Coulomb force of the coil 16.

$$mx'' = -k(x-x_0) + M/x^2 \quad (1)$$

$$M = m_1 m_2 / (4\pi\mu) \quad (2)$$

In this embodiment, reference character k denotes the spring constant of the center suspensions 14, reference character m denotes the total mass of the bobbin 15 and the permanent magnet 11, reference character $x_0$ denotes the distance between the permanent magnet 11 and the permanent magnet 17 at the time when the bobbin 15 and the permanent magnet 11 are located at the "origin position", reference character x denotes the distance between the permanent magnet 11 and the permanent magnet 17, and reference character x" denotes the second-order differential of the distance x (acceleration). In addition, reference character M denotes the constant of proportionality of the magnetic charge repulsive force between the permanent magnet 11 and the permanent magnet 17, reference characters $m_1$ and $m_2$ denote the quantities of magnetism of the permanent magnet 11 and the permanent magnet 17, respectively, and reference character μ denotes the magnetic permeability.

Figure 2A:
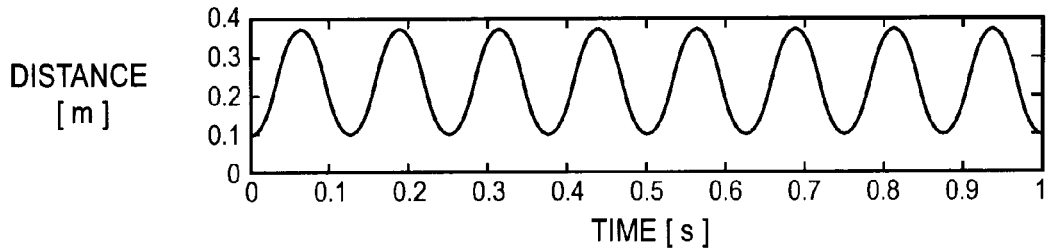
FIGS. 2A to 2C are graphs showing the behavior of the acceleration generator.
Figure 2B:
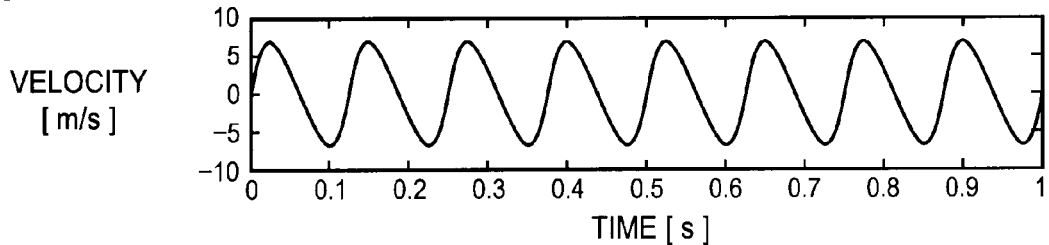
Figure 2C:
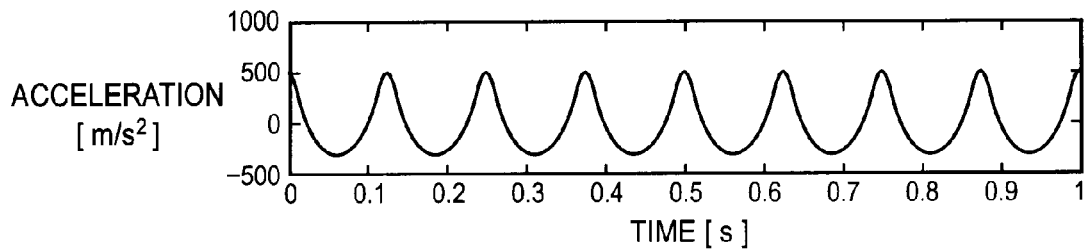

FIG. 2 includes graphs for illustrating the behavior of the acceleration generator 10 in the case where m=0.04 [kg], k=50 [N/m], M=0.2 [N/m$^2$], $x_0$=130*10$^{-3}$ [m], x'(0) (initial velocity of the bobbin 15 and the permanent magnet 11)=0 [m/s], and x(0) (initial value of the distance between the permanent magnet 11 and the permanent magnet 17)=100*10$^{-3}$ [m]. FIG. 2A is a graph showing a relationship between the time and the distance x, in which the ordinate indicates the distance x [m], and the abscissa indicates the time [s]. FIG. 2B is a graph showing a relationship between the time and the velocity x', in which the ordinate indicates the velocity x' [m/s], and the abscissa indicates the time [s]. FIG. 2C is a graph showing a relationship between the time and the acceleration x", in which the ordinate indicates the acceleration x" [m/s$^2$], and the abscissa indicates the time [s]. In FIGS. 2B and 2C, positive values mean the upward direction in FIG. 1B, and negative values mean the downward direction in FIG. 1B.

As shown in FIG. 2C, the bobbin 15 and the permanent magnet 11 perform a translational motion in which the acceleration in the positive direction and the acceleration in the negative direction are asymmetric with each other in one period. Specifically, while the maximum value of the acceleration in the positive direction is about 500 [m/s$^2$], the maximum value of the absolute value of the acceleration in the negative direction is about a half thereof. And, if the ratio of the change in perceptual response to the change in acceleration differs between the point of the maximum value of the acceleration in the positive direction and the point of the maximum value of the absolute value of the acceleration in the negative direction, or in other words, if the maximum value of the acceleration in the positive direction falls within the range $f_2(x)$ of the sigmoid curve shown in FIG. 27, and the maximum value of the absolute value of the acceleration in the negative direction falls within the range $f_1(x)$, the pseudo force sense described above occurs. In other words, if the bobbin 15 and the permanent magnet 11, which serve as the "moving member", perform a translational motion in which the slope of the sigmoid curve described above differs between the point of the maximum value of the acceleration of the moving member in the positive direction and the point of the maximum value of the acceleration thereof in the negative direction, the pseudo force sense described above occurs.

Characteristics of this Embodiment

As described above, according to this embodiment, it is possible to make a person sense a temporally stable force without a supporting point of a reaction force or a point of application of force.

Furthermore, the acceleration generator 10 provides a pseudo force sense in the directions along the straight line A only by a linear simple harmonic motion in the A directions. Therefore, substantially no force vector occurs in all the directions except the directions along the straight line A. As a result, it is possible to make a person more clearly sense a temporally stable force.

Furthermore, the acceleration generator 10 is configured to continue the translational motion permanently, if there is not any loss, such as friction, and the energy is completely conserved. Therefore, the amount of the alternating current supplied to the coil 16 is sufficient if the alternating current can compensate for such a loss. That is, the pseudo force sense described above can be generated at a low power consumption. The alternating current supplied to the coil 16 is controlled in the same manner as a typical resonant drive circuit, for example. For example, the induced electromotive force generated in the coil 16 is detected, and the velocity of the bobbin 15 and the permanent magnet 11 is calculated from the induced electromotive force, and the alternating current supplied to the coil 16 is controlled so that the velocity is adjusted to a specified value.

Furthermore, the acceleration generator 10 directly generates the motive force in the directions of the translational motion (the directions along the straight line A) by supplying the alternating current to the coil 16, rather than generating a rotational motive force and then converting the rotational motive force into the translational motion. Therefore, any mechanism required to convert the rotational motive force into the translational motion is not necessary, so that the acceleration generator 10 can be reduced in size and weight. As a result, the acceleration generator 10 can be incorporated into an electronic device, such as a cellular phone, and the application thereof can be widened.

According to this embodiment, the acceleration generator 10 is composed of components whose cross sections taken along a plane perpendicular to the B-B cross section are circular, such as the disk-shaped permanent magnets 11 and 17, the ring-shaped frame 12a, the annular-disk-shaped frame base 12b, the circular-cup-shaped yoke 13 having the recess 13a at the center thereof, and the bobbin 15 having the shape of a cylinder with one end closed. However, the acceleration generator 10 may be composed of components having other cross sections, such as a polygonal cross section. Furthermore, the poles of the permanent magnets 11 and 17 may be inverted. According to this embodiment, the motive force in the directions of the translational motion (the directions along the straight line A) is generated by supplying an alternating current to the coil 16. However, a reciprocal motor or a shaft motor may be used to generate the motive force.

Second Embodiment

Now, a second embodiment of the present invention will be described.

According to the second embodiment, the elastic force of a spring and the Coulomb force between permanent magnets are used to cause a translational motion of a moving member, thereby generating a pseudo force sense. The second embodiment differs from the first embodiment only in the configuration therefor.

<Configuration>

Figure 3:
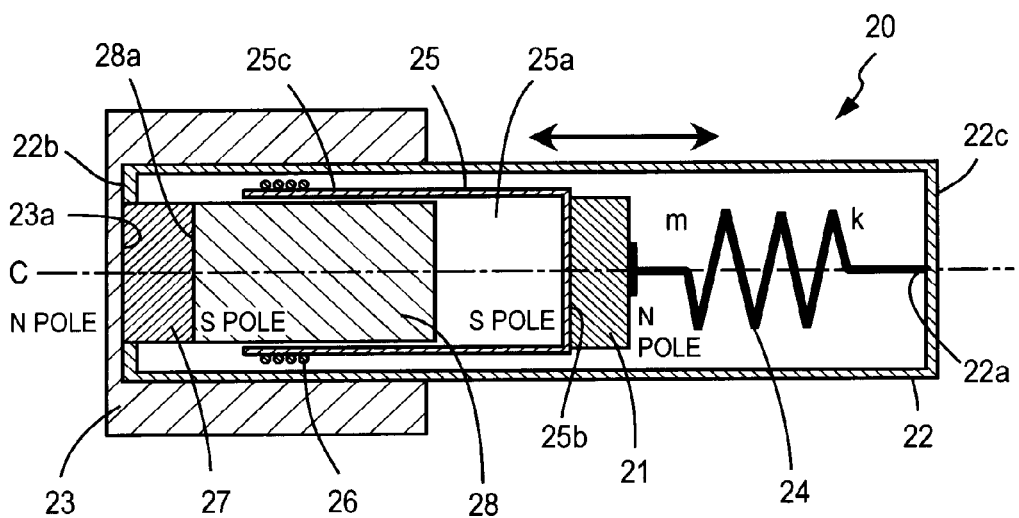
FIG. 3 is a cross-sectional view showing a configuration of an acceleration generator according to a second embodiment.

FIG. 3 is a cross sectional view of a configuration of an acceleration generator 20 according to the second embodiment.

As shown in FIG. 3, the acceleration generator 20 according to this embodiment comprises disk-shaped permanent magnets 21 and 27 (which correspond to a "first permanent magnet" and a "second permanent magnet") that have opposite magnetic polarities on the front surface and the back surface, a frame (insulating material) 22 having the shape of a cylinder with both the opposite ends closed, a cup-shaped yoke 23 having the shape of a cylinder with one end closed, a spring 24, which is a elastic body, a bobbin (insulating material) 25 having the shape of a cylinder with one end (end 25$b$) closed, a coil 26 of a conductor, such as a copper wire, covered with an insulator, and a columnar yoke 28.

A longitudinal end 22$b$ of the frame 22 and the permanent magnet 27 are fixed to an inner bottom surface 23$a$ of the yoke 23. According to this embodiment, the N-pole surface of the permanent magnet 27 (which corresponds to a "supporting point") is fixed to the bottom surface 23$a$. The S-pole surface of the permanent magnet 27 (which is the surface thereof opposite to the bottom surface 23$a$) is fixed to a bottom surface 28$a$ of the yoke 28. One end of the spring 24 is fixed to a supporting point 22$a$ on the inner surface of a longitudinal end 22$c$ of the frame 22 (the end opposite to the end 22$b$). The other end of the spring 24 is fixed to the permanent magnet 21. According to this embodiment, the N-pole surface of the permanent magnet 21 is fixed to the end of the spring 24. Furthermore, an end 25$b$ of the bobbin 25 is fixed to the other surface of the permanent magnet 21 (the S-pole surface in this embodiment). Furthermore, at least a part of the yoke 28 is disposed in the opening of an interior 25$a$ of the bobbin 25. The outer diameter of the yoke 28 is smaller than the inner diameter of the bobbin 25. In addition, the coil 26 is wound around a side surface 25$c$ of the bobbin 25 in a certain circumferential direction. The central axes of the permanent magnets 21 and 27, the central axis of the yoke 23, the supporting point 22$a$, the point at which the spring 24 is fixed to the permanent magnet 21, the central axis of the end 25$b$ of the bobbin 25 and the central axis of the yoke 28 are disposed on substantially the same straight line C (which corresponds to a "particular straight line") that is determined with reference to the frame 22$a$.

<Operation>

With the configuration described above, the bobbin 25 disposed at a position where the Coulomb force between the permanent magnets 21 and 27 (a repulsive force because the S-pole surfaces face to each other) and the elastic force of the spring 24 balance each other (referred to as "origin position"). Then, if a sine wave alternating current is applied to the coil 26, a magnetic field responsive to the direction of the current is generated, and the bobbin 25 and the permanent magnet 21 (which correspond to the "moving member") perform a periodic translational motion along the straight line C.

The elastic force (which corresponds to a "first force") of the spring 24 (which corresponds to a "first operating part") occurs in the directions parallel to the straight line C, so that the force is applied to the bobbin 25 and the permanent magnet 21 in the directions parallel to the straight line C. And, the magnitude of the force varies with the relative position of the bobbin 25 and the permanent magnet 21 with respect to the supporting point 22$a$ of the spring 24. The Coulomb force (which corresponds to a "second force") between the permanent magnet 27 (which corresponds to a "second operating part") and the permanent magnet 21 occurs in the directions parallel to the straight line C and thus is applied to the permanent magnet 21 in one direction parallel to the straight line C. The magnitude of the Coulomb force varies with the relative position of the bobbin 25 and the permanent magnet 21 with respect to the supporting point of the permanent magnet 27. In other words, the ratio between the magnitudes of the "first force" and the "second force" described above varies with the relative positions of the supporting point 22$a$ of the spring 24, the supporting point of the permanent magnet 27, and the bobbin 25 and the permanent magnet 21. Thus, the bobbin 25 and the permanent magnet 21 perform a translational motion in which the acceleration in the positive direction (the rightward direction parallel to the straight line C in FIG. 3) and the acceleration in the negative direction (the leftward direction parallel to the straight line C in FIG. 3) are asymmetric in one period. In other words, the bobbin 25 and the permanent magnet 21 perform a translational motion in which the temporal change in acceleration in one period varies depending on whether the acceleration occurs in the positive direction or in the negative direction. More specifically, the bobbin 25 and the permanent magnet 21 according to this embodiment perform a translational motion in which the maximum of the absolute value of the acceleration in the positive direction and the maximum of the acceleration in the negative direction differ from each other, and the duration of the acceleration in the direction in which the greater maximum value is provided is shorter than the duration of the acceleration in the direction in which the smaller maximum value is provided.

This can be approximated to the equations of motion (1) and (2) described above that ignore the gravitational force and the Coulomb force of the coil 26. However, in this embodiment, reference character k denotes the spring constant of the spring 24, reference character m denotes the total mass of the bobbin 25 and the permanent magnet 21, reference character $x_0$ denotes the distance between the permanent magnet 21 and the permanent magnet 27 at the time when the bobbin 25 and the permanent magnet 21 are located at the "origin position", reference character x denotes the distance between the permanent magnet 21 and the permanent magnet 27, and reference character x" denotes the second-order differential of the distance x (acceleration). In addition, reference character M denotes the constant of proportionality of the magnetic charge repulsive force between the permanent magnet 21 and the permanent magnet 27, reference characters $m_1$ and $m_2$ denote the quantities of magnetism of the permanent magnet 21 and the permanent magnet 27, respectively, and reference character µ denotes the magnetic permeability.

Figure 27:
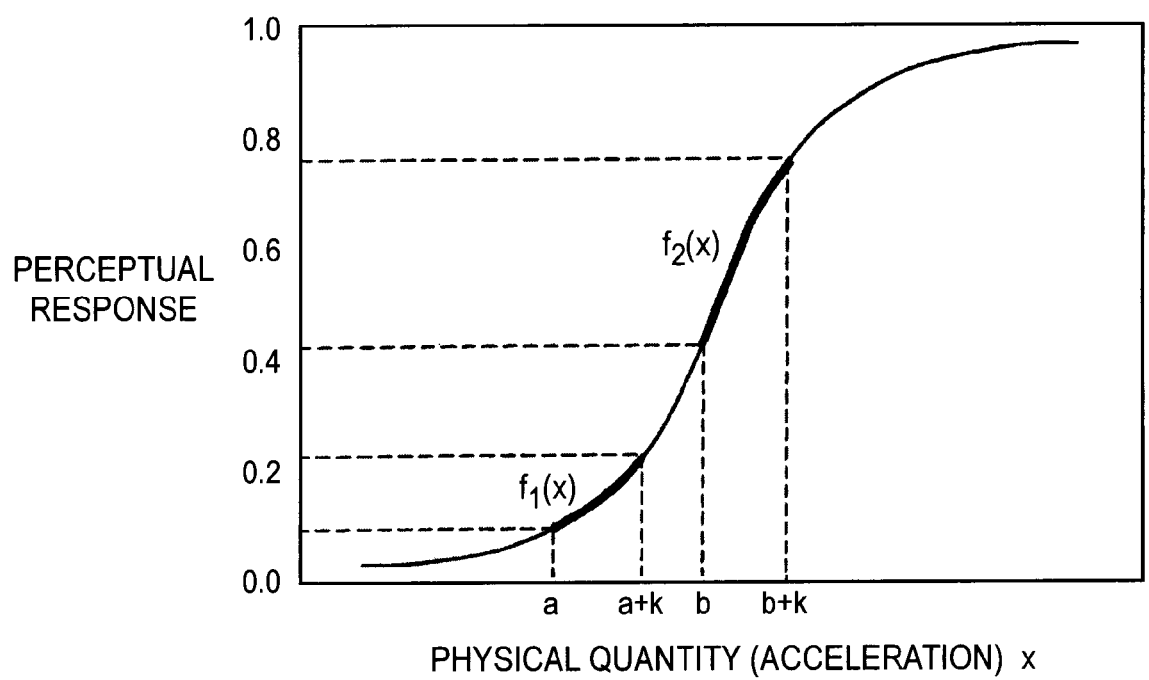
FIG. 27 is a graph showing an approximate sigmoid curve of a perceptual response.

If the ratio of the change in perceptual response to the change in acceleration differs between the point of the maximum value of the acceleration in the positive direction and the point of the maximum value of the absolute value of the acceleration in the negative direction, or in other words, if the maximum value of the acceleration in the positive direction falls within the range $f_2(x)$ of the sigmoid curve shown in FIG. 27, and the maximum value of the absolute value of the acceleration in the negative direction falls within the range $f_1(x)$, the pseudo force sense described above occurs. In other words, if the bobbin 25 and the permanent magnet 21, which serve as the "moving member", perform a translational motion in which the slope of the sigmoid curve described above differs between the point of the maximum value of the acceleration of the moving member in the positive direction and the point of the maximum value of the acceleration thereof in the negative direction, the pseudo force sense described above occurs.

Characteristics of this Embodiment

As described above, according to this embodiment, it is possible to make a person sense a temporally stable force without a supporting point of a reaction force or a point of application of force.

Furthermore, the acceleration generator 20 provides a pseudo force sense in the directions along the straight line C only by a linear simple harmonic motion in the C directions. Therefore, substantially no force vector occurs in all the directions except the directions along the straight line C. As a result, it is possible to make a person more clearly sense a temporally stable force.

Furthermore, the acceleration generator 20 is configured to continue the translational motion permanently, if there is not any loss, such as friction, and the energy is completely conserved. Therefore, the amount of the alternating current supplied to the coil 26 is sufficient if the alternating current can compensate for such a loss. That is, the pseudo force sense described above can be generated at a low power consumption. The alternating current supplied to the coil 26 is controlled in the same manner as in the first embodiment.

Furthermore, the acceleration generator 20 directly generates the motive force in the directions of the translational motion (the directions along the straight line C) by supplying the alternating current to the coil 26, rather than generating a rotational motive force and then converting the rotational motive force into the translational motion. Therefore, any mechanism required to convert the rotational motive force into the translational motion is not necessary, so that the acceleration generator 20 can be reduced in size and weight. As a result, the accelerator generation 20 can be incorporated into an electronic device, such as a cellular phone, and the application thereof can be widened.

According to this embodiment, the acceleration generator 20 is composed of components having a circular cross section, such as the disk-shaped permanent magnets 21 and 27, the frame 22 having the shape of a cylinder with both the opposite ends closed, the yoke 23 having the shape of a cylinder with one end closed, the bobbin 25 having the shape of a cylinder with one end closed, and the columnar yoke 28. However, the acceleration generator 20 may be composed of components having other cross sections, such as a polygonal cross section. Furthermore, the poles of the permanent magnets 21 and 27 may be inverted. According to this embodiment, the motive force in the directions of the translational motion (the directions along the straight line C) is generated by supplying an alternating current to the coil 26. However, a reciprocal motor or a shaft motor may be used to generate the motive force.

Third Embodiment

Now, a third embodiment of the present invention will be described.

According to the third embodiment, a moving member (plunger) performs a translational motion in a mass spring system comprising two or more springs. The moving member collides with springs having different spring constants depending on the position, so that the moving member performs a translational motion in which the acceleration is asymmetric in one period. While the mass spring system comprising two springs will be illustrated in this embodiment, the present invention is not limited thereto.

<Configuration>

Figure 4:
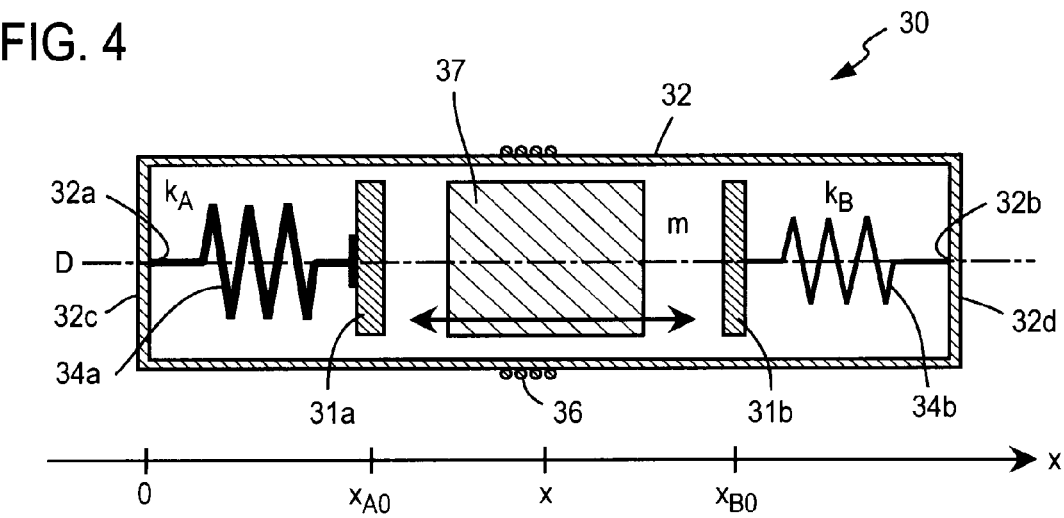
FIG. 4 is a cross-sectional view showing a configuration of an acceleration generator according to a third embodiment.

FIG. 4 is a cross-sectional view showing a configuration of an acceleration generator 30 according to the third embodiment.

As shown in FIG. 4, the acceleration generator 30 according to this embodiment comprises disk-shaped iron cores 31a and 31b (which correspond to a "first iron core" and a "second iron core"), a frame 32 made of an insulating material and having the shape of a cylinder with both the opposite ends closed, springs 34a and 34b having significantly different spring constants, a coil 36 of a conductor, such as a copper wire, covered with an insulator, and a movable iron core (plunger) 37 (which corresponds to a "moving member"), which is a ferromagnetic body.

One end of the spring 34a is fixed to a supporting point 32a on the inner surface of a longitudinal end 32c of the frame 32, and the other end of the spring 34a is fixed to one surface of the iron core 31a. Furthermore, one end of the spring 34b is fixed to a supporting point 32b on the inner surface of the other longitudinal end 32d of the frame 32, and the other end of the spring 34b is fixed to one surface of the iron core 31b. The iron cores 31a and 31b can perform a translational motion along the straight line D. Furthermore, the movable iron core 37 is disposed between the iron cores 31a and 31b in the inner space of the frame 32. The movable iron core 37 is not connected to the iron cores 31a and 31b. Therefore, the movable iron core 37 can perform a translational motion between the iron cores 31a and 31b along the straight line D extending in the longitudinal direction of the frame 32 (which corresponds to a "particular straight line" determined with reference to the frame 32) independently of the iron cores 31a and 31b. The outer diameters of the iron cores 31a and 31b and the movable iron core 37 are slightly smaller than the inner diameter of the frame 32. Therefore, the iron cores 31a and 31b and the movable iron core 37 can be supported by the inner wall of the frame 32 to perform a translational motion. Alternatively, a rail may be provided in the frame 32, and the iron cores 31a and 31b and the movable iron core 37 may be supported by the rail to perform a translational motion.

Furthermore, the coil 36 is wound around the outer circumference of a part of the frame 32 that is close to the movable iron core 37 in translational motion in a certain circumferential direction. The central axes of the iron cores 31a and 31b, the supporting points 32a and 32b, the points at which the springs 34a and 34b are fixed to the iron cores 31a and 31b, and the central axis of the movable iron core 37 are disposed on substantially the same straight line D.

<Operation>

Supposing that the end 32d of the frame 32 is a reference position (x=0), in the initial resting state, the iron core 31a rests at a position $x=x_{A0}$, and the iron core 31b rest at a position $x=x_{B0}$. Furthermore, it is supposed that, in the initial resting state, the movable iron core 37 (which corresponds to a "moving member") is disposed closer to any one of the iron cores 31a and 31b. In the following description, it is supposed that the movable iron core 37 is disposed closer to the iron core 31a. Furthermore, it is supposed that the rightward direction along the straight line D in FIG. 4 is the positive direction, and the leftward direction is the negative direction.

If a sine wave alternating current is applied to the coil 36, a magnetic field responsive to the direction of the current is generated, and the movable iron core 37 is magnetized. The magnetized movable iron core 37 is attracted by the adjacent iron core 31a, and thus, an initial velocity in the direction along the straight line D (in the negative direction) is imparted to the movable iron core 37. The velocity of the movable iron core 37 is detected as the induced electromotive force generated in the coil 36, and when a predetermined velocity is imparted to the movable iron core 37, the supply of the current to the coil 36 is stopped.

Once the initial velocity is imparted to the movable iron core 37, the movable iron core 37 collides with the iron core 31a to cause the iron core 31a to compress the spring 34a connected thereto (which corresponds to a "first operating part") in the negative direction. The compressed spring 34a generates a elastic force (which corresponds to a "first force") in the direction parallel to the straight line D (the positive direction), and the iron core 31a applies the force to the movable iron core 37 in the direction parallel to the straight line D (the positive direction). In response to this force, the movable iron core 37 moves in the positive direction along the straight line D. Then, the movable iron core 37 collides with the iron core 31b to cause the iron core 31b to compress the spring 34b connected thereto (which corresponds to a "second operating part") in the positive direction. The compressed spring 34b generates a elastic force (which corresponds to a "second force") in the direction parallel to the straight line D (the negative direction), and the iron core 31b applies the force to the movable iron core 37 in the direction parallel to the straight line D (the negative direction). In response to this force, the movable iron core 37 moves in the negative direction along the straight line D.

The movable iron core 37 performs a periodic translational motion along the straight line D by repeating such movements. If energy is completely conserved, the translational motion of the movable iron core 37 continues permanently. Actually, however, energy is lost because of the collisions between the movable iron core 37 and the iron cores 31a and 31b. Therefore, supplemental energy is supplied to the movable iron core 37 in the same manner as the process of imparting the initial velocity to the movable iron core 37 to maintain the translational motion.

The spring 34a applies a force determined by the contraction amount of the spring 34a (which corresponds to the "first force") to the movable iron core 37 in the direction parallel to the straight line D when the movable iron core 37 is in contact with the iron core 31a. However, when the movable iron core 37 is separated from the iron core 31a, the force is not applied to the movable iron core 37. Similarly, the spring 34b applies a force determined by the contraction amount of the spring 34b (which corresponds to the "second force") to the movable iron core 37 in the direction parallel to the straight line D when the movable iron core 37 is in contact with the iron core 31b. However, when the movable iron core 37 is separated from the iron core 31b, the force is not applied to the movable iron core 37. That is, the springs 34a and 34b apply, to the movable iron core 37, forces that vary in magnitude depending on the relative positions of the movable iron core 37 with respect to their respective supporting points 32a and 32b in the directions parallel to the straight line D. The ratio of the magnitude between the forces applied by the springs 34a and 34b to the movable iron core 37 varies with the relative positions of the movable iron core 37 with respect to the supporting points 32a and 32b of the springs 34a and 34b. As a result, the movable iron core 37 performs a translational motion in which the acceleration in the positive direction and the acceleration in the negative direction are asymmetric in one period. In other words, the movable iron core 37 performs a translational motion in which the temporal change in acceleration in one period varies depending on whether the acceleration occurs in the positive direction or in the negative direction. More specifically, the movable iron core 37 according to this embodiment performs a translational motion in which the maximum of the absolute value of the acceleration in the positive direction and the maximum of the acceleration in the negative direction differ from each other, and the duration of the acceleration in the direction in which the greater maximum value is provided is shorter than the duration of the acceleration in the direction in which the smaller maximum value is provided.

The following formulas show a period $T_A$ of the translational motion of the movable iron core 37 at the time when the movable iron core 37 is in contact with the iron core 31a and a period $T_B$ of the translational motion of the movable iron core 37 at the time when the movable iron core 37 is in contact with the iron core 31b. In these formulas, reference characters $k_A$ and $k_B$ denote the spring constant of the springs 34a and 34b, respectively, and reference character m denotes the mass of the movable iron core 37.

$$T_A = 2\pi\sqrt{\frac{k_A}{m}}, \quad T_B = 2\pi\sqrt{\frac{k_B}{m}} \qquad (3)$$

Therefore, the total period T of the translational motion of the movable iron core 37 including the period in which the movable iron core 37 is in contact with any of the iron cores 31a and 31b and the period in which the movable iron core 37 is not in contact with any of the iron cores 31a and 31b is expressed by the following formula. In this formula, reference character $T_{notouch}$ denotes the period in which the movable iron core 37 is not in contact with any of the iron cores 31a and 31b.

$$T = \frac{T_A}{2} + \frac{T_B}{2} + T_{notouch} \qquad (4)$$

Furthermore, the translational motion of the movable iron core 37 can be expressed by the following equation of motion.

$$mx'' = \begin{cases} -k_A(x - x_{A0}) & (x < x_{A0}) \\ -k_B(x - x_{B0}) & (x_{B0} < x) \\ 0 & (x_{A0} < x < x_{B0}) \end{cases} \qquad (5)$$

As can be seen from the formulas (3), (4) and (5), if the spring constants $k_A$ and $k_B$ are determined in such a manner that the periods $T_A$ and $T_B$ differ significantly, accelerations that vary significantly in the positive direction and the negative direction can be imparted to the movable iron core 37 in one period.

Figure 5A:
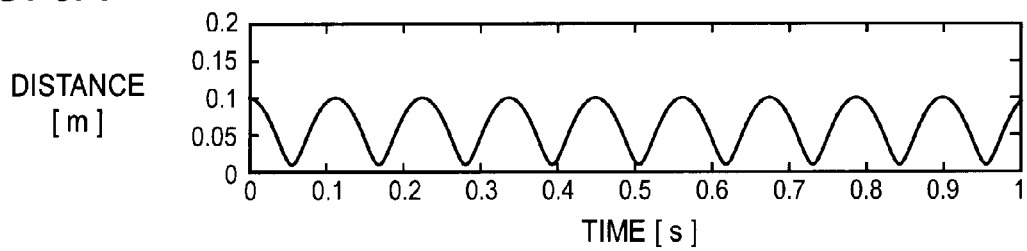
FIGS. 5A to 5C are graphs showing the behavior of the acceleration generator.
Figure 5B:
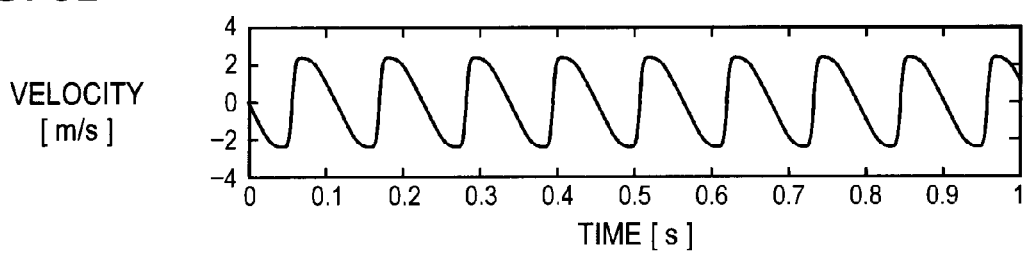
Figure 5C:
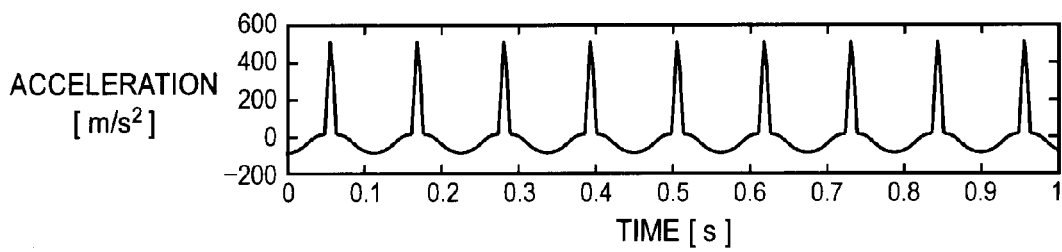

FIG. 5 includes graphs for illustrating the behavior of the acceleration generator 30 in the case where m=0.02 [kg], $k_A$=1000.0 [N/m], $k_B$=30 [N/m], $x_{A0}$=20*10$^{-3}$ [m], $X_{B0}$=40*10$^{-3}$ [m], x'(0) (velocity of the movable iron core 37 in the initial resting state)=0 [m/s], and x(0) (initial position of the movable iron core 37)=20*10$^{-3}$ [m]. FIG. 5A is a graph showing a relationship between the time and the distance x of the movable iron core 37 from the reference point, in which the ordinate indicates the distance x [m], and the abscissa indicates the time [s]. FIG. 5B is a graph showing a relationship between the time and the velocity x', in which the ordinate indicates the velocity x' [m/s], and the abscissa indicates the time [s]. FIG. 5C is a graph showing a relationship between the time and the acceleration x", in which the ordinate indicates the acceleration x" [m/s$^2$], and the abscissa indicates the time [s].

As shown in FIG. 5C, the movable iron core 37 performs a translational motion in which the acceleration in the positive direction and the acceleration in the negative direction are asymmetric with each other in one period. Specifically, while the maximum value of the acceleration in the positive direction is about 500 [m/s$^2$], the maximum value of the absolute value of the acceleration in the negative direction is about 100 [m/s$^2$]. In addition, if the ratio of the change in perceptual response to the change in acceleration differs between the point of the maximum value of the acceleration in the positive direction and the point of the maximum value of the absolute value of the acceleration in the negative direction, or in other words, if the maximum value of the acceleration in the positive direction falls within the range $f_2(x)$ of the sigmoid curve shown in FIG. 27, and the maximum value of the absolute value of the acceleration in the negative direction falls within the range $f_1(x)$, the pseudo force sense described above occurs. In other words, if the movable iron core 37, which is the "moving member", performs a translational motion in which the slope of the sigmoid curve described above differs between the point of the maximum value of the acceleration of the moving member in the positive direction and the point of the maximum value of the acceleration thereof in the negative direction, the pseudo force sense described above occurs.

Characteristics of this Embodiment

As described above, according to this embodiment, it is possible to make a person sense a temporally stable force without a supporting point of a reaction force or a point of application of force.

Furthermore, the acceleration generator 30 provides a pseudo force sense in the directions along the straight line D only by a linear simple harmonic motion in the D directions. Therefore, substantially no force vector occurs in all the directions except the directions along the straight line D. As a result, it is possible to make a person more clearly sense a temporally stable force.

Furthermore, the acceleration generator 30 is configured to continue the translational motion permanently, if there is no loss, and the energy is completely conserved. Therefore, the amount of the current supplied to the coil 36 is sufficient if the alternating current can compensate for such a loss. That is, the pseudo force sense described above can be generated at a low power consumption.

Furthermore, the acceleration generator 30 directly generates the motive force in the directions of the translational motion (the directions along the straight line D) by supplying the alternating current to the coil 36, rather than generating a rotational motive force and then converting the rotational motive force into the translational motion. Therefore, any mechanism required to convert the rotational motive force into the translational motion is not necessary, so that the acceleration generator 30 can be reduced in size and weight. As a result, the acceleration generator 30 can be incorporated into an electronic device, such as a cellular phone, and the application thereof can be widened.

As in the first and second embodiments, of course, the shapes of the components of the acceleration generator 30 according to this embodiment are not limited to those illustrated in the above description. According to this embodiment, the motive force in the directions of the translational motion (the directions along the straight line D) is generated by supplying a current to the coil 36. However, a reciprocal motor or a shaft motor may be used to generate the motive force.

Fourth Embodiment

Now, a fourth embodiment of the present invention will be described.

This embodiment is a modification of the third embodiment. According to this embodiment, a mechanism for changing the spring constant of at least one of the springs (a spring constant regulator) is provided, and the resonance frequency of the movable iron core is controlled by changing the spring constant. According to this embodiment, the spring constant is changed by changing the number of windings N of the spring. In the following, descriptions will be made focusing on differences from the third embodiment.

<Configuration>

Figure 6:
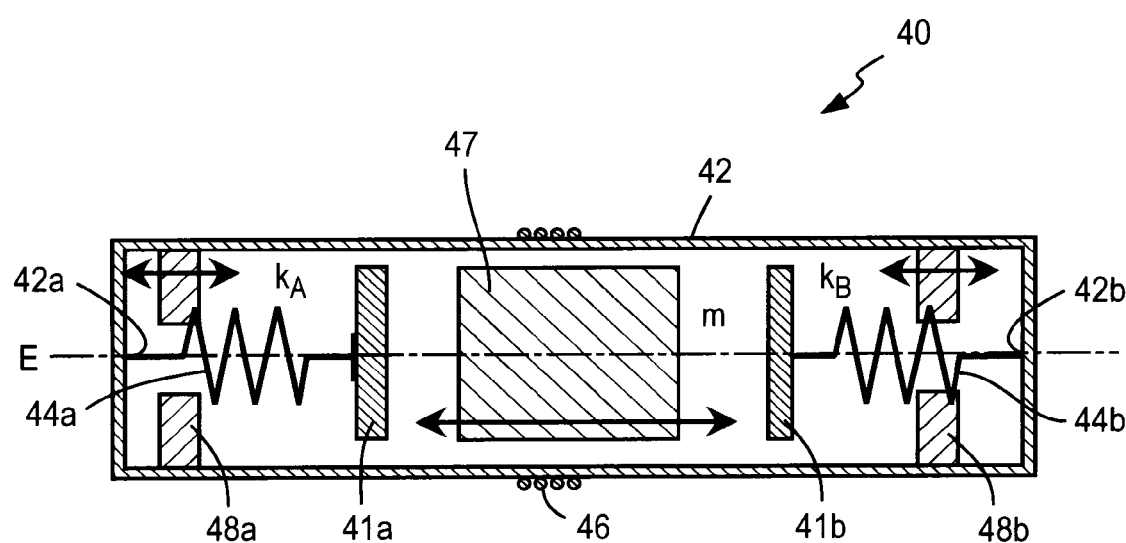
FIG. 6 is a cross-sectional view showing a configuration of an acceleration generator according to a fourth embodiment.

FIG. 6 is a cross-sectional view showing a configuration of an acceleration generator 40 according to the fourth embodiment. As shown in FIG. 6, the acceleration generator 40 according to this embodiment comprises disk-shaped iron cores 41a and 41b, a frame 42 made of an insulating material and having the shape of a cylinder with both the opposite ends closed, springs 44a and 44b (which corresponds to a "first elastic body" and a "second elastic body"), a coil 46 of a conductor, such as a copper wire, covered with an insulator, a movable iron core (plunger) 47, which is a ferromagnetic body, and number-of-windings adjustment mechanisms 48a and 48b (which correspond to "spring constant regulators") that can change the spring constant of the springs 44a and 44b, respectively. The movable iron core 47 performs a translational motion in parallel with the straight line E.

All the components except for the number-of-windings adjustment mechanisms 48a and 48b are the same as those in the third embodiment. Specifically, the iron cores 41a and 41b, the frame 42, the springs 44a and 44b, the coil 46, the movable iron core 47 and the straight line E are equivalent to the iron cores 31a and 31b, the frame 32, the springs 34a and 34b, the coil 36, the movable iron core 37 and the straight line D in the third embodiment, respectively. In the following, a configuration of the number-of-windings adjustment mechanisms 48a and 48b will be described.

Figure 7A:
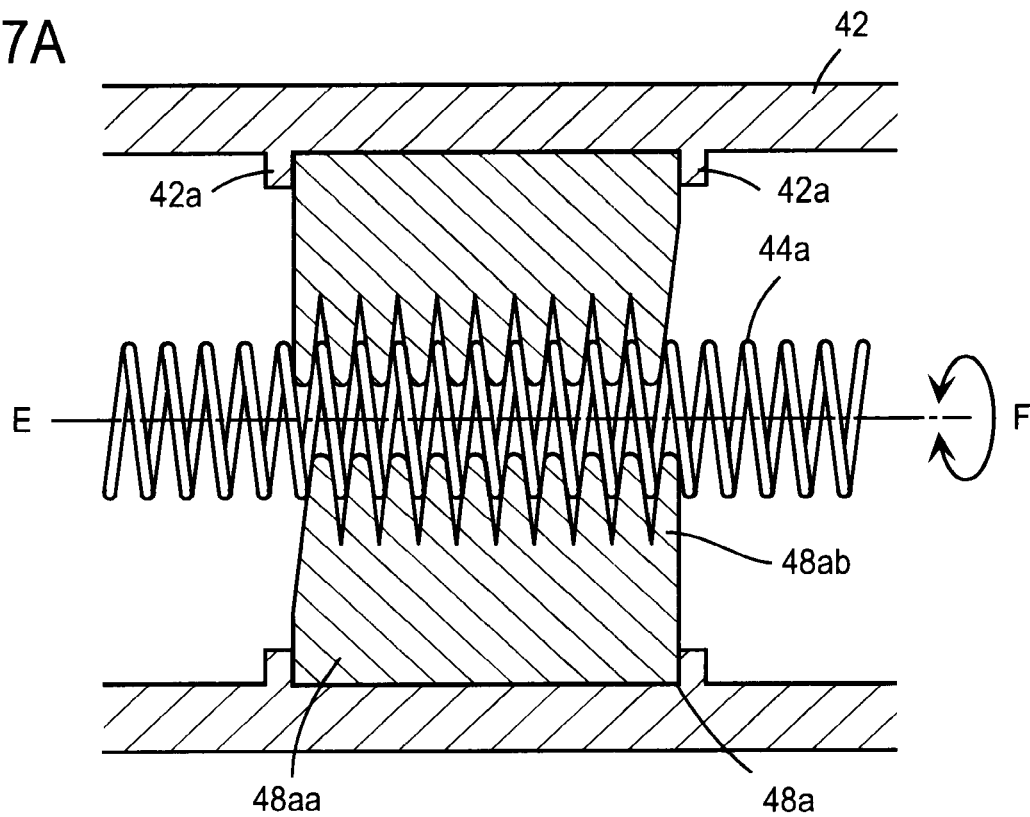
FIGS. 7A and 7B are partially cross-sectional views for illustrating configurations of number-of-windings adjustment mechanisms.
Figure 7B:
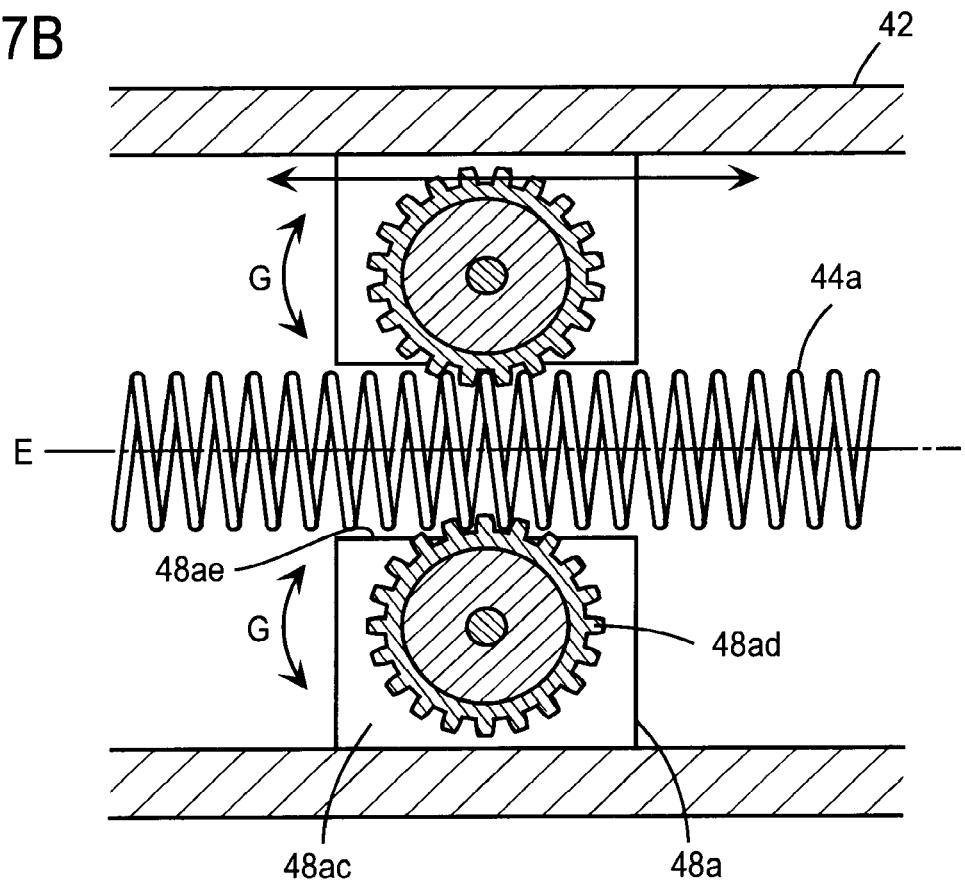

FIGS. 7A and 7B are partial cross-sectional views for illustrating a configuration of the number-of-windings adjustment mechanism 48a. While only the configuration of the number-of-windings adjustment mechanism 48a will be described in the following, the number-of-windings adjustment mechanism 48b has the same configuration. The example shown in FIGS. 7A and 7B is an example that is possible in the case where the springs 44a and 44b are coil springs. The following description will be made on the assumption that the springs 44a and 44b are coil springs.

FIG. 7A shows an exemplary configuration of the number-of-windings adjustment mechanism 48a. In this example, the number-of-windings adjustment mechanism 48a comprises a cylindrical base portion 48aa having a spirally threaded groove 48ab formed in the inner wall thereof. The threaded groove 48ab is a spiral groove extending from one open end of the base portion 48aa to the other open end thereof and holds the spring 44a. Thus, the spring 44a is fixed with respect to the frame 42 at any part thereof. Furthermore, a holder part 42a for holding the number-of-windings adjustment mechanism 48a in such a manner that the number-of-windings adjustment mechanism 48a can rotate about the straight line E is formed on the inner wall of the frame 42. In this embodiment, the holder part 42a comprises two rings extending circumferentially along the inner wall of the frame 42, and the number-of-windings adjustment mechanism 48a is held between the two rings with a slight clearance therebetween. Thus, the number-of-windings adjustment mechanism 48a can rotate about the straight line E in the directions F, while being prevented from moving along the straight line E. When the number-of-windings adjustment mechanism 48a thus configured rotates about the straight line E in the direction F, the spring 44a held in the threaded groove 48ab is fed in a direction parallel to the straight line E. The direction of feeding of the spring 44a is determined by the direction of the spiral of the threaded groove 48ab, the direction of winding of the spring 44a, and the direction of rotation of the number-of-windings adjustment mechanism 48a. It is to be noted that only the part of the spring 44a that is disposed outside of the number-of-windings adjustment mechanism 48a on the side of the iron core 41a can function as a elastic body. Therefore, the length of the part of the spring 44a that functions as a elastic body (which is the effective number of windings N) is adjusted according to the direction in which the number-of-windings adjustment mechanism 48a feeds the spring 44a. Thus, the effective spring constant can be adjusted.

FIG. 7B shows an alternative configuration of the number-of-windings adjustment mechanism 48a. In this example, the number-of-windings adjustment mechanism 48a comprises a base portion 48ac fixed to the inner wall of the frame 42, and a feed drive gear 48ad rotatably attached to the base portion 48ac. The feed drive gear 48ad is a gear that can rotate in the directions G about an axis perpendicular to the straight line E and be fixed at a certain position, and teeth 48ae thereof hold the spring 44a. Thus, the spring 44a is fixed with respect to the frame 42 at any part thereof. The spring 44a can be fed in parallel with the straight line E by rotating the feed drive gear 48ad, and thus, the length of the part of the spring 44a that functions as a elastic body (which is the effective number of windings N) can be adjusted. Thus, the spring constant can be substantially adjusted.

If the effective number of windings of the spring decreases, the spring constant increases. This is because, in general, the spring constant k can be expressed by the following equation.

$$k = \frac{P}{\delta} = \frac{Gd^4}{8ND^3} \quad (6)$$

(k: spring constant (N/mm), P: load (N), δ: displacement (mm), G: modulus of rigidity of spring material (N/mm²=Mpa), d: wire diameter of spring (mm), N: number of windings, D: average coil diameter (mm))

Characteristics of this Embodiment

According to this embodiment, since the effective spring constant of the springs 44a and 44b can be adjusted, the acceleration of the translational motion of the movable iron core 47 can also be adjusted. If the number-of-windings adjustment mechanisms 48a and 48b are configured to be driven with a motor or the like, the acceleration of the translational motion of the movable iron core 47 can be adjusted not only before the acceleration generator 40 is activated but also when the acceleration generator 40 is in operation. As a result, the acceleration can be readily adjusted so that the most desirable pseudo force sense is generated.

According to this embodiment, the effective spring constant of both the springs 44a and 44b can be adjusted. However, the effective spring constant of only one of the springs 44a and 44b may be adjusted. Furthermore, the number-of-windings adjustment mechanism according to this embodiment may be used for adjusting the spring constant of the spring 24 shown in FIG. 3.

Fifth Embodiment

Now, a fifth embodiment of the present invention will be described.

This embodiment is a modification of the third embodiment. According to this embodiment, a mechanism for changing the spring constant of at least one of the springs (a spring constant regulator) is provided, and the resonance frequency of the movable iron core is controlled by changing the spring constant. According to this embodiment, the spring constant is changed by heating the spring. In the following, descriptions will be made focusing on differences from the third embodiment.

<Configuration>

Figure 8:
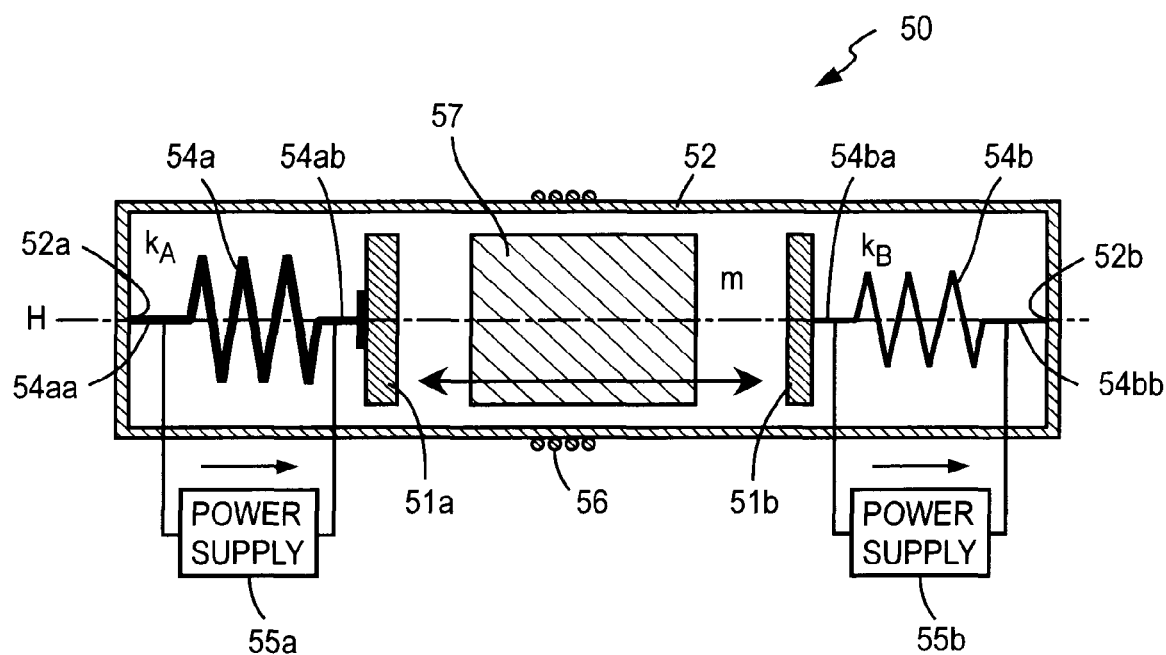
FIG. 8 is a cross-sectional view showing a configuration of an acceleration generator according to a fifth embodiment.

FIG. 8 is a cross-sectional view showing a configuration of an acceleration generator 50 according to the fifth embodiment.

As shown in FIG. 8, the acceleration generator 50 according to this embodiment comprises disk-shaped iron cores 51a and 51b, a frame 52 made of an insulating material and having the shape of a cylinder with both the opposite ends closed, conductive springs 54a and 54b, a coil 56 of a conductor, such as a copper wire, covered with an insulator, a movable iron core (plunger) 57, which is a ferromagnetic body, and power supplies 55a and 55b (which correspond to "spring constant regulators") that supply a current to the springs 54a and 54b, respectively. The movable iron core 57 performs a translational motion in parallel with the straight line H.

All the components except for the power supplies 55a and 55b that supply a current to the springs 54a and 54b are the same as those in the third embodiment. Specifically, the iron cores 51a and 51b, the frame 52, the springs 54a and 54b, the coil 56, the movable iron core 57 and the straight line H are equivalent to the iron cores 31a and 31b, the frame 32, the springs 34a and 34b, the coil 36, the movable iron core 37 and the straight line D in the third embodiment, respectively. In the following, only parts involved with the current supply from the power supplies 55a and 55b to the springs 54a and 54b will be described.

As shown in FIG. 8, the power supply 55a applies a voltage between an end 54aa and an end 54ab of the spring 54a. Thus, the spring 54a generates heat in accordance with the electric resistance thereof. Similarly, the power supply 55b applies a voltage between an end 54ba and an end 54bb of the spring 54b. Thus, the spring 54b generates heat in accordance with the electric resistance thereof. As a result, the spring constant of the springs 54a and 54b can be changed.

Here, if the temperature of a spring rises, the spring constant increases. This is because, in the formula (6) that expresses the spring constant k, the modulus of rigidity G of a spring decreases as the temperature rises.

$$G = \frac{E}{2(1+\gamma)} \quad (E: \text{Young's modulus}, \gamma: \text{Poisson's ratio}) \quad (7)$$

$$E = E_0 - ET\exp\left(-\frac{T_c}{T}\right) \quad (8)$$

($E_0$: Young's modulus at 0 K, $T$: temperature[K], $T_c$: constant)

Characteristics of this Embodiment

According to this embodiment, since the spring constant of the springs 54a and 54b can be adjusted, the acceleration of the translational motion of the movable iron core 57 can also be adjusted. This adjustment can be performed not only before the acceleration generator 50 is activated but also when the acceleration generator 50 is in operation. As a result, the acceleration can be readily adjusted so that the most desirable pseudo force sense is generated. If the power supplies 55a and 55b can adjust the amount of current to be supplied, the acceleration can be adjusted more finely. However, even if the power supplies 55a and 55b cannot adjust the amount of current to be supplied, the spring constant of the springs 54a and 54b can be adjusted in two steps by turning on and off the power supplies 55a and 55b.

According to this embodiment, the spring constant of both the springs 54a and 54b can be adjusted. However, the spring constant of only one of the springs 54a and 54b may be adjusted. Furthermore, the configuration according to this embodiment may be used for adjusting the spring constant of the spring 24 shown in FIG. 3.

Sixth Embodiment

Now, a sixth embodiment of the present invention will be described.

According to this embodiment, relative positions of a first operating part, a second operating part and a moving member with respect to each other can be adjusted, and the equilibrium position thereof can be shifted.

<Configuration>

Figure 9A:
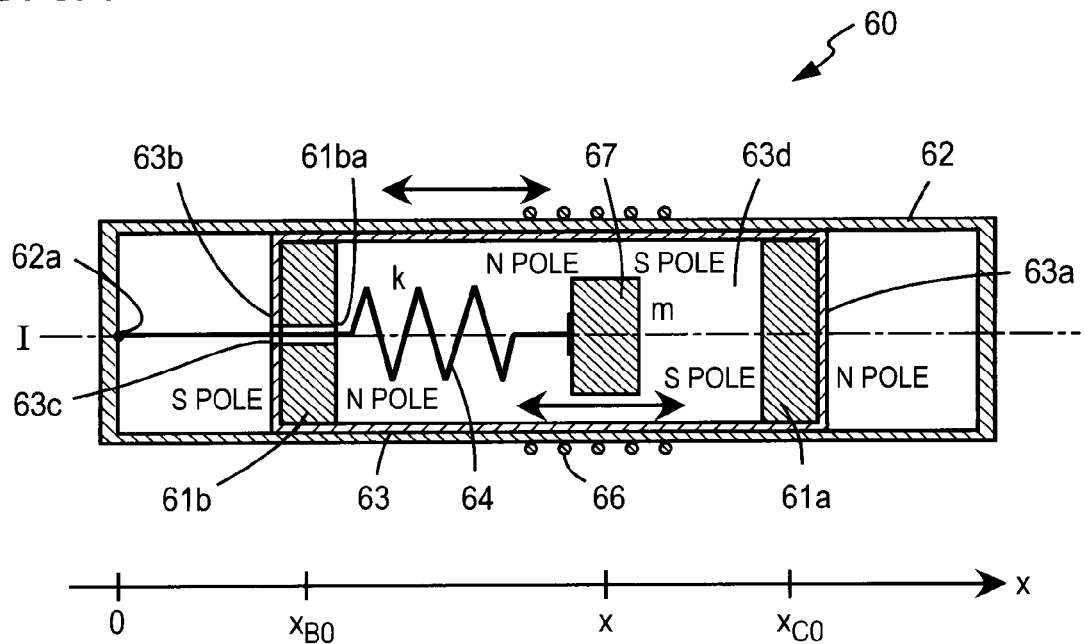
FIGS. 9A and 9B are cross-sectional views showing a configuration of an acceleration generator according to a sixth embodiment.
Figure 9B:
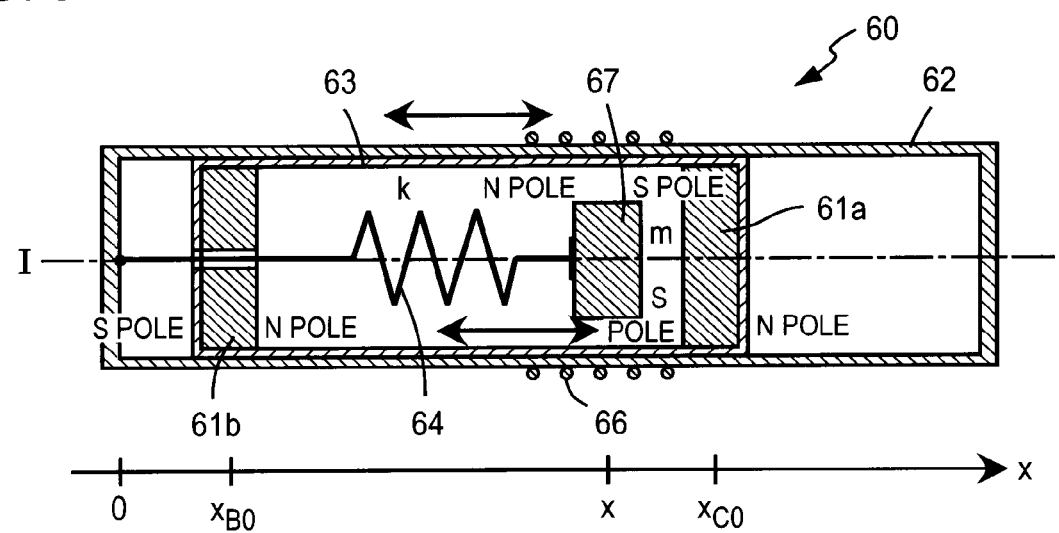

FIGS. 9A and 9B are cross-sectional views showing configurations of an acceleration generator 60 according to the sixth embodiment.

As shown in FIG. 9A, the acceleration generator 60 according to this embodiment comprises disk-shaped permanent magnets 61a and 67 that have opposite magnetic polarities on the front surface and the back surface, an annular-disk-shaped permanent magnet 61b that has a through hole 61ba and has opposite magnetic polarities on the front surface and the back surface, a frame 62 made of an insulating material and having the shape of a cylinder with both the opposite ends closed, a movable bobbin 63 (which corresponds to a "movable part") that is made of an insulating material, has the shape of a cylinder with both the opposite ends closed and has a through hole 63c in a longitudinal end 63b thereof, a spring 64, and a coil 66 of a conductor, such as a copper wire, covered with an insulator.

The movable bobbin 63 (which corresponds to the "movable part") is housed in the frame 62. The outer diameter of the movable bobbin 63 is slightly smaller than the inner diameter of the frame 62. The movable bobbin 63 can slide in the directions along the straight line I (which corresponds to a "particular straight line" determined with reference to the frame 62) in the frame 62 and be fixed at an arbitrary position. Furthermore, the permanent magnet 61b is fixed to the inner surface of an end 63b of the movable bobbin 63. In this embodiment, the S-pole surface of the permanent magnet 61b is fixed to the inner surface of the end 63b, and the through hole 61ba of the permanent magnet 61b and the through hole 63c of the movable bobbin 63 are disposed on the same straight line I. Furthermore, one end of the spring 64 (which corresponds to a "first operating part") is fixed to the inner surface (which corresponds to a "supporting point of the first operating part") of a longitudinal end 62a of the frame 62. The spring 64 passes through the through hole 61ba of the permanent magnet 61b and the through hole 63c of the movable bobbin 63, so that the other end of the spring 64 is disposed in an interior 63d of the movable bobbin 63 and fixed to the permanent magnet 67 (which corresponds to a "moving member"). In this embodiment, the spring 64 is fixed to the N-pole surface of the permanent magnet 67. The permanent magnet 61a (which corresponds to a "second operating part") is fixed to the inner surface (which corresponds to a "supporting point of the second operating part") of the other end 63a of the movable bobbin 63. In this embodiment, the N-pole surface of the permanent magnet 61a is fixed to the inner surface of the end 63a. In addition, the coil 66 is wound around the side surface of the frame 62 in a certain circumferential direction. The central axis of the frame 62, the central axis of the movable bobbin 63, the central axes of the permanent magnets 61a, 61b and 67, and the opposite ends of the spring 64 are substantially disposed on the straight line I.

The outer diameter of the permanent magnet 67 is slightly smaller than the inner diameter of the movable bobbin 63. Therefore, the permanent magnet 67 can be supported by the inner wall of the movable bobbin 63 to perform a translational motion. Alternatively, a rail may be provided in the movable bobbin 63, and the permanent magnet 67 may be supported by the rail to perform a translational motion.

With the configuration described above, the relative position of the movable bobbin 63 with respect to the frame 62 can be changed in the directions along the straight line I. The spring 64, supported at the end 62a of the frame 62, generates a "first force" in the directions along the straight line I and applies the "first force" to the permanent magnet 67 in the directions along the straight line I. In addition, the permanent magnet 61a, supported at the end 63a of the movable bobbin 63, generates a "second force" in a direction along the straight line I and applies the "second force" to the permanent magnet 67 in the direction along the straight line I. In addition, the permanent magnet 61b, supported at the end 63b of the movable bobbin 63, applies a force to the permanent magnet 67 in a direction along the straight line I.

<Operation>

With the configuration described above, the permanent magnet 67 is disposed at a position where the Coulomb forces applied by the permanent magnets 61a and 61b (both are repulsive forces), and the elastic force applied by the spring 64 balance each other (referred to as "origin position"). Here, the relative position of the movable bobbin 63 with respect to the frame 62 differs between FIGS. 9A and 9B. In this case, the Coulomb forces applied to the permanent magnet 67 by the permanent magnets 61a and 61b supported on the movable bobbin 63, and the elastic force applied to the permanent magnet 67 by the spring 64 supported on the frame 62 differ between FIGS. 9A and 9B. As a result, the origin position differs between FIGS. 9A and 9B. The origin position and the way of variation of the acceleration of the permanent magnet 67 can be adjusted by changing the setting of the relative position of the movable bobbin 63 with respect to the frame 62 in this way. Setting of the relative position of the movable bobbin 63 with respect to the frame 62 can be performed before the acceleration generator 60 is activated or during the acceleration generator 60 is in operation.

If a sine wave alternating current is applied to the coil 66, a magnetic field responsive to the direction of the current is generated, and the magnetic force causes the permanent magnet 67 to perform a periodic translational motion along the straight line I.

The elastic force applied to the permanent magnet 67 by the spring 64 occurs in the directions parallel to the straight line I. And, the magnitude of the force varies with the relative positions of the permanent magnet 67 and the supporting point of the spring 64. The Coulomb forces applied to the permanent magnet 67 by the permanent magnets 61a and 61b occur in the directions parallel to the straight line I, and the magnitude of the Coulomb forces varies with the relative positions of the permanents magnets 61a and 61b and the permanent magnet 67. In other words, the ratio between the magnitudes of the "first force" and the "second force" described above varies with the relative positions of the permanent magnet 67, the spring 64 and the permanent magnets 61a and 61b. Thus, the permanent magnet 67 performs a translational motion in which the acceleration in the positive direction (the rightward direction parallel to the straight line I in FIG. 9) and the acceleration in the negative direction (the leftward direction parallel to the straight line I in FIG. 9) are asymmetric in one period. In other words, the permanent magnet 67 performs a translational motion in which the temporal change in acceleration in one period varies depending on whether the acceleration occurs in the positive direction or in the negative direction. More specifically, the permanent magnet 67 according to this embodiment performs a translational motion in which the maximum of the absolute value of the acceleration in the positive direction and the maximum of the acceleration in the negative direction differ from each other, and the duration of the acceleration in the direction in which the greater maximum value is provided is shorter than the duration of the acceleration in the direction in which the smaller maximum value is provided.

This is approximated to the following equation of motion.

$$mx'' = -k(x - x_0) + \frac{M_B}{(x - x_{B0})^2} - \frac{M_C}{(x - x_{C0})^2} \quad (9)$$

In this embodiment, reference character m denotes the mass of the permanent magnet 67, reference character $x_0$ denotes the distance between the permanent magnet 67 and the end 62a at the time when the permanent magnet 67 is located at the "origin position", reference character $x_{B0}$ denotes the distance between the permanent magnet 61b and the end 62a at the time when the permanent magnet 67 is located at the "origin position", reference character $x_{C0}$ denotes the distance between the permanent magnet 61a and the end 62a at the time when the permanent magnet 67 is located at the "origin position", and reference character x denotes the distance between the permanent magnet 67 and the end 62a. In addition, reference character k denotes the spring constant of the spring 64, reference character $M_B$ denotes the constant of proportionality of the magnetic charge repulsive force between the permanent magnet 67 and the permanent magnet 61b, and reference character $M_C$ denotes the constant of proportionality of the magnetic charge repulsive force between the permanent magnet 67 and the permanent magnet 61a.

Figure 10A:
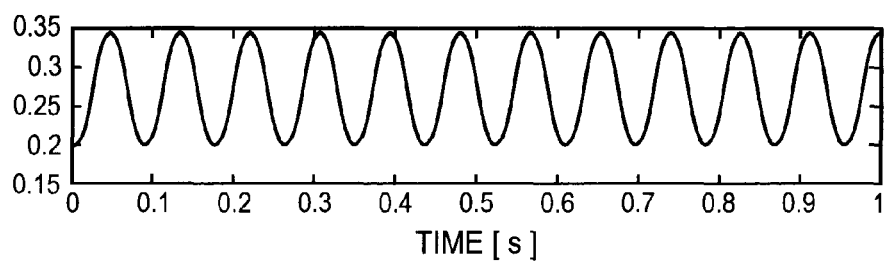
FIGS. 10A to 10C are graphs for illustrating the behavior of the acceleration generator which varies with the relative position of a movable bobbin with respect to a frame.
Figure 10B:
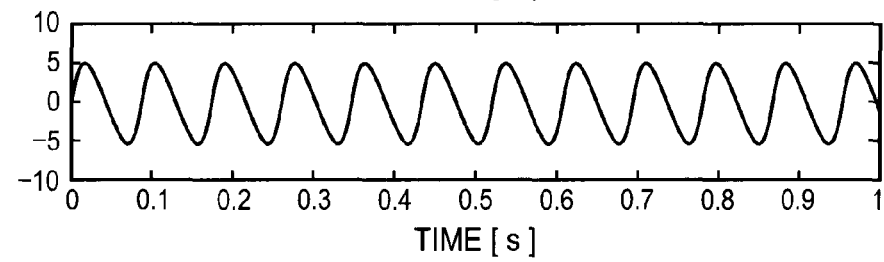
Figure 10C:
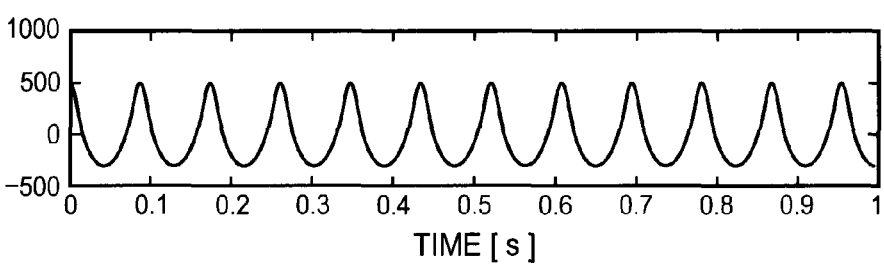
Figure 11A:
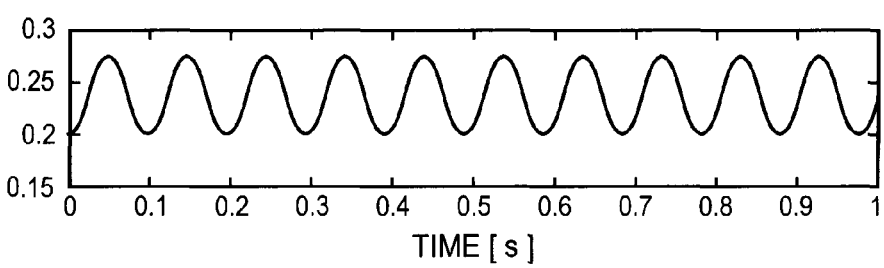
FIGS. 11A to 11C are graphs for illustrating the behavior of the acceleration generator which varies with the relative position of the movable bobbin with respect to the frame.
Figure 11B:
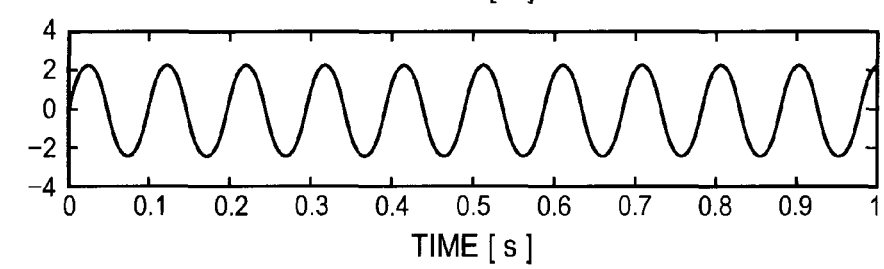
Figure 11C:
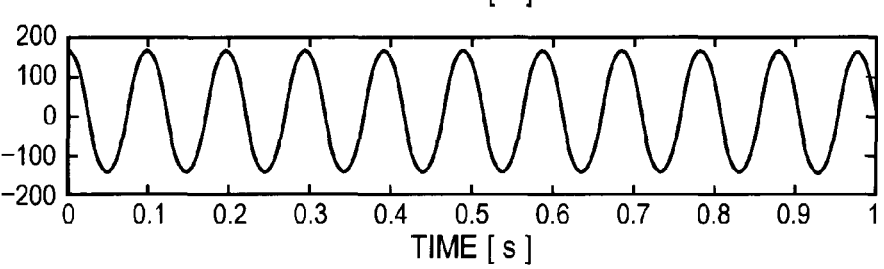
Figure 12A:
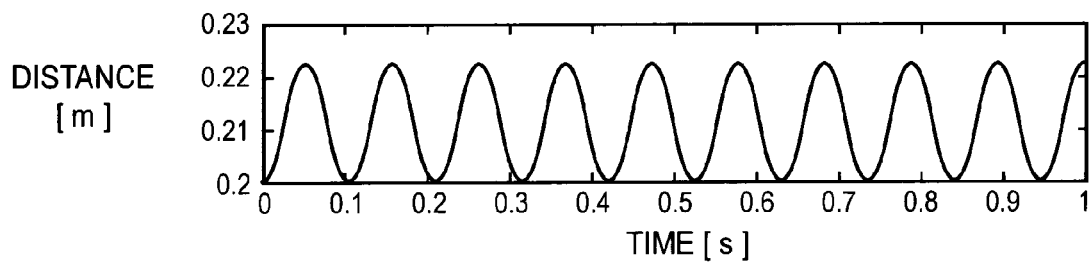
FIGS. 12A to 12C are graphs for illustrating the behavior of the acceleration generator which varies with the relative position of the movable bobbin with respect to the frame.
Figure 12B:
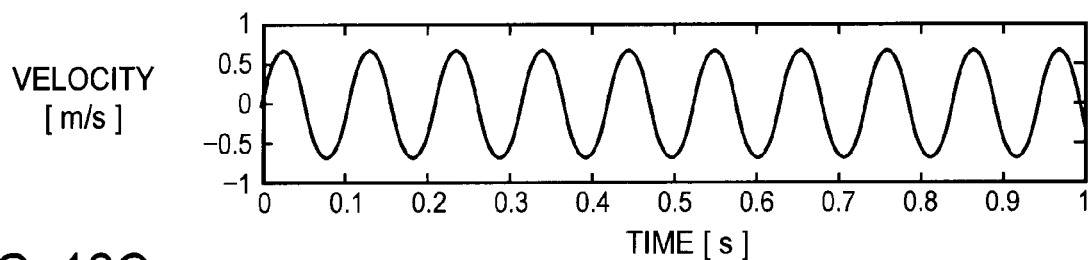
Figure 12C:
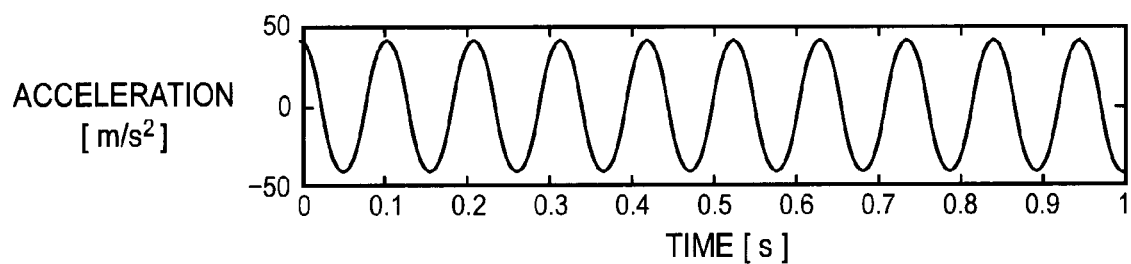

FIGS. 10 to 12 are graphs for illustrating the behavior of the acceleration generator 60 for various relative positions of the movable bobbin 63 with respect to the frame 62. FIG. 10 includes graphs in the case where m=0.05 [kg], k=100 [N/m], $x_0$=150*10$^{-3}$ [m], $x_{B0}$=100*10$^{-3}$ [m], $x_{C0}$=400*10$^{-3}$ [m], $M_B$=0.3 [N/m$^2$], $M_C$=0.005 [N/m$^2$], x'(0)=0 [m/s], and x(0)=200*10$^{-3}$ [m]. FIG. 11 includes graphs in the case where m=0.05 [kg], k=100 [N/m], $x_0$=150*10$^{-3}$ [m], $X_{B0}$=50*10$^{-3}$ [m], $x_{C0}$=250*10$^{-3}$ [m], $M_B$=0.3 [N/m$^2$], $M_C$=0.005 [N/m$^2$], x'(0)=0 [m/s], and x(0)=200*10$^{-3}$ [m]. FIG. 12 includes graphs in the case where m=0.05 [kg], k=100 [N/m], $x_0$=150*10$^{-3}$ [m], $x_{B0}$=0 [m], $x_{C0}$=300*10$^{-3}$ [m], $M_B$=0.3 [N/m$^2$], $M_C$=0.005 [N/m$^2$], x'(0)=0 [m/s], and x(0)=200*10$^{-3}$ [m]. FIGS. 10A, 11A and 12A show relationships between the time and the distance x, in which the ordinate indicates the distance x [m], and the abscissa indicates the time [s]. FIGS. 10B, 11B and 12B show relationships between the time and the velocity x', in which the ordinate indicates the velocity x' [m/s], and the abscissa indicates the time [s]. FIGS. 10C, 11C and 12C show relationships between the time and the acceleration x", in which the ordinate indicates the acceleration x" [m/s$^2$], and the abscissa indicates the time [s].

As shown in FIGS. 10C, 11C and 12C, the way of variation of the acceleration of the translational motion of the permanent magnet 67 varies depending on the relative position of the movable bobbin 63 with respect to the frame 62. Specifically, in the cases shown in FIGS. 10C and 11C, the permanent magnet 67 performs a translational motion in which the acceleration in the positive direction and the acceleration in the negative direction are asymmetric in one period. However, in the case shown in FIG. 12C, the permanent magnet 67 performs a translational motion in which the acceleration in the positive direction and the acceleration in the negative direction are substantially symmetric in one period. According to this embodiment, the way of variation of the acceleration of the permanent magnet 67 can be adjusted by changing the setting of the relative position of the movable bobbin 63 with respect to the frame 62. If the ratio of the change in perceptual response to the change in acceleration differs between the point of the maximum value of the acceleration in the positive direction and the point of the maximum value of the absolute value of the acceleration in the negative direction, or in other words, if the maximum value of the acceleration in the positive direction falls within the range $f_2$(x) of the sigmoid curve shown in FIG. 27, and the maximum value of the absolute value of the acceleration in the negative direction falls within the range $f_1$(x), the pseudo force sense described above occurs. In other words, if the permanent magnet 67, which is the "moving member", performs a translational motion in which the slope of the sigmoid curve described above differs between the point of the maximum value of the acceleration of the moving member in the positive direction and the point of the maximum value of the acceleration thereof in the negative direction, the pseudo force sense described above occurs.

Characteristics of this Embodiment

As in the first embodiment, according to this embodiment, it is possible to make a person sense a temporally stable force without a supporting point of a reaction force or a point of application of force. In addition, according to this embodiment, the way of variation of the acceleration of the permanent magnet 67 can be adjusted by changing the setting of the relative position of the movable bobbin 63 with respect to the frame 62. As a result, the way of variation of the acceleration suitable for generating the pseudo force sense can be readily set.

Furthermore, the acceleration generator 60 provides a pseudo force sense in the directions along the straight line I only by a linear simple harmonic motion in the I directions. Therefore, substantially no force vector occurs in all the directions except the directions along the straight line I. As a result, it is possible to make a person more clearly sense a temporally stable force.

Furthermore, the acceleration generator 60 is configured to continue the translational motion permanently, if there is not any loss, such as friction, and the energy is completely conserved. Therefore, the amount of the alternating current supplied to the coil 66 is sufficient if the alternating current can compensate for such a loss. That is, the pseudo force sense described above can be generated at a low power consumption. The alternating current supplied to the coil 66 is controlled in the same manner as a typical resonant drive circuit, for example.

Furthermore, the acceleration generator 60 directly generates the motive force in the directions of the translational motion (the directions along the straight line I) by supplying the alternating current to the coil 66, rather than generating a rotational motive force and then converting the rotational motive force into the translational motion. Therefore, any mechanism required to convert the rotational motive force into the translational motion is not necessary, so that the acceleration generator 60 can be reduced in size and weight. As a result, the acceleration generator 60 can be incorporated into an electronic device, such as a cellular phone, and the application thereof can be widened.

The permanent magnet 61*b* is not always necessary. Furthermore, a permanent magnet may be used instead of the spring 64, or a spring may be used instead of the permanent magnet 61*a*. Furthermore, of course, various modifications, such as modifications of the shape of the components and inversion of the magnetic poles, are possible.

Seventh Embodiment

Now, a seventh embodiment of the present invention will be described.

According to this embodiment, a pseudo force sense generator has two or more acceleration generators according to the present invention. Thus, the pseudo force sense generator can be configured to reduce the force to the outside to a minimum when the pseudo force sense is not to be generated and allow a person to clearly sense a pseudo force when the pseudo force sense is to be generated. Furthermore, the pseudo force sense generator can be configured to generate a pseudo force sense in arbitrary two-dimensional or three-dimensional directions.

<Variations>

FIG. 13 show variations of the seventh embodiment.

Figure 13A:
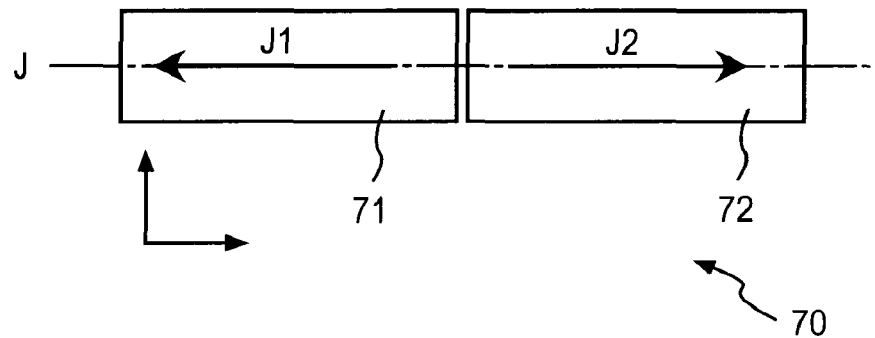
FIGS. 13A to 13C are diagrams showing variations of a seventh embodiment.

FIG. 13A is a diagram showing a pseudo force sense generator 70 comprising two acceleration generators 71 and 72 fixed on the straight line J. The acceleration generators 71 and 72 are arranged so that the moving members thereof perform a translational motion in the directions along the straight line J, and the acceleration generators 71 and 72 generate a pseudo force sense in opposite directions J1 and J2 (in the outward directions in this drawing).

If the moving members of the acceleration generators 71 and 72 are equal in amplitude and period of the acceleration, the total sum of the force vectors generated by the acceleration generators 71 and 72 is always 0. As a result, the force to the outside is substantially zero. However, if the balance of amplitude or period of the acceleration of the moving member between the acceleration generators 71 and 72 is lost (if one of the acceleration generators is stopped, or the amplitude or period of the acceleration of the moving member of one of the acceleration generators is changed, for example), a pseudo force sense can be generated in any of the directions J1 and J2. As a result, the occurrence, the direction, the intensity or the like of the pseudo force sense can be readily controlled.

Figure 13B:
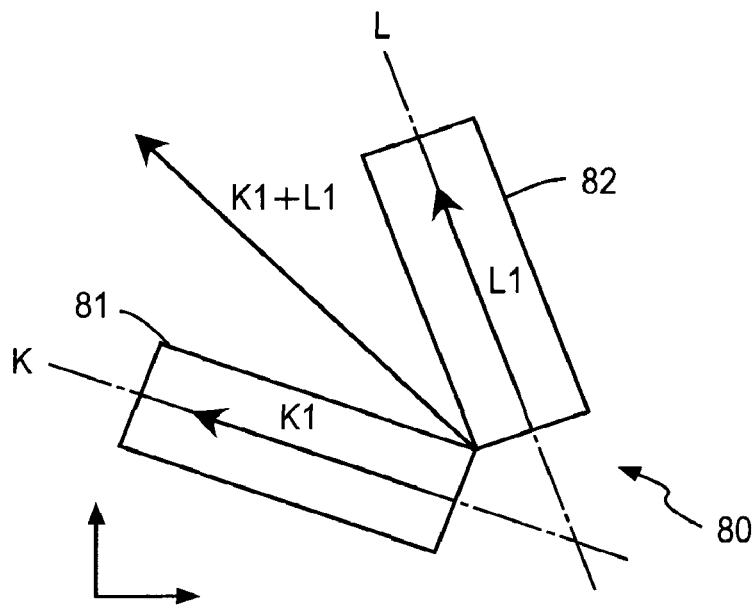

FIG. 13B is a diagram showing a pseudo force sense generator 80 comprising two acceleration generators 81 and 82 fixed to each other at a certain angle. The acceleration generators 81 and 82 are arranged so that the moving members thereof perform a translational motion in the directions of straight lines K and L (the straight lines K and L form the certain angle), and the acceleration generators 81 and 82 generate a pseudo force sense in the directions K1 and L1, respectively. In this case, a resultant force of pseudo forces generated in the directions of the straight lines K and L by the two acceleration generators 81 and 82 occurs in the (K1+L1) direction. The (K1+L1) direction can be changed by changing the relationship of the amplitude or period of the acceleration of the moving member between the acceleration generators 81 and 82. Furthermore, a position adjuster may be provided for changing the positional relationship between the two acceleration generators 81 and 82, so that the (K1+L1) direction is changed by changing the positional relationship between the two acceleration generators 81 and 82 (the angle between the directions of the translational motions of the movable members of the acceleration generators 81 and 82, for example). Alternatively, it may be provided that the total sum of the force vectors generated by the acceleration generators 81 and 82 is always zero when the acceleration generators 81 and 82 are in a predetermined positional relationship, and the total sum of the force vectors generated by the acceleration generators 81 and 82 is not zero at least temporarily when the acceleration generators 81 and 82 are in another positional relationship. Thus, the occurrence, the direction, the intensity or the like of the pseudo force sense can be readily controlled. The pseudo force sense generator 80 in this case can be configured as shown in FIGS. 13D and 13E, for example.

Figure 13C:
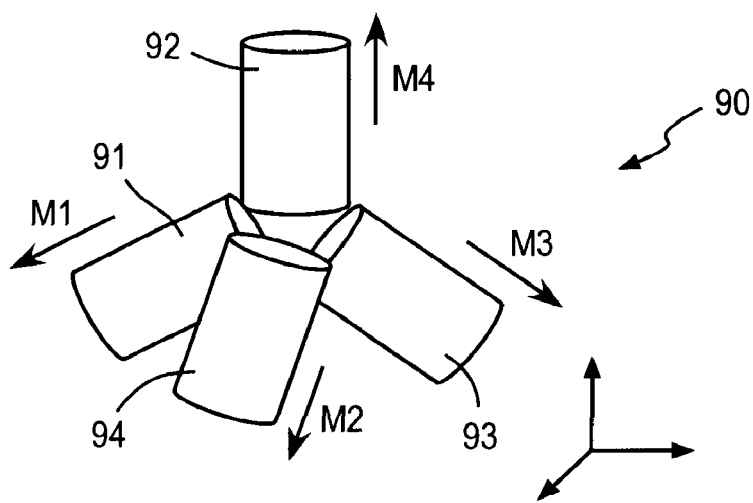
Figure 13D:
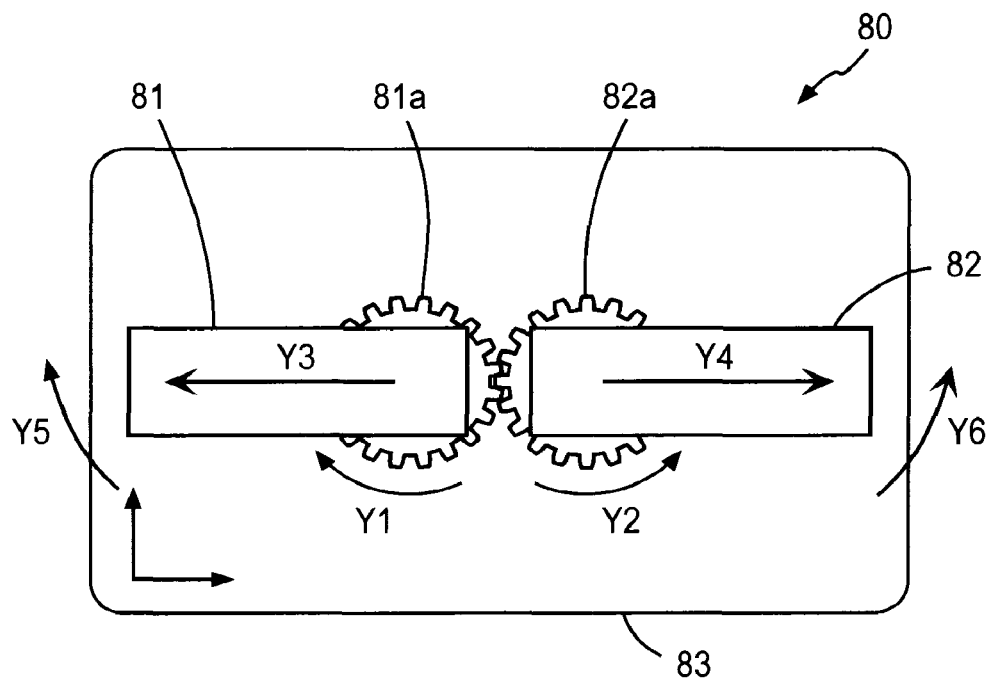
FIGS. 13D and 13E are diagrams showing variations of the seventh embodiment.
Figure 13E:
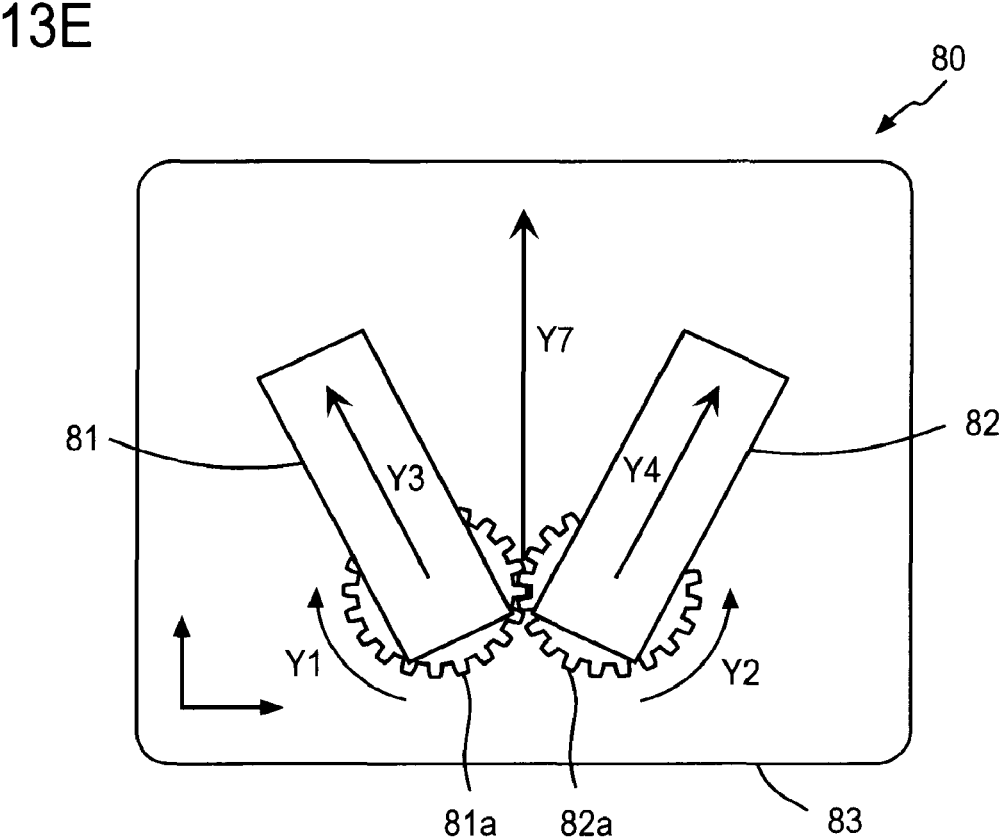

The pseudo force sense generator 80 in the example shown in FIGS. 13D and 13E comprises the acceleration generators 81 and 82 and a base part 83. Gears 81*a* and 82*a* are fixed to the acceleration generators 81 and 82, respectively, and can rotate with respect to the base part 83 in a state where the gears are engaged with each other. If the gears 81*a* and 82*a* rotate in the directions Y1 and Y2, respectively, the acceleration generators 81 and 82 rotate about the axes of rotation thereof in the directions Y5 and Y6, respectively. Thus, the positional relationship between the acceleration generators 81 and 82 can be readily switched between a state where the pseudo forces generated by the acceleration generators 81 and 82 in the directions Y3 and Y4, respectively, cancel each other as shown in FIG. 13D and a state where a pseudo force occurs in the direction Y7, which is the direction of the resultant force of the pseudo forces generated by the acceleration generators 81 and 82 in the directions Y3 and Y4, respectively, as shown in FIG. 13E.

FIG. 13C is a diagram illustrating a pseudo force sense generator 90 comprising acceleration generators 91 to 94, each of which is disposed along one of the straight lines connecting the center point and the apexes of a regular polyhedron with a surfaces. FIG. 13C shows a case of α=4. Each of the acceleration generators 91 to 94 is disposed so that the moving member thereof performs a translational motion along the straight line connecting the center point and the apex of the regular tetrahedron and generates a pseudo force sense in the direction from the center point of the regular tetrahedron toward the apex.

If the acceleration generators 91 to 94 are equal in amplitude and period of the acceleration of the moving member, the total sum of the force vectors generated by the acceleration generators 91 to 94 is always zero. As a result, the force to the outside is substantially zero. However, if the balance of amplitude or period of the acceleration of the moving member between the acceleration generators 91 to 94 is lost (if one or more acceleration generators are stopped, the amplitude or period of the acceleration of the moving members of one or more acceleration generators is changed, or the relative positions or orientations of the acceleration generators 91 to 94 are changed), the total sum of the force vectors generated by the acceleration generators 91 to 94 is not zero at least temporarily, so that a pseudo force sense can be generated in an arbitrary three-dimensional direction. Thus, the occurrence, the direction, the intensity or the like of the pseudo force sense can be readily controlled.

Now, a specific configuration of such a pseudo force sense generator comprising two or more acceleration generators will be described.
<Configuration>

Figure 14:
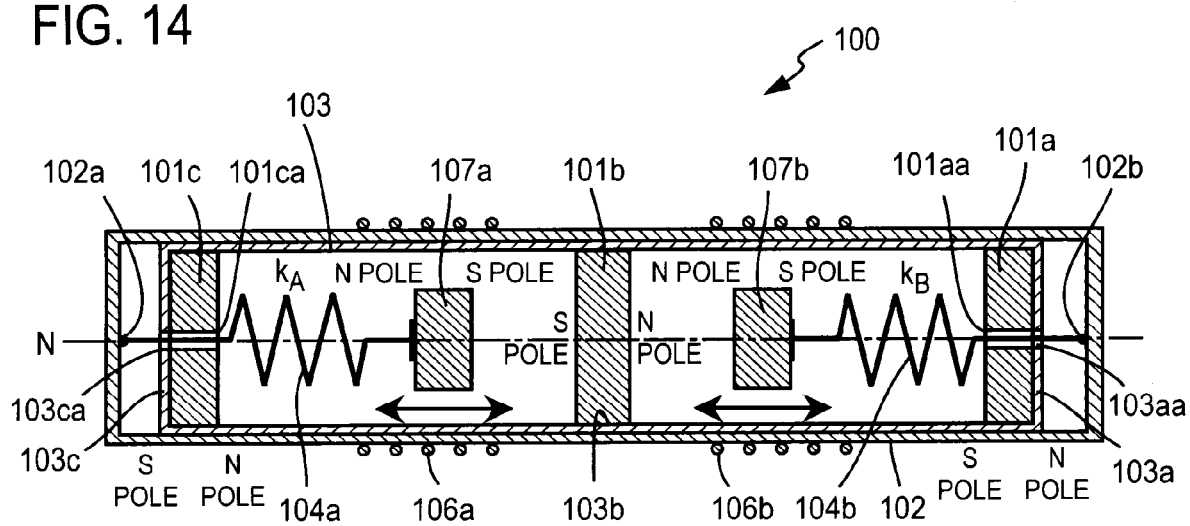
FIG. 14 is a cross-sectional view showing a configuration of a pseudo force sense generator using acceleration generators according to the sixth embodiment, showing a specific example of the configuration shown in FIG. 13A.
Figure 15A:
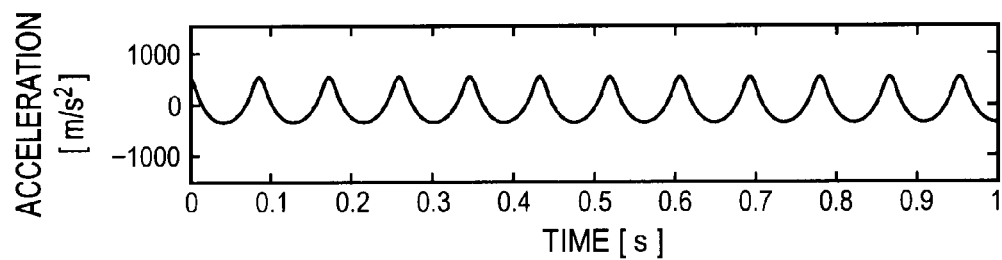
FIGS. 15A to 15C are graphs for illustrating the behavior of the acceleration generator which varies with the relative position of a movable bobbin with respect to a frame.
Figure 15B:
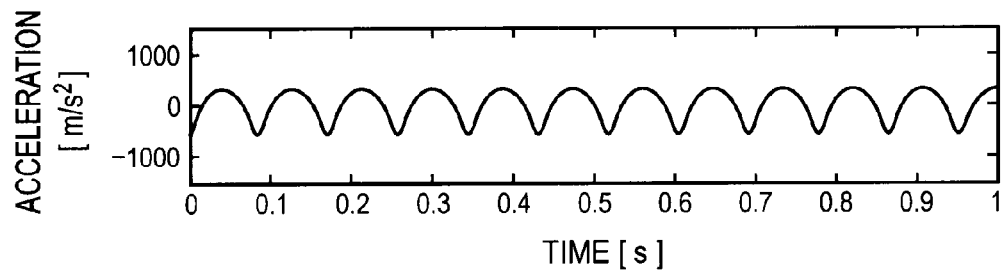
Figure 15C:
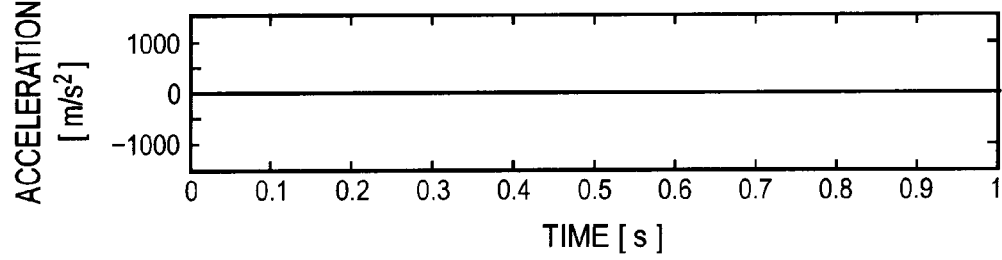
Figure 16A:
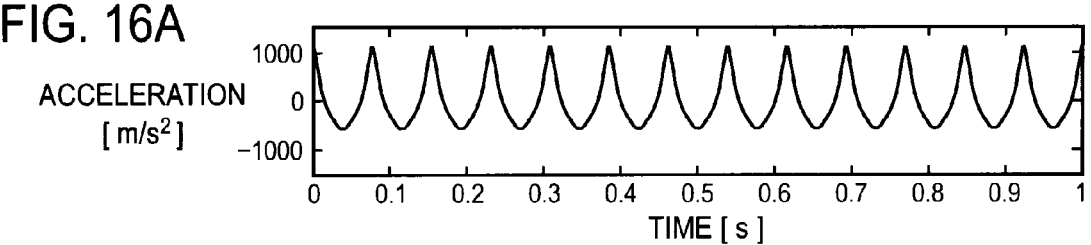
FIGS. 16A to 16C are graphs for illustrating the behavior of the acceleration generator which varies with the relative position of the movable bobbin with respect to the frame.
Figure 16B:
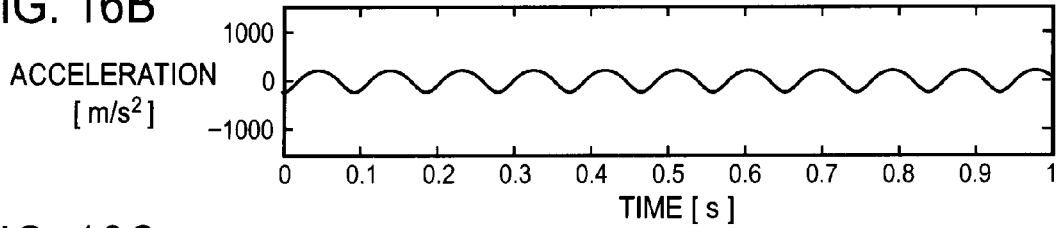
Figure 16C:
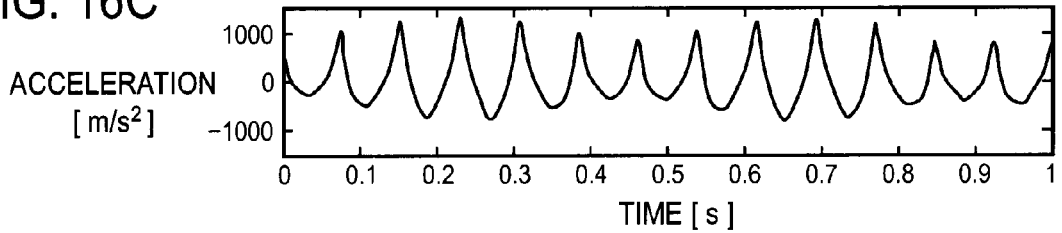
Figure 17A:
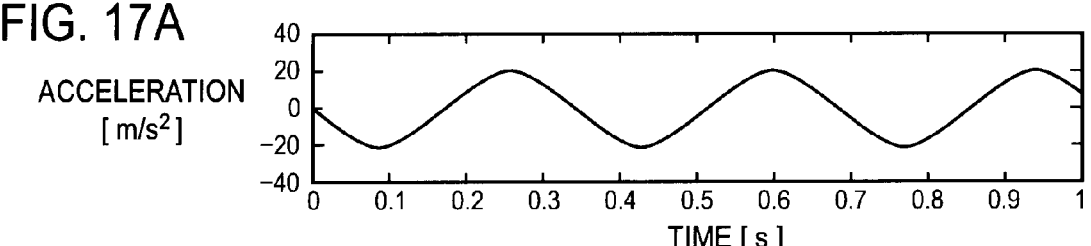
FIGS. 17A to 17C are graphs for illustrating the behavior of the acceleration generator which varies with the relative position of the movable bobbin with respect to the frame.
Figure 17B:
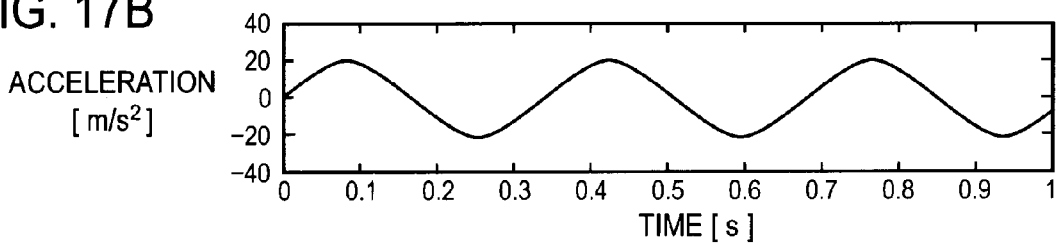
Figure 17C:
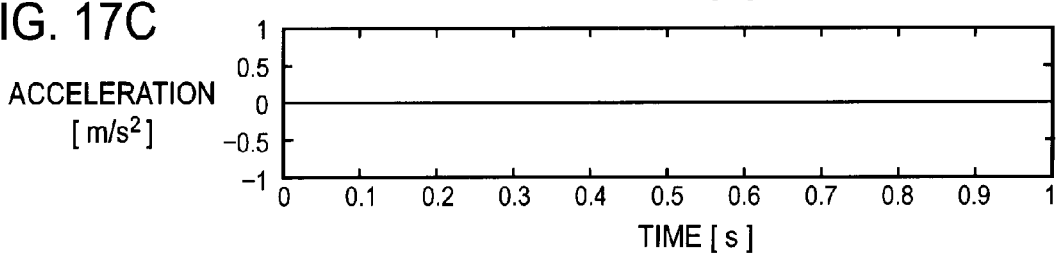
Figure 18A:
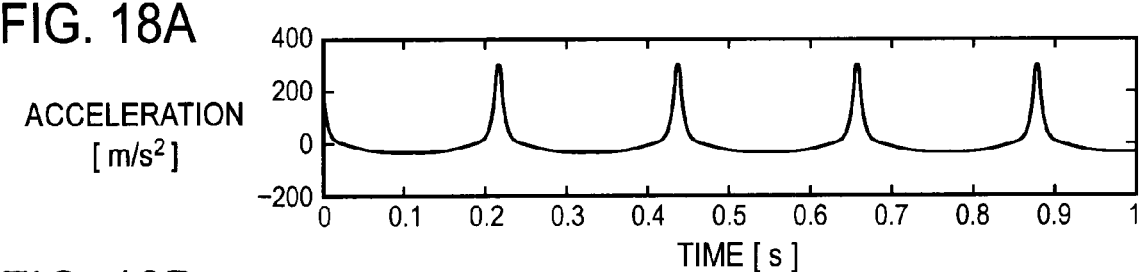
FIGS. 18A to 18C are graphs for illustrating the behavior of the acceleration generator which varies with the relative position of the movable bobbin with respect to the frame.
Figure 18B:
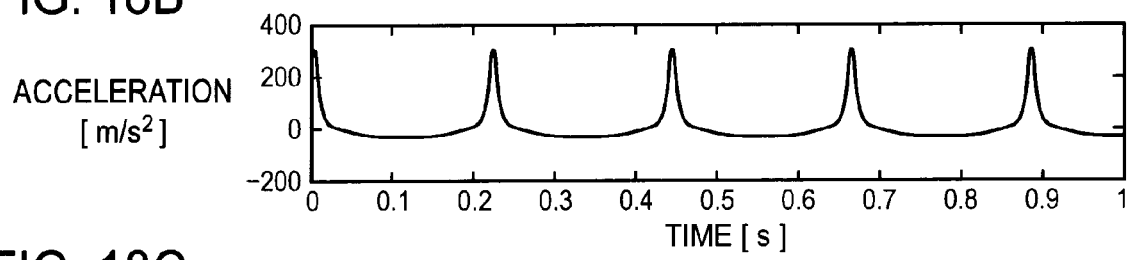
Figure 18C:
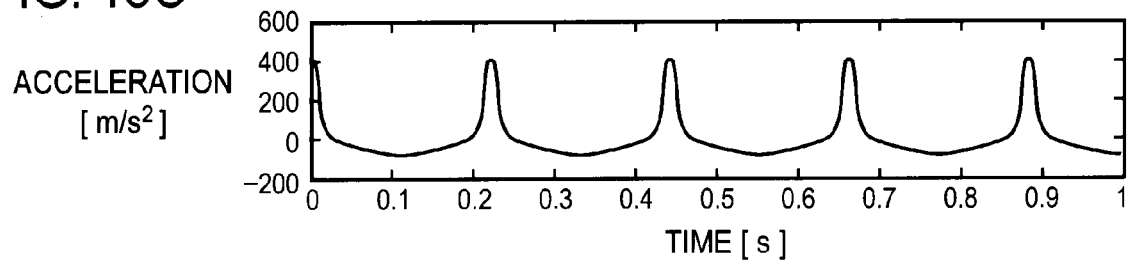

FIG. 14 shows a specific example of the configuration shown in FIG. 13A and is a cross-sectional view showing a configuration of a pseudo force sense generator 100 incorporating acceleration generators according to the sixth embodiment.

As shown in FIG. 14, the acceleration generator 100 according to this embodiment comprises disk-shaped permanent magnets 101b, 107a and 107b that have opposite magnetic polarities on the front surface and the back surface, annular-disk-shaped permanent magnets 101a and 101c that have through holes 101aa and 101ca, respectively, and have opposite magnetic polarities on the front surface and the back surface, a cylindrical frame (insulating material) 102, a cylindrical movable bobbin (insulating material) 103 that has through holes 103aa and 103ca in the longitudinal ends 103a and 103c thereof, respectively, springs 104a and 104b, and coils 106a and 106b of a conductor, such as a copper wire, covered with an insulator.

The movable bobbin 103 (which corresponds to the "movable part") is housed in the frame 102. The movable bobbin 103 can slide in the directions along the straight line N (which corresponds to a "particular straight line" determined with reference to the frame 102) in the frame 102 and be fixed at an arbitrary position. Furthermore, the permanent magnet 101a and 101c are fixed to the inner surfaces of the ends 103a and 103c of the movable bobbin 103, respectively. In this embodiment, the N-pole surface of the permanent magnet 101a is fixed to the inner surface of the end 103a, and the S-pole surface of the permanent magnet 101c is fixed to the inner surface of the end 103c. The through hole 101as of the permanent magnet 101a, the through hole 103aa of the movable bobbin 103, the through hole 101ca of the permanent magnet 101c and the through hole 103ca of the movable bobbin 103 are disposed on the same straight line N. Furthermore, one ends of the springs 104a and 104b (which correspond to "first operating parts") are fixed to the inner surfaces of longitudinal ends 102a and 102b of the frame 102, respectively. The springs 104a and 104b pass through the through holes 103ca and 103aa of the movable bobbin 103 and the through holes 101ca and 101aa of the permanent magnets 101c and 101a, respectively, so that the other ends of the springs 104a and 104b are disposed in the movable bobbin 103 and fixed to the permanent magnets 107a and 107b (which correspond to "moving members"), respectively. In this embodiment, the spring 104a is fixed to the N-pole surface of the permanent magnet 107a, and the spring 104b is fixed to the S-pole surface of the permanent magnet 107b. Furthermore, the permanent magnet 101b (which corresponds to a "second operating part") is disposed between the permanent magnets 107a and 107b, and the side surface of the permanent magnet 101b is fixed to an inner wall 103b of the movable bobbin 103. In this embodiment, the S-pole surface of the permanent magnet 101b faces to the permanent magnet 107a, and the N-pole surface of the permanent magnet 101b faces to the permanent magnet 107b. In addition, the coils 106a and 106b are wound around the side surface of the frame 102 in a certain circumferential direction. The coils 106a and 106b are disposed close to the permanent magnets 107a and 107b, respectively (at positions where the coils can exert a Coulomb force to the permanent magnets 107a and 107b, respectively). The amount of current supplied to the coils 106a and 106b can be controlled independently. The central axis of the frame 102, the central axis of the movable bobbin 103, the central axes of the permanent magnets 101a, 101b, 101c, 107a and 107b, and the opposite ends of the springs 104a and 104b are substantially disposed on the straight line N.

The outer diameter of the permanent magnets 107a and 107b is slightly smaller than the inner diameter of the movable bobbin 103. Therefore, the permanent magnets 107a and 107b can be supported by the inner wall of the movable bobbin 103 to perform a translational motion. Alternatively, a rail may be provided in the movable bobbin 103, and the permanent magnets 107a and 107b may be supported by the rail to perform a translational motion.

With the configuration described above, the relative position of the movable bobbin 103 with respect to the frame 102 can be changed in the directions along the straight line N. The springs 104a and 104b, supported at the ends 102a and 102b of the frame 102, respectively, apply a "first force" to the permanent magnets 107a and 107b in the directions along the straight line N, respectively. In addition, the permanent magnet 101b, supported at the inner wall 103b of the movable bobbin 103, applies a "second force" to the permanent magnets 107a and 107b in the directions along the straight line N. In addition, the permanent magnets 101a and 101c, supported at the ends 103a and 103c of the movable bobbin 103, apply a force to the permanent magnets 107a and 107b, respectively, in the directions along the straight line N.

<Operation>

With the configuration described above, if an alternating current is applied to the coils 106a and 106b, the permanent magnets 107a and 107b perform a translational motion similar to that in the sixth embodiment. The balance of accelerated motion between the permanent magnets 107a and 107b can be controlled by changing the relative position of the movable bobbin 103 with respect to the frame 102. Thus, the occurrence, the direction and the intensity of the pseudo force sense can be adjusted.

FIGS. 15 to 18 are graphs for illustrating the behavior of the pseudo force sense generator 100 which varies with the relative position of the movable bobbin 103 with respect to the frame 102. FIGS. 15A, 16A, 17A and 18A are graphs showing the acceleration of the permanent magnet 107a, FIGS. 15B, 16B, 17B and 18B are graphs showing the acceleration of the permanent magnet 107b, and FIGS. 15C, 16C, 17C and 18C are graphs showing the synthetic acceleration of the acceleration of the permanent magnet 107a and the acceleration of the permanent magnet 107b. In these graphs, the ordinate indicates the acceleration [m/s$^2$], and the abscissa indicates the time [s]. In addition, it is supposed that the positive direction is the rightward direction in FIG. 14, and the negative direction is the leftward direction in FIG. 14.

FIG. 15 includes graphs in the case where $m_A$=0.05 [kg], $k_A$=100 [N/m], $x_{A0}$=150*10$^{-3}$ [m], $x_{D0}$=100*10$^{-3}$ [m], $x_{CD0}$=400*10$^{-3}$ [m], $M_D$=0.3 [N/m$^2$], $M_{CA}$=0.005 [N/m$^2$], $x_A'(0)$=1 [m/s], $x_A(0)$=200*10$^{-3}$ [m], $m_B$=0.05 [kg], $k_B$=100 [N/m], $x_{B0}$=150*10$^{-3}$ [m], $x_{E0}$=100*10$^{-3}$ [m], $x_{CE0}$=400*10$^{-3}$ [m], $M_E$=0.3 [N/m$^2$], $M_{CB}$=0.005 [N/m$^2$], $x_B'(0)$=1 [m/s], and $x_B(0)$=200*10$^{-3}$ [m].

FIG. 16 includes graphs in the case where $m_A$=0.05 [kg], $k_A$=100 [N/m], $x_{A0}$=150*10$^{-3}$ [m], $x_{D0}$=130*10$^{-3}$ [m], $x_{CD0}=430*10^{-3}$ [m], $M_D=0.3$ [N/m²], $M_{CA}=0.005$ [N/m²], $x_A'(0)=1$ [m/s], $x_A(0)=200*10^{-3}$ [m], $m_B=0.05$ [kg], $k_B=100$ [N/m], $x_{B0}=150*10^{-3}$ [m], $x_{E0}=70*10^{-3}$ [m], $x_{CE0}=370*10^{-3}$ [m], $M_E=0.3$ [N/m²], $M_{CB}=0.005$ [N/m²], $x_B'(0)=1$ [m/s], and $x_B(0)=200*10^{-3}$ [m].

FIG. 17 includes graphs in the case where $m_A=0.05$ [kg], $k_A=100$ [N/m], $x_{A0}=300*10^{-3}$ [m], $x_{D0}=200*10^{-3}$ [m], $x_{CD0}=400*10^{-3}$ [m], $M_D=0.01$ [N/m²], $M_{CA}=0.01$ [N/m²], $x_A'(0)=1$ [m/s], $x_A(0)=300*10^{-3}$ [m], $m_B=0.05$ [kg], $k_B=100$ [N/m], $x_{B0}=300*10^{-3}$ [m], $x_{E0}=200*10^{-3}$ [m], $x_{CE0}=400*10^{-3}$ [m], $M_E=0.01$ [N/m²], $M_{CB}=0.01$ [N/m²], $x_B'(0)=1$ [m/s], and $x_B(0)=300*10^{-3}$ [m].

FIG. 18 includes graphs in the case where $m_A=0.05$ [kg], $k_A=100$ [N/m], $x_{A0}=300*10^{-3}$ [m], $x_{D0}=290*10^{-3}$ [m], $x_{CD0}=490*10^{-3}$ [m], $M_D=0.01$ [N/m²], $M_{CA}=0.01$ [N/m²], $x_A'(0)=1$ [m/s], $x_A(0)=300*10^{-3}$ [m], $m_B=0.05$ [kg], $k_B=100$ [N/m], $x_{B0}=300*10^{-3}$ [m], $x_{E0}=110*10^{-3}$ [m], $x_{CE0}=310*10^{-3}$ [m], $M_E=0.01$ [N/m²], $M_{CB}=0.01$ [N/m²], $x_B'(0)=1$ [m/s], and $x_B(0)=300*10^{-3}$ [m].

Here, reference numerals $m_A$ and $m_B$ denotes the mass of the permanent magnets 107a and 107b, respectively, reference numerals $k_A$ and $k_B$ denotes the spring constant of the springs 104a and 104b, reference numeral $M_{CA}$ denotes the constant of proportionality of the magnetic charge repulsive force between the permanent magnet 101b and the permanent magnet 107a, reference numeral $M_{CB}$ denotes the constant of proportionality of the magnetic charge repulsive force between the permanent magnet 101b and the permanent magnet 107b, reference numeral $M_D$ denotes the constant of proportionality of the magnetic charge repulsive force between the permanent magnet 101c and the permanent magnet 107a, and reference numeral $M_E$ denotes the constant of proportionality of the magnetic charge repulsive force between the permanent magnet 101a and the permanent magnet 107b. Furthermore, reference numeral $x_{A0}$ denotes the distance between the end 102a and the permanent magnet 107a in the equilibrium state, reference numeral $x_{D0}$ denotes the distance between the end 102a and the permanent magnet 101c, reference numeral $x_{CD0}$ denotes the distance between the end 102a and the permanent magnet 101b, reference numeral $x_{CE0}$ denotes the distance between the end 102b and the permanent magnet 101b, reference numeral $x_{B0}$ denotes the distance between the end 102b and the permanent magnet 107b in the equilibrium state, reference numeral $x_{E0}$ denotes the distance between the end 102b and the permanent magnet 101a, reference numeral $x_A(0)$ denotes the initial distance between the end 102a and the permanent magnet 107a, reference numeral $x_B(0)$ denotes the initial distance between the end 102b and the permanent magnet 107b, reference numeral $x_A'(0)$ denotes the first-order differential of $x_A(0)$ (initial velocity), and reference numeral $x_B'(0)$ denotes the first-order differential of $x_B(0)$ (initial velocity).

As shown in FIGS. 15C, 16C, 17C and 18C, the synthetic acceleration of the acceleration of the permanent magnet 107a and the acceleration of the permanent magnet 107b varies with the relative position of the movable bobbin 103 with respect to the frame 102. Therefore, the synthetic acceleration of the entire pseudo force sense generator 100, and therefore the pseudo force sense generated, can be adjusted simply by adjusting the relative position of the movable bobbin 103 with respect to the frame 102.

Characteristics of this Embodiment

As described above, according to this embodiment, the pseudo force sense generator is composed of two or more acceleration generators, and therefore, the occurrence, the direction, the intensity or the like of the pseudo force sense can be readily controlled.

Eighth Embodiment

Now, an eighth embodiment of the present invention will be described.

According to this embodiment, an eccentric cam (eccentric disk) mechanism is used to convert a rotational motive force transmitted through a rotational input shaft into a translational motion with an asymmetric acceleration.

<Configuration>

Figure 19:
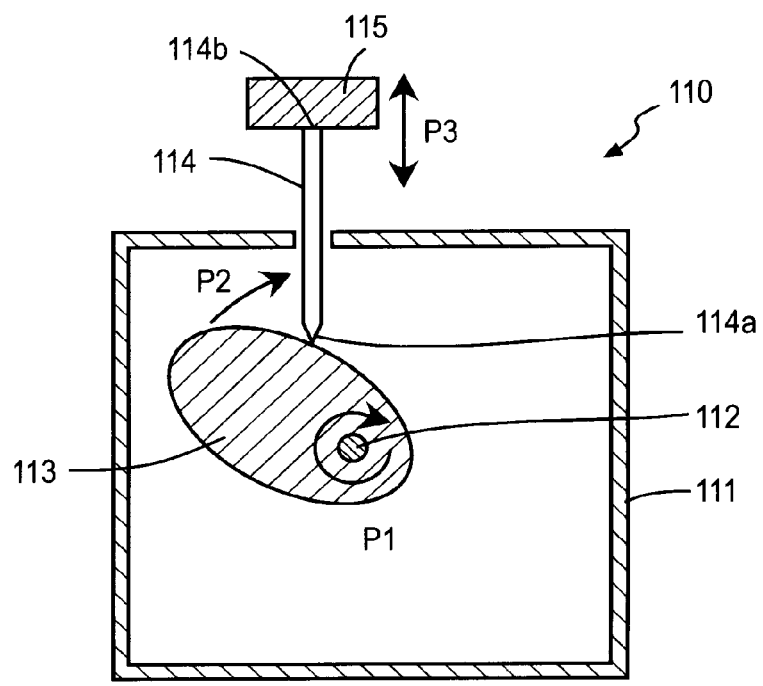
FIG. 19 is a cross-sectional view showing a configuration of an acceleration generator according to an eighth embodiment.

FIG. 19 is a cross-sectional view showing a configuration of an acceleration generator 110 according to the eighth embodiment.

As shown in FIG. 19, the acceleration generator 110 according to this embodiment comprises a frame 111, an input shaft 112 to which a rotational motive force is applied from a motor or the like (not shown), an eccentric cam 113 that is fixed to the rotary shaft 112 and eccentrically rotates, a guide shaft 114 that is in contact with the eccentric cam 113 at a tip end 114a and performs a translational motion responsive to the shape of the eccentric cam 113, and a weight 115 fixed to the other end 114b (the end opposite to the tip end 114a) of the guide shaft 114.

<Operation>

When the input shaft 112 rotates in the P1 direction, the eccentric cam 113 also rotates in the P2 direction to make the guide shaft 114 in contact therewith move vertically. The acceleration of the vertical motion varies with the shape of the eccentric cam 113, and thus, the acceleration of the translational motion of the weight 115 fixed to the guide shaft 114 varies depending on the shape of the eccentric cam 113. If, in such a mechanism, the ratio of the change in perceptual response to the change in acceleration differs between the point of the maximum value of the acceleration of the weight 115 in the positive direction (the upward direction in FIG. 19) and the point of the maximum value of the acceleration in the negative direction (the downward direction in FIG. 19), or in other words, if the maximum value of the acceleration in the positive direction falls within the range $f_2(x)$ of the sigmoid curve shown in FIG. 27, and the maximum value of the absolute value of the acceleration in the negative direction falls within the range $f_1(x)$, the pseudo force sense described above occurs.

Ninth Embodiment

Now, a ninth embodiment of the present invention will be described.

This embodiment is a modification of the eighth embodiment. According to this embodiment, two symmetric eccentric cams are rotated so that the total sum of the force vectors generated by the cams except the force vector in parallel with a particular straight line is always zero.

<Configuration>

Figure 20B:
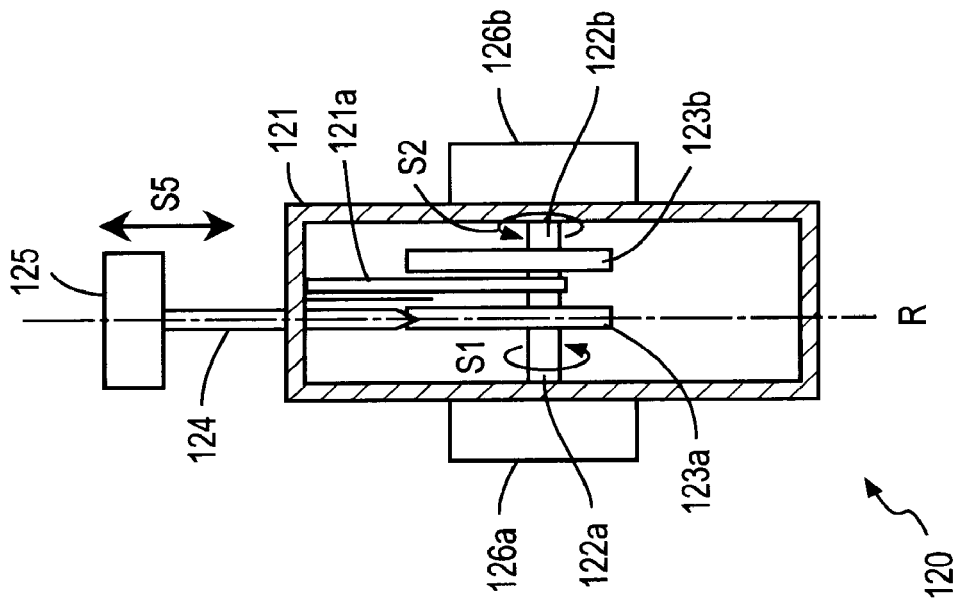
FIG. 20B is a cross-sectional view taken along the line 20B-20B in FIG. 20A.
Figure 20A:
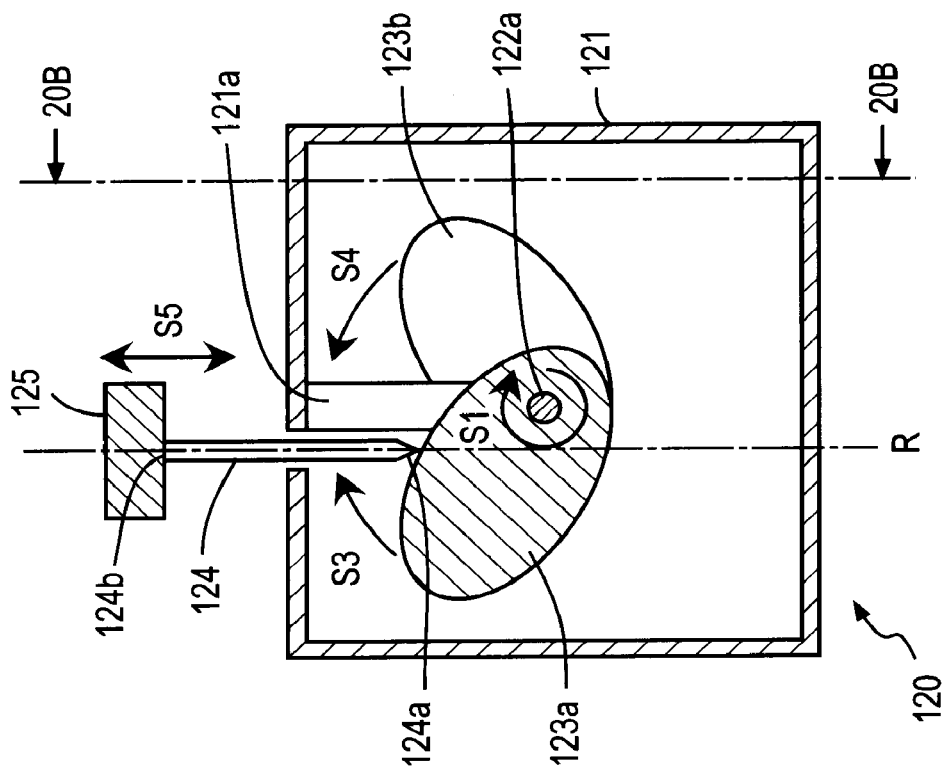
FIG. 20A is a cross-sectional view showing a configuration of a pseudo force sense generator according to a ninth embodiment.

FIG. 20A is a cross-sectional view showing a configuration of a pseudo force sense generator 120 according to the ninth embodiment. FIG. 20B is a cross-sectional view taken along the line 20B-20B in FIG. 20A.

As shown in FIG. 20, the pseudo force sense generator 120 comprises a frame 121, rotary input shafts 122a and 122b to which a rotational motive force is applied, two eccentric cams 123a and 123b having the same shape and the same mass, a guide shaft 124, a weight 125, and motors 126a and 126b.

The frame 121 has the shape of a hollow box, and a plate-shaped shaft holder 121a is fixed to the inner surface of the top wall (top wall in FIG. 20). The motors 126a and 126b are fixed to two opposite side surfaces of the frame 121, and the input shafts 122a and 122b, which are constituted by the rotary shafts of the motors 126a and 126b, are inserted into the frame 121 through through holes (not shown) formed in the frame 121. The tip ends of the input shafts 122a and 122b inserted in the frame 121 are rotatably held by the shaft holder 121a. The input shafts 122a and 122b are disposed on the same axis. However, the input shafts 122a and 122b are not associated with each other. The input shafts 122a and 122b disposed in the frame 121 are fixed to the eccentric cams 123a and 123b, respectively, and the eccentric cams 123a and 123b rotate as their respective input shafts 122a and 122b rotate. In addition, the guide shaft 124 passes through a through hole 121b formed in the top wall (top wall in FIG. 20) of the frame 121. The weight 125 is fixed to an end 124b of the guide shaft 124 that is disposed outside the frame 121, and a tip end 124a of the guide shaft 124 disposed inside the frame 121 is always in contact with the eccentric cam 123a under the weight of the guide shaft 124 and the weight 125.

The input shaft 122a corresponds to a "rotary input shaft to which a rotational motive force is applied", the eccentric cam 123a corresponds to a "motive force transmitter that converts a rotational motive force applied to the rotary input shaft into a periodic translational motion along a particular straight line", the weight 125 corresponds to a "moving member that performs a periodic translational motion along a particular straight line under the motive force transmitted by the motive force transmission shaft", and the eccentric cam 123b corresponds to a "symmetric part configured to be symmetric to the motive force transmitter".

<Operation>

The motors 126a and 126b rotate in the same rotational direction at the same angular velocity. Thus, the input shaft 122a rotates in the S1 direction, and the input shaft 122b rotates in the S2 direction. As a result, the eccentric cam 123a rotates in the S3 direction, and the eccentric cam 123b rotates in the S4 direction. Furthermore, the phase of rotation of the input shafts 122a and 122b is set so that, when the projections of the eccentric cams 123a and 123b onto a plane parallel to the sheet of FIG. 20A completely overlap each other, the projections of tip ends 123aa and 123ba of the eccentric cams 123a and 123b on the plane are both disposed on the projection of the straight line R (which corresponds to a "particular straight line"). Thus, the total sum of the force vectors generated by the eccentric cams 123a and 123b except the force vector in the directions parallel to the straight line R is always zero. As a result, the force sense occurs only in the directions along the straight line R, and no force sense occurs in all the directions except the directions along the straight line R.

When the eccentric cam 123a rotates in the S3 direction, the guide shaft 124 in contact therewith moves vertically, and the weight 125 fixed to the guide shaft 124 also moves vertically (performs a translational motion in the S5 directions). The acceleration of the translational motion of the weight 125 varies with the shape of the eccentric cam 123a. The eccentric cam 123a according to this embodiment has a shape that makes the way of variation of the acceleration in the positive direction (the upward direction parallel to the straight line R in FIG. 20) and the way of variation of the acceleration in the negative direction (the downward direction parallel to the straight line R in FIG. 20) are asymmetric in one period. Thus, the weight 125 performs a translational motion in which the acceleration varies depending whether the acceleration occurs in the positive direction or the negative direction. More specifically, the weight 125 according to this embodiment performs a translational motion in which the maximum value of the absolute value of the acceleration in the positive direction and the maximum value of the acceleration in the negative value differ from each other, and the duration of the acceleration in the direction in which the greater maximum value is provided is shorter than the duration of the acceleration in the direction in which the smaller maximum value is provided.

If, in such a mechanism, the ratio of the change in perceptual response to the change in acceleration differs between the point of the maximum value of the acceleration of the weight 125 in the positive direction and the point of the maximum value of the absolute value of the acceleration in the negative direction, or in other words, if the maximum value of the acceleration in the positive direction falls within the range $f_2(x)$ of the sigmoid curve shown in FIG. 27, and the maximum value of the absolute value of the acceleration in the negative direction falls within the range $f_1(x)$, the pseudo force sense described above occurs in the directions along the straight line R. In other words, if the weight 125, which is the "moving member", performs a translational motion in which the slope of the sigmoid curve described above differs between the point of the maximum value of the acceleration of the moving member in the positive direction and the point of the maximum value of the acceleration thereof in the negative direction, the pseudo force sense described above occurs.

Characteristics of this Embodiment

The configuration according to this embodiment can also generate the pseudo force sense described above. In addition, according to this embodiment, since the force vector is always zero in all the directions except the direction in which the pseudo force sense is to be generated, no vibrations or the like occur in all the directions except the direction in which the pseudo force sense is to be generated. Thus, it is possible to make a person more clearly sense the pseudo force.

Tenth Embodiment

Now, a tenth embodiment of the present invention will be described.

This embodiment is a modification of the ninth embodiment. According to this embodiment, two symmetric eccentric cams are rotated with one motor so that the total sum of the force vectors generated by the cams except the force vector in parallel with a particular straight line is always zero.

<Configuration>

Figure 21A:
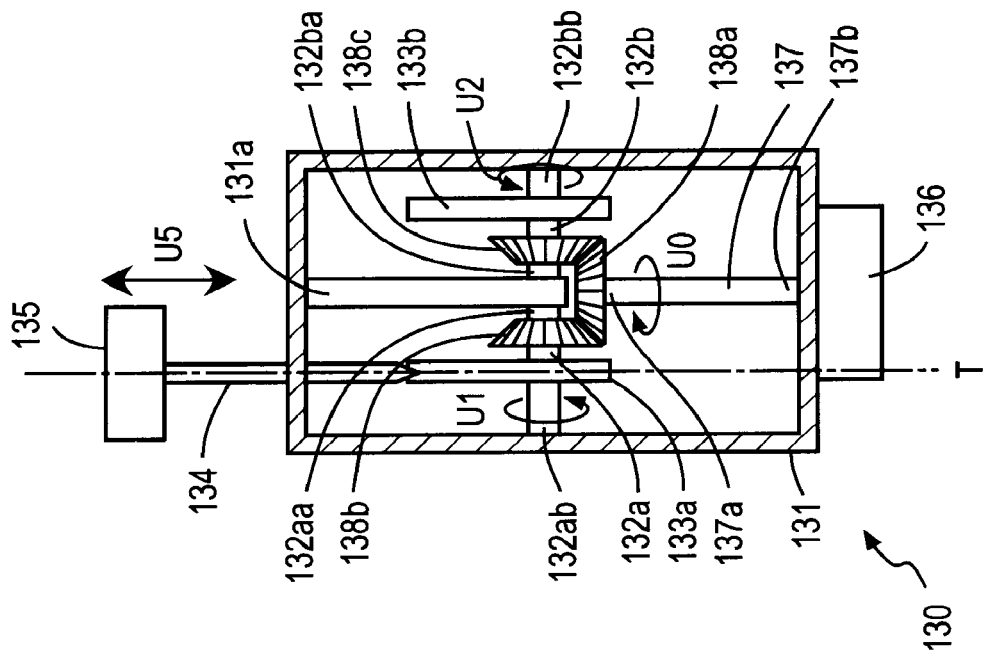
FIG. 21A is a cross-sectional view showing a configuration of a pseudo force sense generator according to a tenth embodiment.
Figure 21B:
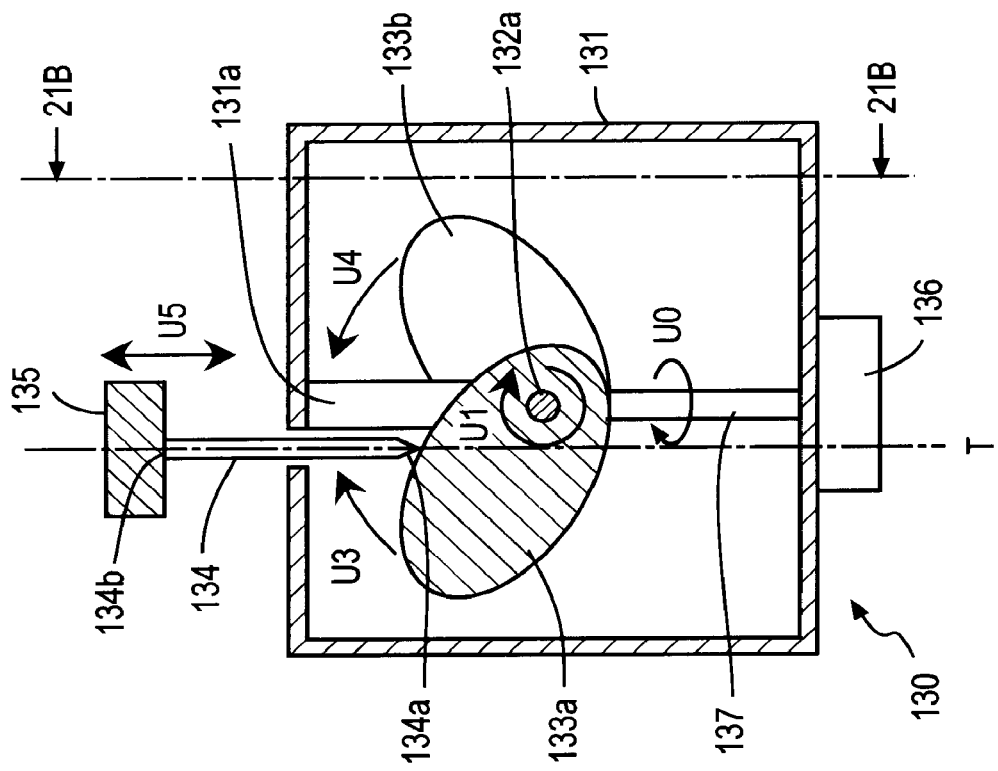
FIG. 21B is a cross-sectional view taken along the line 21B-21B in FIG. 21A.

FIG. 21A is a cross-sectional view showing a configuration of a pseudo force sense generator 130 according to the tenth embodiment. FIG. 21B is a cross-sectional view taken along the line 21B-21B in FIG. 21A.

As shown in FIG. 21, the pseudo force sense generator 130 comprises a frame 131, rotary input shafts 132a and 132b to which a rotational motive force is applied, two eccentric cams 133a and 133b having the same shape and the same mass, a guide shaft 134, a weight 135, a motor 136, and a rotary shaft 137 of the motor 136.

The frame 131 has the shape of a hollow box, and a plate-shaped shaft holder 131a is fixed to the inner surface of the top wall (top wall in FIG. 21). The motor 136 is fixed to the bottom surface (bottom surface in FIG. 21) of the frame 121, and the rotary shafts 137 of the motor 136 is inserted into the frame 131 through a through hole (not shown) formed in the frame 131. A bevel gear 138a is fixed to a tip end 137a of the rotary shaft 137 inserted in the frame 131. Input shafts 132a and 132b are disposed on a straight line perpendicular to the rotary shaft 137 and are rotatably supported on the inner wall of the frame 131 and the shaft holder 131a at their respective opposite ends 132a a and 132a b and 132ba and 132bb. In addition, bevel gears 138b and 138c are fixed to one ends of the input shafts 132a and 132b, respectively. The bevel gears 138b and 138c are engaged with the bevel gear 138a fixed to the rotary shaft 137 and rotate as the bevel gear 138a rotates.

The input shafts 132a and 132b disposed in the frame 131 are fixed to the eccentric cams 133a and 133b, respectively, and the eccentric cams 133a and 133b rotate as their respective input shafts 132a and 132b rotate. In addition, the guide shaft 134 passes through a through hole 131b formed in the top wall (top wall in FIG. 21) of the frame 131. The weight 135 is fixed to an end 134b of the guide shaft 134 that is disposed outside the frame 131, and a tip end 134a of the guide shaft 134 disposed inside the frame 131 is always in contact with the eccentric cam 133a under the weight of the guide shaft 134 and the weight 135.

The input shaft 132a corresponds to a "rotary input shaft to which a rotational motive force is applied", the eccentric cam 133a corresponds to a "motive force transmitter that converts a rotational motive force applied to the rotary input shaft into a periodic translational motion along a particular straight line", the weight 135 corresponds to a "moving member that performs a periodic translational motion along a particular straight line under the motive force transmitted by the motive force transmitter", and the eccentric cam 133b corresponds to a "symmetric part configured to be symmetric to the motive force transmitter".

<Operation>

When the motor 136 is activated, and the rotary shaft 137 rotates in the U0 direction, the input shaft 132a rotates in the U1 direction, the input shaft 132b rotates in the U2 direction. Since the input shaft 132a rotates in the U1 direction, the eccentric cam 133a also rotates in the U3 direction. Since the input shaft 132b rotates in the U2 direction, the eccentric cam 133b also rotates in the U4 direction.

Furthermore, the phase of rotation of the input shafts 132a and 132b is set so that, when the projections of the eccentric cams 133a and 133b onto a plane parallel to the sheet of FIG. 21A completely overlap each other, the projections of tip ends 133aa and 133ba of the eccentric cams 133a and 133b on the plane are both disposed on the projection of the straight line T (which corresponds to a "particular straight line"). Thus, the total sum of the force vectors generated by the eccentric cams 133a and 133b except the force vector in the directions parallel to the straight line T is zero at all times. As a result, the force sense occurs only in the directions parallel to the straight line T, and no force sense occurs in the directions except the direction along the straight line T.

When the eccentric cam 133a rotates in the U3 direction, the guide shaft 134 in contact therewith moves vertically, and the weight 135 fixed to the guide shaft 134 also moves vertically (performs a translational motion in the U5 directions). As a result, on the same principle as described above, a pseudo force sense occurs in the directions along the straight line T.

Characteristics of this Embodiment

The configuration according to this embodiment can also generate the pseudo force sense described above. In addition, according to this embodiment, since the force vector is always zero in all the directions except the direction in which the pseudo force sense is to be generated, no vibrations or the like occur in all the directions except the direction in which the pseudo force sense is to be generated. Thus, it is possible to make a person more clearly sense the pseudo force.

Eleventh Embodiment

Now, an eleventh embodiment of the present invention will be described.

According to this embodiment, a rotational motive force is converted into a translational motion in which the way of variation of acceleration is asymmetric in one period, thereby causing a pseudo force sense. And, a pseudo force sense generator is composed of two acceleration generators having such a mechanism that are disposed in a mirror symmetry.

<Configuration of Acceleration Generator>

Figure 22:
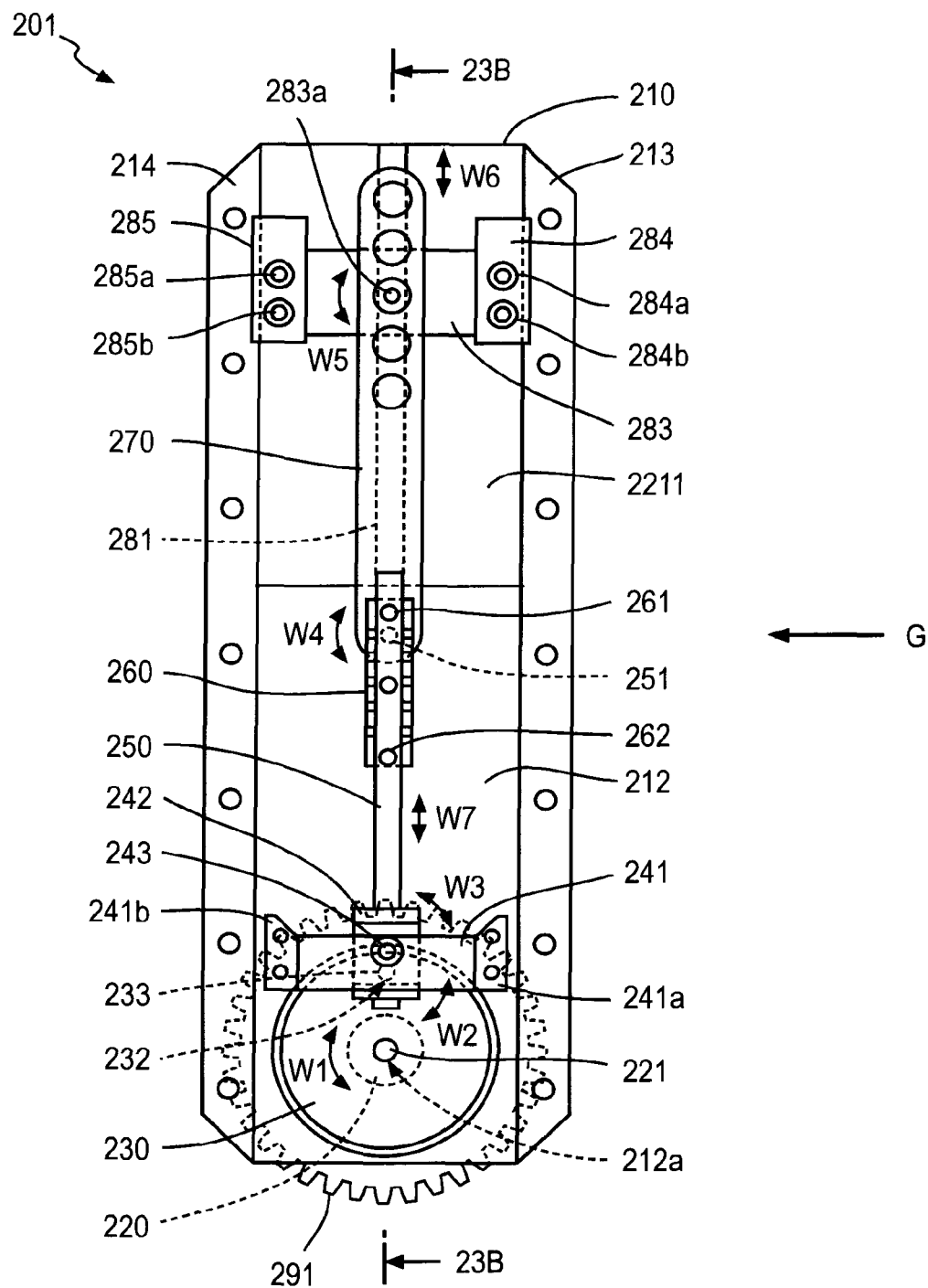
FIG. 22 is a plan view showing a configuration of a translational acceleration generator according to an eleventh embodiment.

FIG. 22 is a plan view illustrating a configuration of a translational acceleration generator 201 according to the eleventh embodiment. FIG. 23A is a front view of the acceleration generator 201 viewed from the G direction in FIG. 22, and FIG. 23B is a partial cross-sectional view taken along the line 23B-23B in FIG. 22. In FIG. 23B, a base part 210 is shown in side view not in cross-sectional view.

In the following, a configuration of the acceleration generator 201 according to this embodiment will be described with reference to these drawings.

As shown in FIGS. 22 and 23, the acceleration generator 201 mainly comprises a base part 210, a motor 220 incorporated in the base part 210, a rotary input shaft 221 to which a rotational motive force is applied by the motor 220, a rotary member 230 (crank) fixed to the rotary input shaft 221, a first link mechanism 250 that is rotatably connected, by a first rotary shaft 233 parallel to the rotary input shaft 221, to the rotary member 230 at a site other than that of the rotary input shaft 221, a second link mechanism 270 that is rotatably connected, by a second rotary shaft 251 parallel to the first rotary shaft 233, to the first link mechanism 250 at a site other than that of the first rotary shaft 233, a slide mechanism 282 capable of sliding only along one axis (W6 directions) to which a part of the second link mechanism 270 other than the second rotary shaft 251 is connected in such a manner that the second link mechanism 270 can rotate about a third rotary shaft 283a that is parallel to the second rotary shaft 251, a slide bearing base part 241 the relative position of which with respect to the rotary input shaft 221 is fixed, a slide bearing mechanism 242 that is rotatably connected to the slide bearing base part 241 by a slide bearing rotary shaft 243 that is parallel to the rotary input shaft 221 and holds the first link mechanism 250 in such a manner that the first link mechanism 250 can slide in the longitudinal directions (W7 directions), and a gear 291 that is fixed to the rotary input shaft 221 and rotates as the rotary input shaft 221 rotates.

The base part 210 is a stepped hollow body having a lower part 211 and a higher part 212 that are different in height, and plate-shaped tubs 213 and 214 with screw holes formed therein at the bottom of the base part 210. The higher part 212 of the base part 210 has, at an end part thereof, a through hole 212a for passing through the rotary input shaft 221 that transmits the rotational motive force from the motor 220. Furthermore, the base part 210 has a through hole (not shown) in the surface (bottom surface in FIG. 23) opposite to the surface in which the through hole 212a is formed. The motor 220 is fixed in the higher part 212 of the base part 210 with the rotary input shaft 221 for transmitting the rotational motive force passing through the through holes and protruding from the upper and lower surface of the base part 210.

The part of the rotary input shaft 221 protruding from the upper surface of the base part 210 through the through hole 212a is fixed to the center of the disk-shaped rotary member 230. The part of the rotary input shaft 221 protruding from the lower surface of the base part 210 is fixed to the disk-shaped gear 291. Thus, the rotary member 230 and the gear 291 rotate in the W1 directions by the action of the rotational motive force applied via the rotary input shaft 221.

One end of the columnar first link mechanism 250 is fixed to a periphery part 232 of the rotary member 230 by the first rotary shaft 233 (a screw or the like) in such a manner that the columnar first link mechanism 250 can rotate in the W2 directions. Thus, the first link mechanism 250 is rotatably connected, by the first rotary shaft 233 parallel to the rotary input shaft 221, to the rotary member 230 at a site other than that of the rotary input shaft 221. The first link mechanism 250 has straight grooves 252 in the opposite longitudinal side surfaces thereof.

The slide bearing base part 241 has the shape of an angled-U with the opposite ends folded outward at right angles (the folded parts are referred to as tub) and is disposed on the surface of the higher part 212 of the base part 210 at a fixed position with respect to the rotary input shaft 221. In this embodiment, the slide bearing base part 241 is screwed to the base part 210 via the tubs at a position displaced from the rotary input shaft 221 toward the center of the base part 210 (toward the lower part 211, in other words) (more specifically, at a position where the end of the first link mechanism 250 closer to the rotary input shaft 221 is located in the resting state shown in FIG. 22). In the center area under the slide bearing base part 241, there is disposed the slide bearing mechanism 242 that is slidably engaged with the grooves 252 in the opposite side surfaces of the first link mechanism 250. The slide bearing mechanism 242 is attached to the slide bearing base part 241 by the slide bearing rotary shaft 243 (a screw or the like) in such a manner that the slide bearing mechanism 242 can rotate in the W3 directions. The position of the slide bearing rotary shaft 243 is shifted from the first rotary shaft 233 toward the center of the base part 210 (toward the lower part 211). In this way, the slide bearing mechanism 242 is connected, by the slide bearing rotary shaft 243 (a screw or the like) parallel to the rotary input shaft 221, to the slide bearing base part 241 in such a manner that the slide bearing mechanism 242 can rotate in the W3 directions and holds the first link mechanism 250 in such a manner that the first link mechanism 250 can slide in the longitudinal directions (W7 directions).

The first link mechanism 250 has, at the other end thereof, a reinforcing member 260 screwed to the surface facing the base part 210 by screws 261 and 262. The columnar second link mechanism 270 is connected, by the second rotary shaft 251, to the first link mechanism 250 at one end thereof with the reinforcing member 260 interposed therebetween in such a manner that the second link mechanism 270 can rotate in the W4 directions.

Furthermore, a columnar rail 281, which extends along the straight line connecting the rotary input shaft 221 and the slide bearing rotary shaft 243 in FIG. 22, is screwed to the surface of the lower part 211 of the base part 210 by screws 281a to 281f. The rail 281 has straight grooves 282a extending in the longitudinal directions (W6 directions) in the opposite side surfaces thereof. The slide mechanism 282 that is engaged with the grooves 282a in the opposite side surfaces of the rail 281 and can slide along the rail 281 in the W6 directions is disposed over the rail 281. A weight holding plate 283 is fixed to the surface of the slide mechanism 282 opposite to the surface facing to the rail 281. Weights 284 and 285 (inertial mass) are screwed to the surface of the weight holding plate 283 opposite to the surface facing the base part 210 by screws 284a and 284b, and 285a and 285b, respectively. The other end of the second link mechanism 270 is connected to the center of the weight holding plate 283 by the third rotary shaft 283a (a screw or the like) in such a manner that the second link mechanism 270 can rotate in the W5 directions. In this way, the slide mechanism 282 is rotatably connected, by the third rotary shaft 283a parallel to the second rotary shaft 251, to the second link mechanism 270 at a site other than that of the second rotary shaft 251, and the movement of the slide mechanism 282 is limited by the rail 281 to the slide movement along one axis (W6 directions).

FIGS. 24A and 24B are diagrams for illustrating movements of the mechanisms in the case where the rotary input shaft 221 rotates in the W1 directions by the action of the force of the motor 220. As shown in these drawings, when the rotary input shaft 221 rotates in a W1 direction, the first rotary shaft 233 also rotates in the same W1 direction. As a result, the first link mechanism 250 slides with the part thereof connected to the first rotary shaft 233 rotating about the first rotary shaft 233 in a W2 direction. As a result, the second link mechanism 270 connected to the first link mechanism 250 by the second rotary shaft 251 also slides while rotating about the second rotary shaft 251. As a result, the weight holding plate 283 and the slide mechanism 282, which are rotatably connected to second link mechanism 270 by the third rotary shaft 283a, move in the W6 directions.

In this way, the acceleration generator 201 generates a pseudo force sense in the W6 directions on the same principle as that described earlier.

<Configuration of Pseudo Force Sense Generator>

Figure 25:
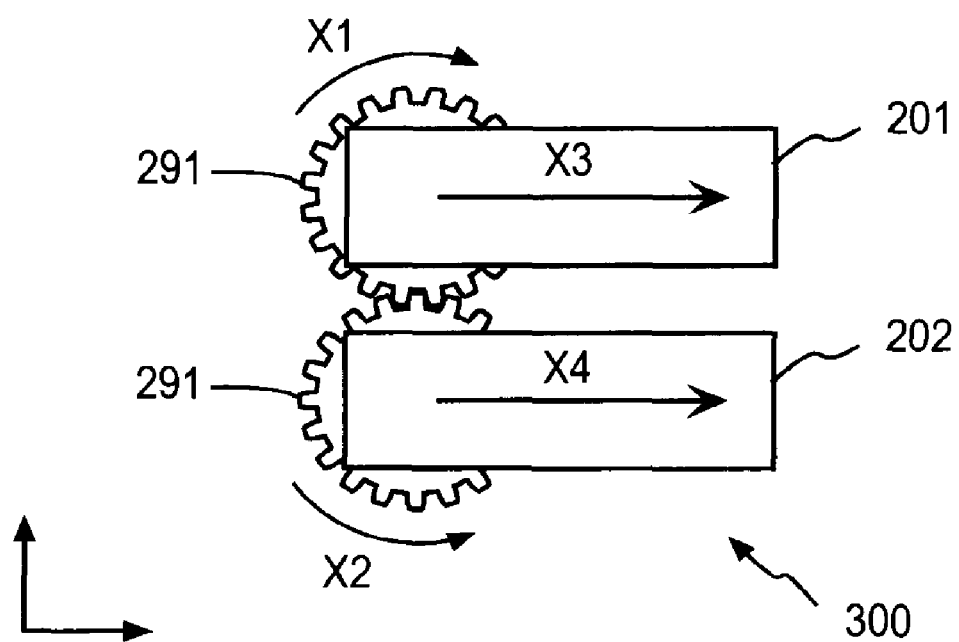
FIG. 25 is a diagram showing a configuration of a pseudo force sense generator composed of a combination of two acceleration generators.
Figure 26A:
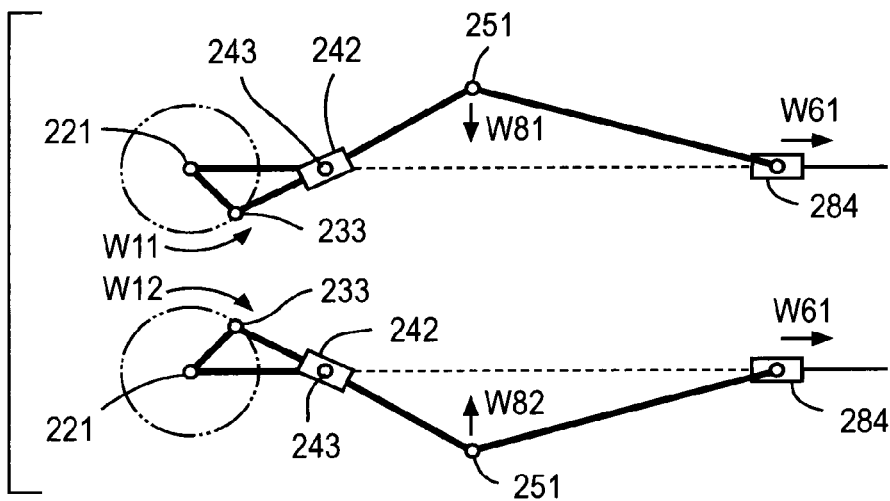
FIGS. 26A to 26C are conceptual diagrams showing a model of the pseudo force sense generator.
Figure 26B:
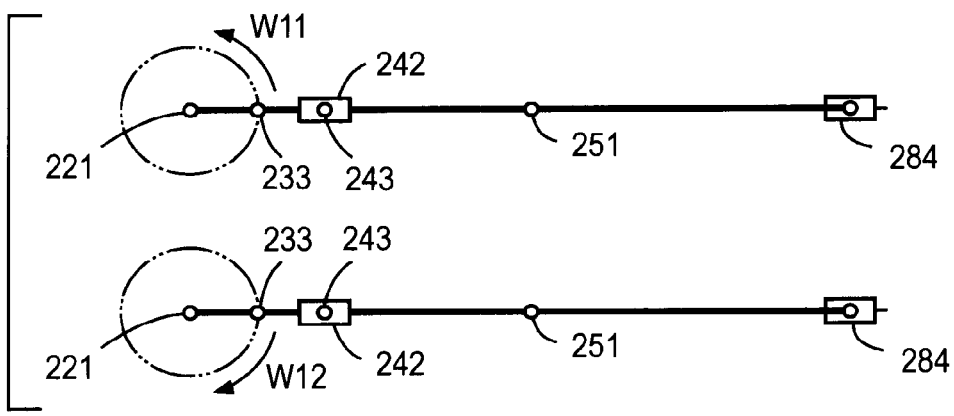
Figure 26C:
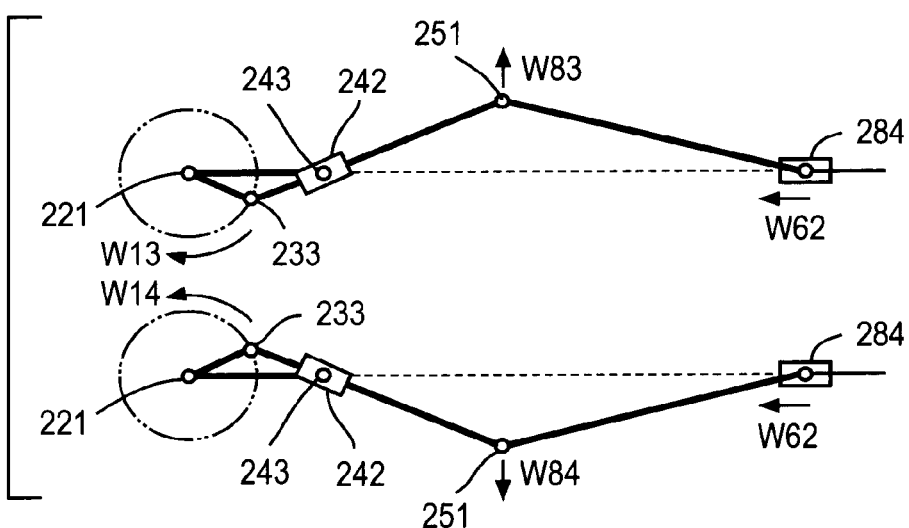
Figure 26D:
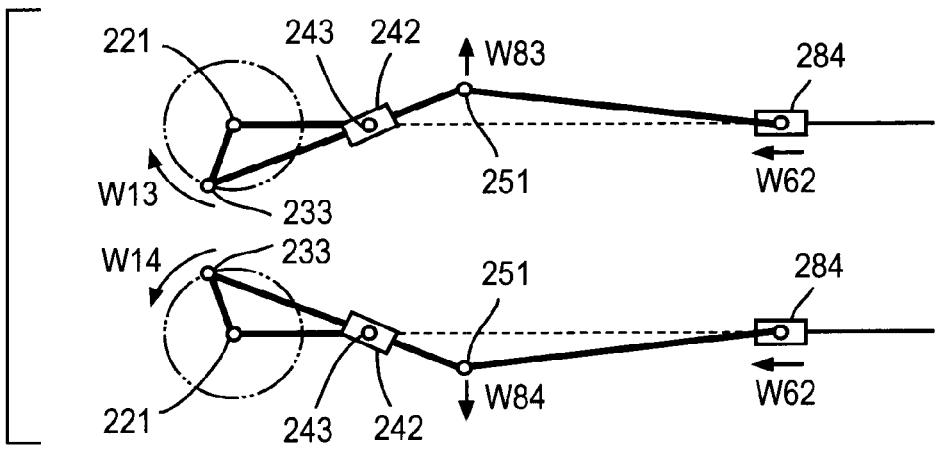
FIGS. 26D to 26F are conceptual diagrams showing a model of the pseudo force sense generator.
Figure 26E:
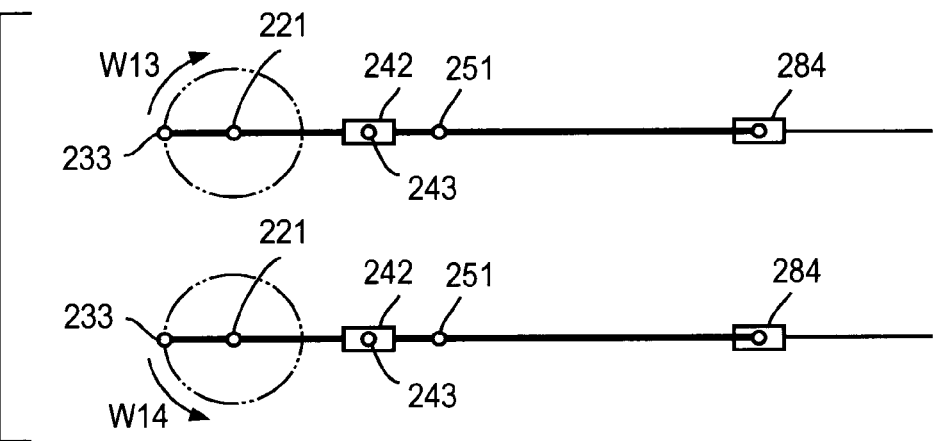
Figure 26F:
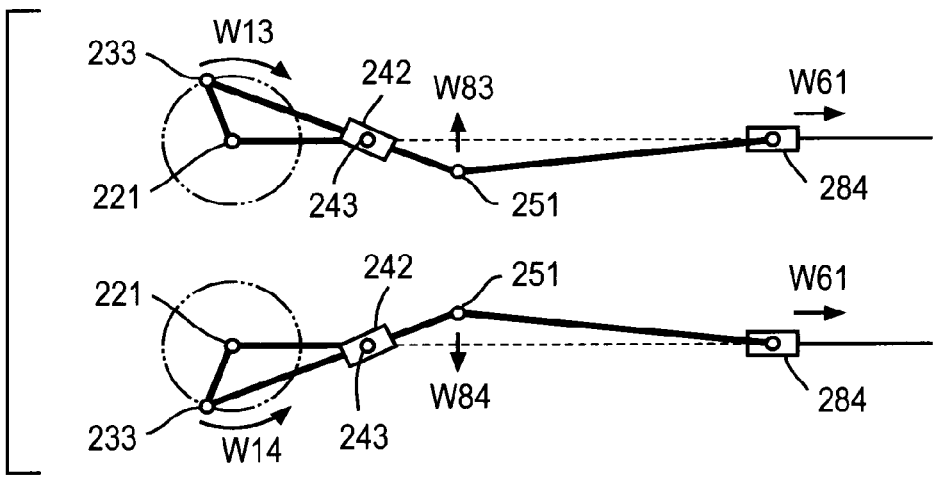

FIG. 25 is a diagram showing a configuration of a pseudo force sense generator 300 comprising two acceleration generators 201 described above. As shown in FIG. 25, in the pseudo force sense generator 300 according to this embodiment, the two acceleration generators 201 described above are arranged in a mirror symmetry so that the directions of generation of the pseudo force sense thereof are in parallel to each other. The gears 291 of the two acceleration generators 201 are engaged with each other, and the gears 291 rotate at the same angular velocity in the X1 and X2 directions. Thus, the two acceleration generators 201 perform a motion in a mirror symmetry and generate the pseudo force sense in the X3 and X4 directions.

<Operation of Pseudo Force Sense Generator 300>

FIGS. 26A to 26F are conceptual diagrams showing a model of the pseudo force sense generator 300.

As shown in these drawings, as the first rotary shafts 233 move in a circular motion (in the directions W13 and W14), the first link mechanisms 250, which are slidably and rotatably held by the respective slide supporting rotary shafts 243, rotate and slide. As a result, the second rotary shafts 251 move in a substantially elliptical orbit, and the third rotary shafts 283a move in the W61 or W62 direction (the W6 directions). In the example shown in these drawings, at the points in time shown in FIGS. 26A and 26F, the third rotary shafts 283a move in the W61 direction, and at the points in time shown in FIGS. 26C and 26D, the third rotary shafts 283a move in the W62 direction. As the third rotary shaft 283a moves, the slide mechanisms 282, the weight holding plates 283, and the weights 284 and 285 also perform their respective translational motions in the W6 directions. If the motors 220 rotate at a constant speed, the translational motions are periodic accelerated motions in which positive and negative accelerations occur in one period.

The two acceleration generators 201 are operated in a mirror symmetry. Therefore, the resultant force is always zero in all the directions except the W6 directions in which the pseudo force sense is generated. In the example shown in these drawings, at the point in time shown in FIG. 26A, equal forces occur in the opposite W81 and W82 directions. At the points in time shown in FIGS. 26C, 26D and 26E, equal forces occur in the opposite W83 and W84 directions. These forces cancel each other, and therefore, the resultant force thereof is zero. Furthermore, at all the points in time, forces involved with the rotation of the gears 291 and the like in the W13 and W14 directions occur. However, since the W13 and W14 directions are opposite directions, the resultant force of the forces involved with the rotation in the W13 and W14 directions is also zero. Thus, the resultant force in the directions except the X3 and X4 directions in which the pseudo force sense is to be generated is substantially suppressed, and it is possible to make a person clearly sense the pseudo force.

Characteristics of this Embodiment

The configuration according to this embodiment can also generate the pseudo force sense described above. In addition, according to this embodiment, since the force vector is always zero in all the directions except the direction in which the pseudo force sense is to be generated, no vibrations or the like occur in all the directions except the direction in which the pseudo force sense is to be generated. Thus, it is possible to make a person more clearly sense the pseudo force.

In this embodiment, the gears 291 are used to make the rotations of the motors 220 of the acceleration generators 201 constituting the pseudo force sense generator 300 in phase. However, the rotations of the motors 220 may be made in phase by electrical control. For example, a Hall element or a rotary encoder may be used to acquire phase information about the motors 220, and the motors 220 may be synchronized based on the information.

[Result of Evaluation of Perceptual Characteristics]

Finally, results of evaluation of perceptual characteristics of a pseudo force sense generator according to the present invention will be described. In the following evaluation, the arrangement of converting a rotational motion into a translational motion of a mass point according to the eleventh embodiment of the present invention was used.

<Experiment 1>
[Method of Experiment]

In order to provide the output only in the desired direction, the linear rail (LWFF manufactured by NIPPON THOMPSON CO., LTD, having a length of 400 mm) was used to limit the translational motion of the weight to the directions along one axis. The weight of the weight was 20 g. This experiment was performed for the axis the positive direction of which is the direction from the elbow to the palm of a person. A box of ABS resin was attached to the pseudo force sense generator according to this embodiment, and the test subjects grasped the box with their respective dominant hands. The test subjects were five males of ages from 24 to 31, and they wore eye masks to prevent them from acquiring visual information. Then, the pseudo force sense generator was activated, and the test subjects replied from which direction, forward (the direction from the elbow to the palm) or backward (the direction from the palm to the elbow), they sensed the force. The force sense was provided for two seconds, and about one minute's rest was given every 20 trials to prevent adaptation to the vibration component. The polarity of output of the acceleration (forward or backward) and the value of the frequency were changed randomly but in a sequence common to all the test subjects. The frequency was changed in seven steps from 5 Hz to 11 Hz, and ten measurements (five for each polarity) were performed for each test subject.

[Result of Experiment]

Figures 28A, 28B:
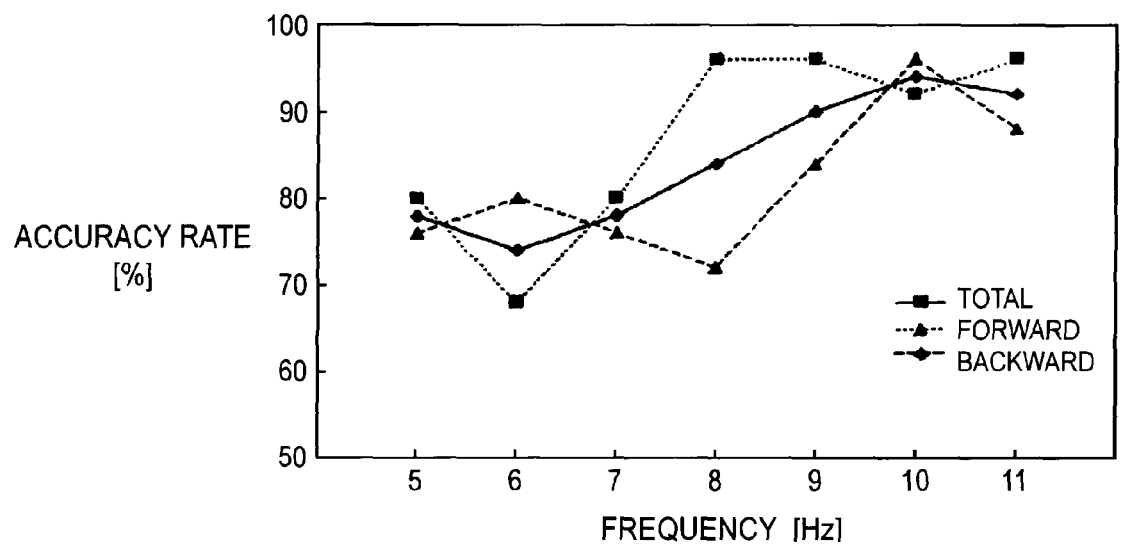
FIG. 28A is a table showing the correct answer rate for polarity of the test subjects.
FIG. 28B is a graph showing the average correct answer rate of the test subjects for each polarity.

FIGS. 28 show the result of the experiment. FIG. 28A is a table showing the correct answer rate for polarity of each test subject. FIG. 28B is a graph showing the average correct answer rate for the test subjects for each polarity (forward, backward and total).

As can be seen from these drawings, the correct answer rate tends to rise as the frequency increases. This is because the absolute value of the acceleration component increases as the frequency rises. At the frequency of 10 Hz or more, the correct answer rate was higher than 80% for all the test subjects. The term "correct answer" means that the force sense generated by the pseudo force sense generator matches with the polarity of the force sense replied by the test subject.

<Experiment 2>
[Method of Experiment]

In order to provide the output only in the desired direction, the linear rail was used to limit the translational motion of the weight to the directions along one axis. The weight of the weight was 20 g. This experiment was performed for the axis the positive direction of which is the direction from the elbow to the palm of a person. A box of ABS resin was attached to the pseudo force sense generator according to this embodiment, and the test subjects grasped the box with their respective dominant hands. The test subjects were three males (IT, GK and TB) and one female (AM) of ages from 28 to 31, and they wore eye masks to prevent them from acquiring visual information. Then, the pseudo force sense generator was activated, and the test subjects replied from which direction, forward (the direction from the elbow to the palm) or backward (the direction from the palm to the elbow), they sensed the force. Five rotational frequencies of the motor, 5 Hz, 10 Hz, 15 Hz, 20 Hz and 40 Hz were used. The polarity of output of the acceleration and the value of the frequency were changed randomly. 500 measurements (100 for each rotational frequency, including 50 for the forward provision and 50 for the backward provision) were performed for each test subject. The polarity of output of the acceleration and the value of the frequency were changed in different random sequences for the test subjects. The test subjects replied from which direction, forward (the direction from the elbow to the palm) or backward (the direction from the palm to the elbow), they sensed the force by pressing the left or right button of the ring mouse they grasped. Therefore, the chance level was 50%. 2 seconds after the test subject pressed the "enter" button to confirm the reply, the next stimulus was provided only once for 2 seconds. In view of adaptation to the vibration and fatigue, 2 minute's rest was given every 50 trials. In addition, the acceleration of the weight 284 in translational motion was measured.

[Result of Experiment]

FIGS. 29 and 30A to 30D show the result of the experiment.

Figure 29:
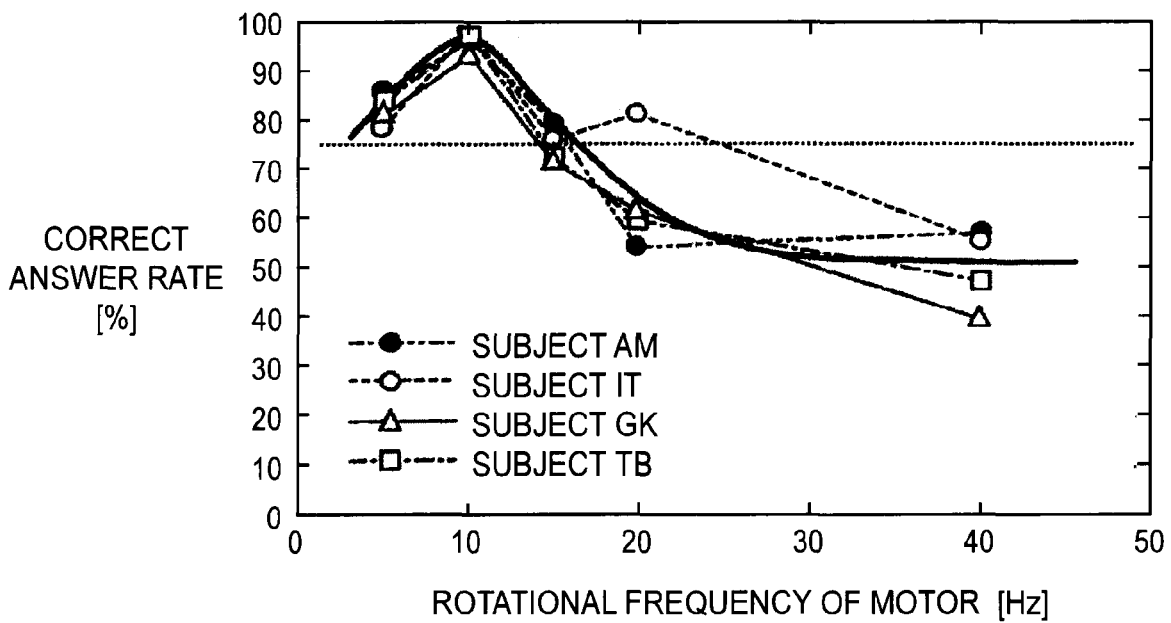
FIG. 29 is a graph showing the correct answer rate of each test subject.
Figure 30A:
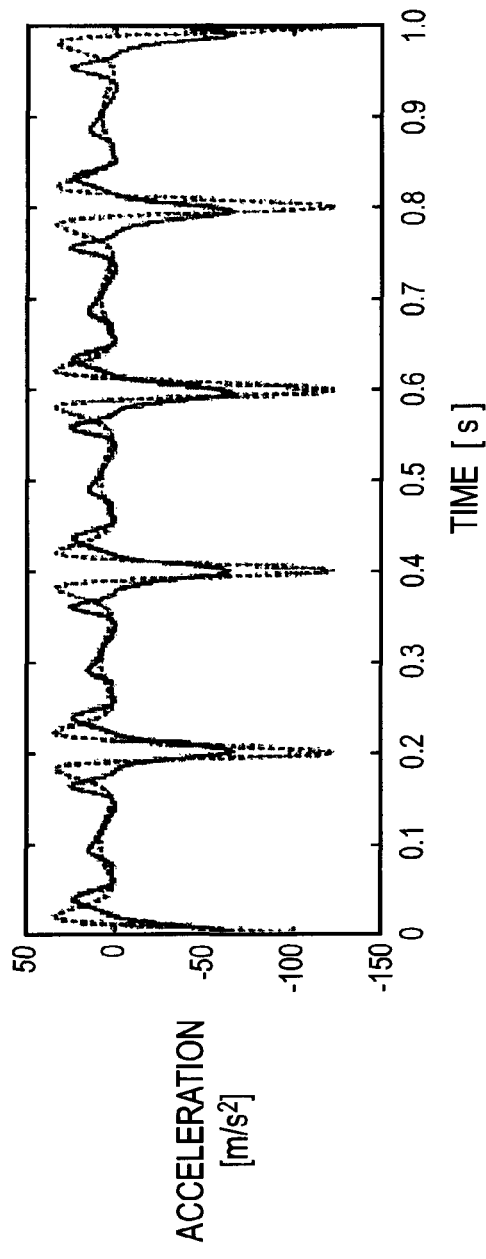
FIGS. 30A and 30B are graphs showing the acceleration of a weight 284 in the cases where the rotational frequency of a motor is 10 Hz and 20 Hz, respectively.
Figure 30B:
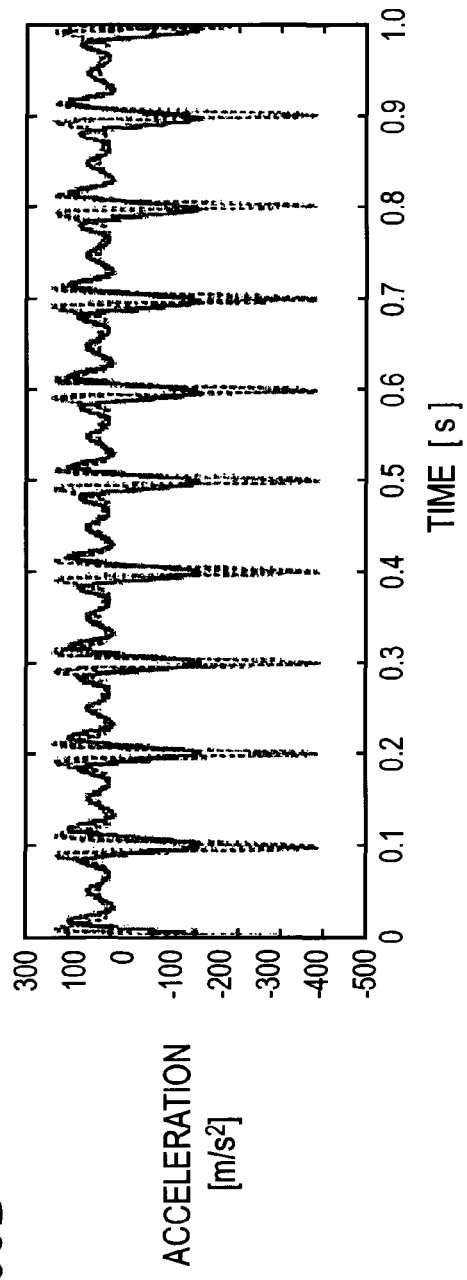

FIG. 29 is a graph showing the correct answer rate for each test subject. In this graph, the abscissa indicates the rotational frequency of the motor, and the ordinate indicates the correct answer rate. FIGS. 30A, 30B, 30C and 30D are graphs showing the acceleration of the weight 284 in the cases where the rotational frequency of the motor is 10 Hz, 20 Hz, 30 Hz and 40 Hz, respectively. In FIG. 30, the solid line indicates the measurement values, and the dashed line indicates the theoretical values obtained by simulation.

As can be seen from FIG. 29, for all the test subjects, when the rotational frequency of the motor is 10 Hz, the correct answer rate was the highest, and the average correct answer rate was 96.5%. On the other hand, when the rotational frequency of the motor is 40 Hz, the correct answer rate was the lowest, which was nearly equal to the chance level.

As described above, in the experiments 1 and 2, the arrangement that converts a rotational motion into a translational motion of a mass point according to the eleventh embodiment of the present invention was evaluated. However, the principle that the pseudo force sense is generated by a translational motion in which the acceleration in the positive direction and the acceleration in the negative direction are asymmetric is shared by all the embodiments. Therefore, the results of these experiments can be applied to the arrangements according to the embodiments other than the eleventh embodiment.

<Experiment 3>

The experiment 3 demonstrates that the arrangement according to the eleventh embodiment can make a person more clearly sense the pseudo sense by making the force vector always zero in the directions except the direction in which the pseudo force sense is to be generated.

[Method of Experiment]

In this experiment, in order to check the influence of a vibration in the perpendicular direction, a pseudo force sense generator comprising two acceleration generators 201 and 202 that operate in anti-phase, such as one described with regard to the eleventh embodiment, (referred to as "anti-phase tandem apparatus" hereinafter), and a pseudo force sense generator comprising two acceleration generators 201 and 202 that operate in phase (referred to as "in-phase tandem apparatus" hereinafter) were used. The pseudo force sense generators were each fixed to a spur gear that rotates with respect to an acrylic disk. Rotating the spur gear can change the orientation of the pseudo force sense generator, thereby generating the pseudo force sense in an arbitrary direction.

The test subjects grasp the marked part of the acrylic disk with the hands and kept the grasping state throughout the experiment. The arms and hands of the test subjects were not fixed, so that the test subjects were able to move the disk for direction search. The audio information that the test subjects were able to obtain was controlled by the soundproof means, and the visual information that they were able to obtain was also controlled by one screen plate. The test subjects verbally replied the direction of the sensed force by seeing the protractor placed on the screen plate. Pseudo force sense generation by the pseudo force sense generator was continued until the test subjects sufficiently recognized the direction of the generated pseudo force sense. In order to prevent the test subjects from being less sensitive to the pseudo force because they are adapted to the vibration generated by the pseudo force sense generator, 2 minute's rest was given to the test subjects every 10 trials (about 55 minutes). In view of fatigue of the test subjects, the test subjects were permitted to take a rest arbitrarily.

[Result of Experiment]

Figure 31B:
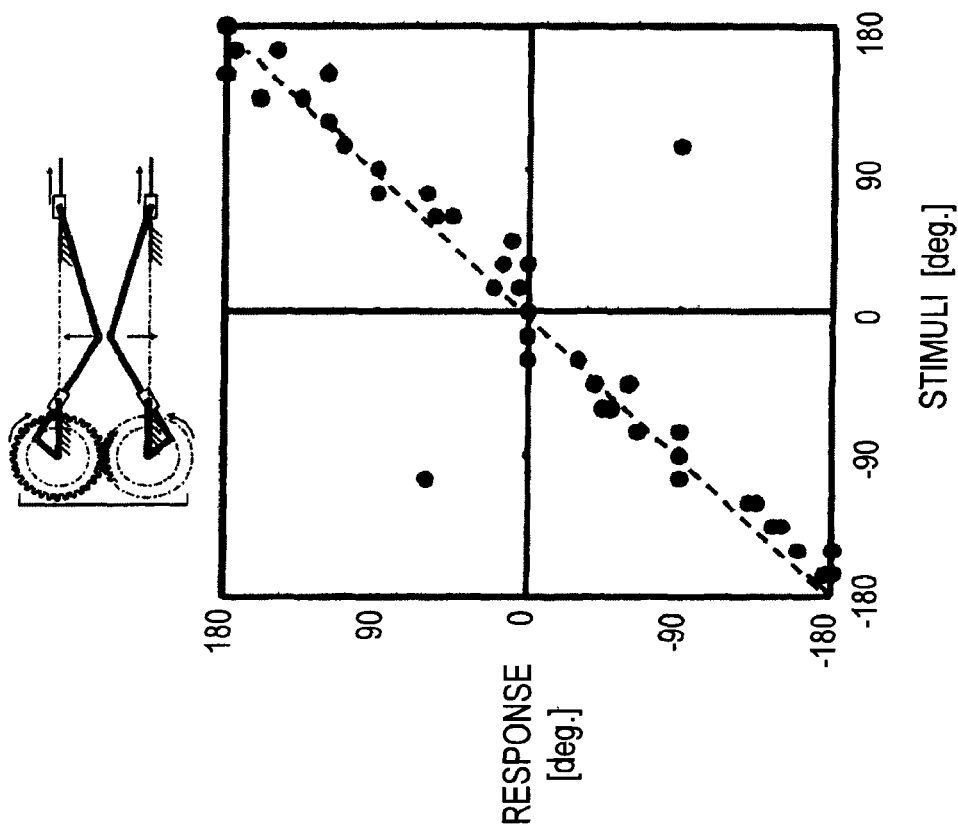
FIG. 31B is a graph showing the result of the experiment on the precision of the force sense direction for an anti-phase tandem apparatus.
Figure 31A:
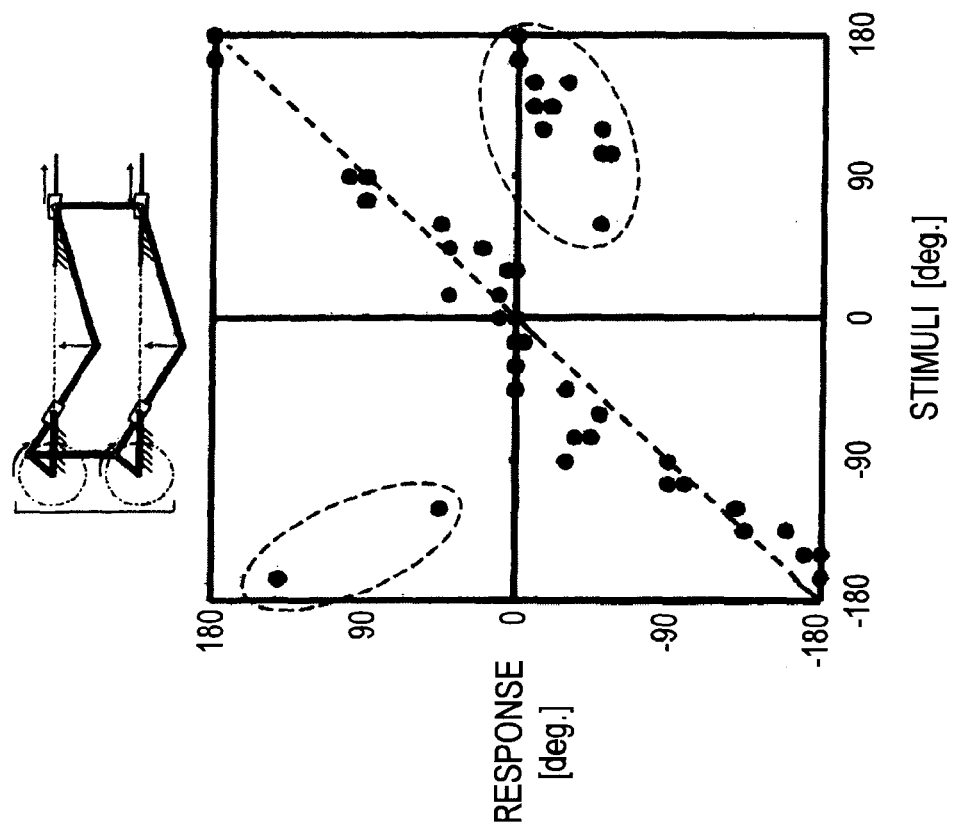
FIG. 31A is a graph showing the result of the experiment on the precision of the force sense direction for an in-phase tandem apparatus.

FIG. 31 are graphs showing the results of experiments on the precision of the force sense direction. FIG. 31A shows the result of the experiment for the in-phase tandem apparatus, and FIG. 31B shows the result of the experiment for the anti-phase tandem apparatus. In both the drawings, the abscissa indicates the direction of providing the force sense stimulus, and the ordinate indicates the direction that the test subjects replied. Furthermore, in both the drawings, each black dot represents one trial. If a black dot is on the dashed line in FIG. 31, it means that the correct answer was replied in the trial. Furthermore, viewed from the test subjects, the forward direction corresponds to the angle of 0 degrees, the backward direction corresponds to the angle of ±180 degrees, the leftward direction corresponds to the angle of 90 degrees, and the rightward direction corresponds to the angle of −90 degrees.

As shown in FIG. 31B, for the anti-phase tandem apparatus, the correct answer was replied in most of the trials. However, as shown in FIG. 31A, for the in-phase tandem apparatus, erroneous answers were replied. This means that the anti-phase tandem apparatus can make a person sense the pseudo force more clearly by making the force vector always zero in the directions except the direction in which the pseudo force sense is to be generated.

Of course, the present invention is not limited to the embodiments described above, and various modifications can be made without departing from the spirit of the present invention.

INDUSTRIAL APPLICABILITY

In general, in order to generate a physically complete force, a supporting point of the reaction force or a point of application of force is needed. However, according to the present invention, a pseudo force sense can be provided in a desired direction depending on the non-linearity of the force perception of humans based on difference in absolute value between the positive and negative forces, while keeping the average physical force at 0. Since any supporting point outside or on the human body is not necessary, the present invention can be applied to fields of mobile devices, such as cellular phones, wearable computer and the like as a sense provision device.

What is claimed is:

1. A pseudo force sense generator to cause a person to sense a pseudo force in a predetermined direction, comprising:
a rotary input shaft to which a rotational motive force is applied;
a motive force transmitter that converts the rotational motive force applied to the rotary input shaft into a periodic translational motion along a particular straight line which is parallel to the predetermined direction;
a moving member that performs a periodic translational motion along the particular straight line under the motive force transmitted by the motive force transmitter; and
a symmetric part that is configured to be symmetric to the motive force transmitter,
wherein, when the predetermined direction is a positive direction, and the direction opposite to the predetermined direction is a negative direction, the moving member performs a translational motion in which a temporal change of an acceleration of the moving member in one period is asymmetric and varies depending on whether the acceleration occurs in the positive direction or the negative direction; the moving member performs a translational motion in which a slope of a sigmoid curve that expresses the relationship between the acceleration of the moving member and an acceleration sensed by the person, when the acceleration of the moving member is exerted to the person, differs between a point of a maximum value of the acceleration in the positive direction of the moving member and the point of the maximum value of the acceleration in the negative direction of the moving member, and
the total sum of force vectors generated by the motive force transmitter and the symmetric part is zero, at all times, in the directions except directions parallel to the particular straight line.

* * * * *